(12) United States Patent
Baxley et al.

(10) Patent No.: US 9,560,060 B2
(45) Date of Patent: Jan. 31, 2017

(54) CROSS-MODALITY ELECTROMAGNETIC SIGNATURE ANALYSIS FOR RADIO FREQUENCY PERSONA IDENTIFICATION

(71) Applicant: Bastille Networks, Inc., Atlanta, GA (US)

(72) Inventors: Robert John Baxley, Atlanta, GA (US); David Maynor, Atlanta, GA (US); Logan Michael Lamb, Atlanta, GA (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

(21) Appl. No.: 14/728,954

(22) Filed: Jun. 2, 2015

(65) Prior Publication Data

US 2015/0349810 A1 Dec. 3, 2015

Related U.S. Application Data

(60) Provisional application No. 62/006,605, filed on Jun. 2, 2014, provisional application No. 62/072,884, filed on Oct. 30, 2014.

(51) Int. Cl.

| | |
|---|---|
| *H04B 7/00* | (2006.01) |
| *H04L 29/06* | (2006.01) |
| *H04B 1/00* | (2006.01) |
| *H04W 88/06* | (2009.01) |
| *H04W 12/08* | (2009.01) |

(Continued)

(52) U.S. Cl.
CPC ......... *H04L 63/1416* (2013.01); *G06K 7/0095* (2013.01); *H04B 1/0064* (2013.01); *H04B 7/01* (2013.01); *H04L 63/02* (2013.01); *H04L 63/1483* (2013.01); *H04W 12/08* (2013.01); *H04W 72/0406* (2013.01);

(Continued)

(58) Field of Classification Search
CPC ....... H04B 1/0064; H04B 17/30; H04W 88/06
USPC ................................ 455/500, 404.2, 9, 448
See application file for complete search history.

(56) References Cited

U.S. PATENT DOCUMENTS

2004/0043747 A1 * 3/2004 Forster .................. G01S 13/878
455/334
2009/0258597 A1 * 10/2009 Chen .................... H04B 17/318
455/41.2

(Continued)

*Primary Examiner* — Md Talukder
(74) *Attorney, Agent, or Firm* — Long Technology Law, LLC; Joseph L. Long

(57) ABSTRACT

Systems and methods can support identifying multiple radio transmitters as being integrated within a single communications device. Radio frequency signals may be collected using one or more sensors incorporating radio receivers. A first radio frequency signature and a second radio frequency signature may be identified within one or more of the radio frequency signals as originating respectively from a first radio transmitter and a second radio transmitter. Characteristics of the first and second radio frequency signatures may be analyzed to evaluate a relationship between the first and second radio frequency signatures. It may be determined whether or not the first and second radio transmitters are integrated within a common wireless electronic device based upon the evaluated relationship between the first radio frequency signature and the second radio frequency signature. Characteristics and behaviors associated with the wireless electronic device may be determined therefrom.

20 Claims, 14 Drawing Sheets

(51) Int. Cl.
*H04B 7/01* (2006.01)
*H04W 72/04* (2009.01)
*G06K 7/00* (2006.01)

(52) U.S. Cl.
CPC ....... *H04W 72/0453* (2013.01); *H04W 88/06* (2013.01); *H04B 1/0028* (2013.01)

(56) References Cited

U.S. PATENT DOCUMENTS

| | | | | |
|---|---|---|---|---|
| 2010/0050259 A1* | 2/2010 | Christofferson | ...... | H04W 12/08 726/23 |
| 2013/0171942 A1* | 7/2013 | Christofferson | ...... | H04W 12/08 455/67.7 |
| 2013/0267182 A1* | 10/2013 | Brandt | ................ | H03G 3/3042 455/73 |
| 2013/0343446 A1* | 12/2013 | Eliaz | ................. | H04L 27/2628 375/230 |
| 2015/0349810 A1* | 12/2015 | Baxley | ................. | H04W 12/08 455/500 |
| 2015/0350228 A1* | 12/2015 | Baxley | ................. | H04W 12/08 726/23 |
| 2015/0350914 A1* | 12/2015 | Baxley | ................. | H04W 12/08 726/11 |

* cited by examiner

CROSS-MODALITY ELECTROMAGNETIC SIGNATURE ANALYSIS FOR RADIO FREQUENCY PERSONA IDENTIFICATION

RELATED APPLICATION

This application claims priority to U.S. Provisional Application No. 62/006,605, filed Jun. 2, 2014 and entitled "Systems and Methods for Safely Assessing, Identifying, and Protecting Personas Derived from Electromagnetic Signatures of the Internet of Things," and also to U.S. Provisional Patent Application No. 62/072,884, filed Oct. 30, 2014 and entitled "Systems and Methods for Identifying Wireless Security Threats Via Electromagnetic Signatures of the Internet of Things." The complete disclosure of each of the above-identified priority applications is hereby fully incorporated herein by reference.

BACKGROUND

There are billions of electronically communicating devices in use. Many of these devices are wireless devices such as smartphones, tablets, personal computers (PCs), media players and readers, personal digital assistants (PDAs), headsets, cameras, vehicles, wearable fitness device, health monitoring devices, and so forth. Many of these devices use some form of electromagnetic (EM) or radio frequency (RF) technology for communications with other devices, various communications services, and the Internet. Many of these devices wirelessly connect to the Internet forming a growing "Internet of Things" (IoT). The number of electronically communicating devices is expected continue to multiply due to business and consumer demands.

Despite the growing ubiquity of IoT devices, these devices and the networks connecting them remain vulnerable to wireless attacks. One driver in IoT device vulnerability is that there is no dominant IoT wireless networking standard. Instead, IoT devices employ one of many wireless access protocols. Some of these protocols are openly defined for anyone to use, others are proprietary to specific manufacturers. Because of this heterogeneity, IoT networks have been constructed with a primary objective of efficiently implementing stable wireless connectivity and generally assume that the wireless operating environment will be absent of threats from malicious agents. As speed and stability have been primary concerns, there has been little attention focused on the security of IoT wireless networks and their components. This reliance on implicit trust leaves wireless networks and the connected nodes vulnerable to external attacks.

IoT wireless protocols define how nodes operate on the network and may provide a gateway for entry to existing wired networks. Malicious agents may exploit these protocols to gain network access and possibly engage in undesirable network activities. Ill-defined protocols or misconfigured configured network nodes can cause harm either unintentionally due to poor user operation or intentionally by allowing access to malicious agents.

An example malicious objective may be to degrade the target network performance, or ultimately deny service to legitimate users. Another example may be to extract situational awareness about the target network. Yet another example may be to extract sensitive information from the target network. Other goals of malicious actors may include impacting network routing to prevent certain packets from reaching their intended destination or acting as an authenticated node by evading network trust mechanisms.

Emerging adaptable link layer protocols, such cognitive radio, may impact both attack and defense paradigms. Highly agile medium access, which may adapt due to context or environment, may result in wireless network nodes that are even more susceptible to attacks that exploit unforeseen vulnerabilities. Under this emerging paradigm, spatial dynamics may play a large role in how the network forms and operates.

There is a need in the art for electromagnetic signature analysis supporting detection, location, and classification of wireless attacks against IoT networks and devices. Such technologies can support the implementation of security measures related to collecting and processing electromagnetic, radio frequency emission signatures from electronic devices for identifying potential wireless network security threats.

SUMMARY

In certain example embodiments described herein, methods and systems can support identifying multiple radio transmitters as being integrated within a single communications device. Radio frequency signals may be collected using one or more sensors incorporating radio receivers. A first radio frequency signature and a second radio frequency signature may be identified within one or more of the radio frequency signals as originating respectively from a first radio transmitter and a second radio transmitter. Characteristics of the first and second radio frequency signatures may be analyzed to evaluate a relationship between the first and second radio frequency signatures. It may be determined whether or not the first and second radio transmitters are integrated within a common wireless electronic device based upon the evaluated relationship between the first radio frequency signature and the second radio frequency signature. Characteristics and behaviors associated with the wireless electronic device may be determined in response to determining that the first and second radio transmitters are integrated within a common wireless electronic device.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable electromagnetic signature analysis for threat detection in a wireless environment of embedded computing devices. The technology presented herein can support detecting, locating, and classifying wireless attacks against IoT networks and devices. A network of sensors can collect radio frequency signals. A network of signal processing engines can process those collected signals to identify, geolocate, group, determine intent of, and classify wireless devices in the area. Databases can manage and leverage libraries of signal and attack information. Security administrators may use a visualization console to monitor for wireless security threats. Technology presented herein can implement security measures related to the use of detected electromagnetic, radio frequency emission signatures from electronic devices to detect potential security threats.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
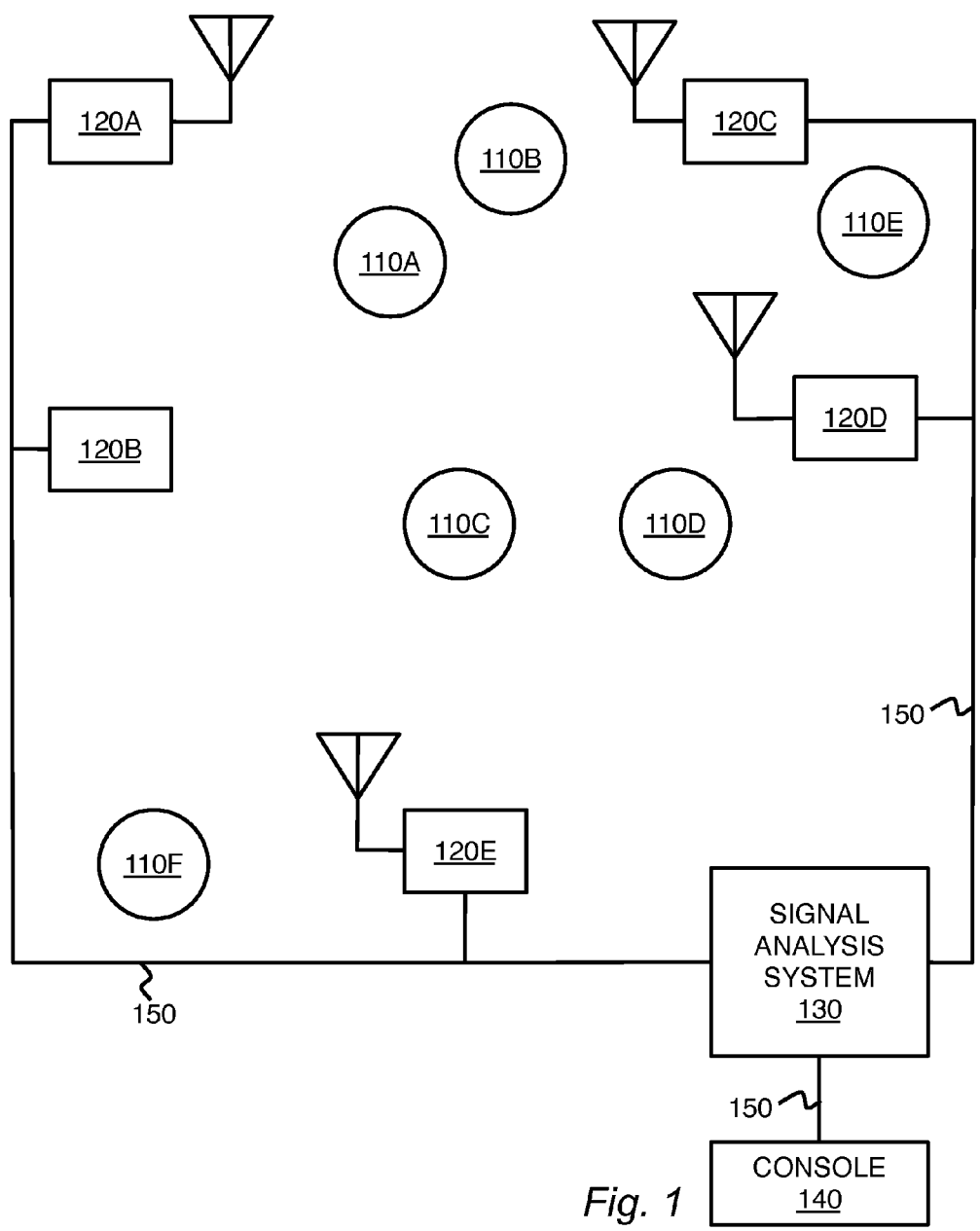
FIG. 1 is a block diagram depicting an electromagnetic environment and signature analysis system in accordance with one or more embodiments presented herein.

FIG. 1 is a block diagram depicting an electromagnetic environment and signature analysis system in accordance with one or more embodiments presented herein. Wireless devices 110A-110F may each engage in one or more modes of radio communication thereby generating electromagnetic signals. The technology presented herein can collect and analyze these signals. Sensors 120A-120E can collect and report radio frequency signals within the surrounding electromagnetic environment. A signal analysis system 130 can process the collected radio frequency signals. A console 140 can provide a user interface for configuring, controlling, or reviewing analysis results associated with the signal analysis system 130. One or more networks 150 may interconnect some or all of the sensors 120, the signal analysis system 130, and the console 140.

The wireless devices 110A-110F may be referred to, in general or collectively, as wireless devices 110 or a wireless device 110. The wireless devices 110 may include smartphones, computers, wearable devices, embedded computing devices, building system devices, industrial control/automation systems, physical security systems, security monitoring devices, automotive systems, avionics, point of sales systems, customer localization systems, inventory systems, wireless data/voice/video infrastructure, access control systems, and so forth. The wireless devices 110 may use Wi-Fi, Bluetooth, Zigbee, mobile telephone, GSM, CDMA, satellite, LTE technology, or various other wireless communication technologies.

The sensors 120A-120E may be referred to, in general or collectively, as sensors 120 or a sensor 120. The sensors 120 may collect electromagnetic signals from one or more antennas over a wide bandwidth of radio frequencies. The sensors 120 may utilize hardware radio receivers or software-defined radio frequency receivers. According to various embodiments, these radio receivers can convert received radio frequency energy into digital signals. These digital signals can then be decoded into encoded data streams.

While hardware-defined radio receivers can be cost-effective and less complex to implement, they may be limited as to what type of encoded data streams they can detect from the electromagnetic environment. For example, a hardware Wi-Fi receiver module or chipset is generally not able to also receive mobile telephone radio signals. In contrast, software-defined radio receivers can much more flexibly receive and decode various data streams within the electromagnetic environment under software control. The signal data collected by the sensors 120 may be transmitted to the signal analysis system 130 for processing. These signals or related signal data may be communicated in a continuous fashion or in one or more batches, at particular intervals according to various embodiments.

The signal analysis system 130 can receive and process signals from the sensors 120. The signal analysis system 130 may perform, among other functions, raw signal analysis, signal aggregation, multiple-input antenna processing, space-time-frequency analysis, geolocation, link pair association, throughput estimation, classification, attack analysis, and various other types of signal processing and analysis. The signal analysis system 130 may comprise a signal aggregation and analysis engine comprised of one or more feature vector processors. The signal analysis system 130 may be comprised of multiple systems that perform different portions of analysis and pass signals between each other in various formats over various communication links of the networks 150. For example, the signal analysis system 130 may comprise a complex and flexible network of various processing devices, which may be distributed to certain degrees or layered in a hierarchical system, to analyze and process the signals from the sensors 120.

The console 140 and various associated operator interfaces can support configuring, controlling, or reviewing analysis results associated with the signal analysis system 130. The console 140 can provide visualization features for use by security administrators to monitor the electromagnetic environment for wireless security threats. Such visualizations may include displays about the area under surveillance including device type, device position, pair-wise wireless communication links between devices, estimates of the data throughput being transmitted by devices, attack types being perpetrated, victim devices, and so forth. The operator interfaces may comprise interfaces associated with one or more visualization consoles 140, one or more administrative user interface application, or various other user or system interfaces associated with the technology presented herein. The operator interfaces can present threat information associated with identified wireless attacks.

The networks 150 may interconnect some or all of the sensors 120, the signal analysis system 130, and the console 140. Portions of the networks 150 connecting the sensors may be configured to transmit radio frequency signals and/or digital information. Radio frequency signals may be communicated as collected, down-converted using an intermediate frequency oscillator, or down-converted to baseband. Communication links associated with the networks 150 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 150 may use wireless frequencies or transmission paths that are selected to avoid interference from or to the electromagnetic environment in use by the wireless devices 110.

It should be appreciated that, according to certain embodiments, the wireless devices 110 may also make use of the networks 150. According to certain other embodiments, the wireless devices 110 may be dissuaded or precluded from sharing the networks 150 with the signal collection and analysis systems presented herein and instead may connect to one or more production networks that are separate from the networks 150 associated with the sensors 120 and/or the signal analysis system 130.

The sensors 120, or the antennas associated therewith, may be physically distributed around an area under surveillance. The collective coverage provided by the sensors 120 may define the effective extent of the area under surveillance. According to some examples, the sensors 120 may be positioned uniformly on a grid pattern throughout the area under surveillance. The grid may be a square grid, hexagonal grid, or other distributed pattern. The spatial period of the distribution pattern may be related to a coverage distance associated with each sensor 120. The periodic positioning of the sensors 120 may be altered to accommodate structures within the environment such as walls, stairwells, mechanical systems, and so forth. The periodic positioning of the sensors 120 may be altered to accommodate infrastructure feeds such as power and interface points for the network 150. For example, the interface points for the network 150 might be Ethernet ports.

Designing a location plan for the sensors 120 may start by receiving a floor plan of the proposed area under surveillance. Locations for available power and interface points for the network 150 may be identified. Sensor locations may be selected to form an approximately uniform grid, or other spatial distribution, constrained to the identified infrastructure locations. The sensors 120 may then be deployed at these locations. Once the sensors 120 are collecting signals, the number of packets, or other identified signal features, may be tracked such that sensors 120 collecting low numbers may be evaluated as potentially coving low traffic areas. Such low traffic sensors 120 may be re-position or spaced out to improve aggregate reception efficiency. Designing a location plan for the sensors 120 in this fashion may be referred to as surveillance area survey planning.

Other example sensor survey mechanisms may involve calculating the expected performance of a given sensor layout using physics-based or statistics-based models. For example, a physics-based model may calculate link budgets from points within the area under surveillance to each sensor 120. From these link budgets it may be possible to characterize how many sensors 120 would be able to see a given point in the area under surveillance on average. According to other examples, statistics-based site surveys may involve modeling the distribution of received signal strength values for each various pairings of a sensor 120 to a point in space within the area under surveillance. Statistical estimation techniques, such as the Cramer-Rao bound, may be used to establish a sensor location plan from the modeled signal strength values. For example, a bound may be determined for the base-case localization error over selected points within the area under surveillance.

One example attack type that may occur within the electromagnetic environment can involve a wireless device 110 configured as a malicious agent. The malicious agent may be configured as a rogue wireless access point to target other wireless devices 110 as victims. The rogue wireless access point may provide an unapproved wireless local area network, such as a Wi-Fi network. According to certain examples, legitimate users of wireless devices 110 may scan for available wireless networks and find the rogue network that has been intentionally named to appear as a trustworthy wireless network within the organization. In some instances, one or more of the wireless device 110 may automatically, or manually, connect to the malicious Wi-Fi network after assuming it to be trustworthy. Once connected, the malicious agents may attempt to obtain passwords, bank account details, employment records, or other types of sensitive information from the victim wireless device 110. Also, the malicious agents may add malicious code the victim wireless device 110 allowing further malicious actions against the victim, other victims, or the network in general.

Application of an electromagnetic signal collection and analysis system as presented herein can provide an area of enhanced wireless security against such malicious agents. With respect to the rogue wireless access point example attack, the signal analysis system 130 may be configured to parse the malicious Wi-Fi signal and determine that the malicious device is broadcasting a Wi-Fi signal to create an unauthorized wireless network. The signal analysis system 130 can send a notification to an appropriate security system or appropriate personnel. The notification may be made via the console 140 and may include an estimated location for the malicious device.

It should be appreciated that wireless security threats may take many different forms such as viruses, malware, spyware, and so forth. The threats may be transmitted through a variety of different channels, such as different frequencies, protocols, or wireless services. The threats may be designed to accomplish a variety of nefarious tasks such as shutting systems down, stealing information, denial of service attacks, device spoofing, and so forth. The electromagnetic threats may originate from any type of malicious, unauthorized, or rogue wireless devices.

The technology presented herein may support detecting and classifying wireless attacks on wireless devices 110 and networks. The technology presented herein may also support geolocating rogue, unauthorized, or malicious wireless devices 110. The technology presented herein may also support identifying data transfer event and estimating the amount of data being transmitted from a wireless device 110 using time-frequency physical-layer measurements of the electromagnetic environment. The technology presented herein may also support classifying the modes of wireless connectivity between wireless devices 110 using time-frequency, physical-layer measurements of the electromagnetic environment.

The console 140 can provide a user interface for security personnel or system administrators to obtain visibility into operations of the signal analysis system 130 and determinations about the various wireless devices 110 made from the electromagnetic environment. The signal analysis system 130 may localize, monitor, record, and playback the position and activity of the various wireless devices 110 including suspected rogue, unauthorized, or malicious devices. A system administrator, or other user, may use the console 140 to discover, localize, and otherwise analyze a malicious wireless device 110 operating within a wireless infrastructure. The administrator may be provided with a visualization of the position of the wireless devices 110 in the environment. The visualization may include metadata for each of the wireless devices 110. For each given wireless device 110, the metadata may include physical layer specifications such as modulation, protocols, symbol rates, bandwidths, or frequencies; a likelihood metric that the device is rogue, unauthorized, or malicious; a type of attack, if any, being employed by the device; and other wireless devices 110 that the particular device is likely to be communicating with.

The technology presented herein may support detecting, locating, and classifying infected wireless devices 110. Infected wireless devices 110 may have become susceptible to malicious software causing the device to perform one or more undesired behaviors. Such behaviors may include disrupting other wireless devices 110, infecting other wireless devices 110, surreptitiously recording and transmitting audio/video, transmitting sensitive data to a third party, other attacks presented herein, or any combinations thereof. The signal analysis system 130 may address such threats by detecting, geolocating, and classifying signals characteristic of infected wireless devices 110. The signal analysis system 130 may alert a user, such as an administrator, to the location of the infected wireless device 110. The alert may be provided via, or in association with, the console 140.

The technology presented herein may support detecting, locating, and classifying wireless devices 110 that are susceptible to wireless attack. In addition to inherent weaknesses in certain devices, protocols, or software versions, an attacker may attempt to place a target wireless device 110 into an insecure or vulnerable state as a precursor to the actual attack. While many wireless devices 110 implement countermeasures to prevent them from being infected with malicious software or otherwise compromised, attacks may attempt to override or otherwise circumvent these protections. As examples, encryption and secure authentication intended to prevent wireless attacks, may be circumvented. A condition where a wireless device 110 has been placed into such a vulnerable state may be observed from the radio emissions of the wireless device 110. The signal analysis system 130 may detect, geolocate, and classify signals characteristic of vulnerable devices.

One example of detecting a wireless device 110 that may be susceptible to wireless attack, is identifying that a mobile telephone that is operating in 2G mode even when 3G or 4G modes are available on the device and from the service provider. A threat may be in play to snoop text (SMS) messages since the 2G standard may send such messages without encryption. Where sensitive information, such as a password reset code, is transmitted using text (SMS) messages and an attacker has forced the mobile telephone into 2G mode, the sensitive information may be compromised.

Another example of detecting a wireless device 110 that may be susceptible to wireless attack, is identifying that a Bluetooth device is configured to allow for unauthenticated pairings of other Bluetooth devices. An attacker can take advantage of such a open pairing state to connect to a Bluetooth device and extract data or install malicious software.

The technology presented herein may support detecting, locating, and classifying wireless signal jamming attacks. Wireless systems are generally susceptible to jamming attacks where a malicious actor transmits wireless signals with the intent of blocking the wireless function of other wireless devices 110 in the vicinity. Radio jamming may be implemented as a barrage of radio frequency noise. More sophisticated jamming may involve a jamming signal that is crafted to efficiently and specifically target only a subset of wireless systems in the environment that are operating on certain frequencies, using certain modulation techniques, or implementing certain protocols. The signal analysis system 130 may detect, geolocate, and classify jamming signals.

The technology presented herein may support detecting, locating, and classifying impersonation attacks. Various wireless systems may be susceptible to impersonation attacks where a malicious actor transmits wireless signals with the intent of impersonating a recognized wireless signal. The objective of such an attack may be to control, block, or collect information from a wirelessly connected system. Such an attack may also target wireless mesh networks, where, through a variety of impersonation techniques, the attacker may change the network behavior to achieve malicious objectives. The following four examples demonstrate how impersonation attacks may threaten various types of systems. It should be appreciated that these are only examples and various other types of impersonation attacks may be detected, located, classified, and thwarted according to the technology presented herein.

A first example of an impersonation attack is against a building control and automation system that uses wirelessly connected temperature sensors to control the heating and cooling of a building. A wireless impersonation attack can impersonate the temperature sensors to wirelessly signal a low temperature thereby causing the heating system to heat the building. If, for example, the heating system is associated with a critical data center, excessive heat could destroy computer hardware or other systems in the data center.

A second example of an impersonation attack involves mobile or cellular wireless systems. In a mobile or cellular wireless system, base station equipment is generally installed and operated by a mobile carrier to support connections from user equipment wireless devices 110. These wireless devices 110 include user equipment mobile devices such as telephone handsets, smartphones, paging devices, data hotspots, and so forth. A malicious agent may provide an impersonated base station that advertises to user equipment wireless devices 110 that it is a base station from the mobile carrier supporting voice and data service. A user equipment wireless device 110 may unsuspectingly connect to the impersonated base station and route data and voice traffic through the impersonated base station. The impersonated base station may then maliciously read and modify data and voice content associated with the user equipment wireless device 110. User equipment wireless devices 110 often trust the base station they are connected to as having the authority of the mobile carrier provider and thus allow remote updating and installation of software or firmware through the base station. Accordingly, malicious actors may leverage impersonating base stations to install and execute unauthorized software on user equipment wireless device 110.

A third example of an impersonation attack involves wireless devices 110, such as onboard wireless sensors, associated with automotive systems. These sensors may be associated with temperature, braking, tire pressure, fluid levels, safety systems, or any other components of a vehicle. As an example, a tire pressure sensor may act as a wireless device 110 that transmits tire pressure to a vehicle control computer. In such a system, tire pressure measurements outside of a specified acceptable operating range, may cause the vehicle control computer to alert the driver, limit the speed of the vehicle, signal for roadside assistance, or carry out other specified reactions. A wireless attacker impersonating such a tire pressure sensor may cause such reactions to occur inappropriately, or block them from occurring as they were intended.

A fourth example of an impersonation attack involves a building security system. Building security systems often include building sensors acting as wireless devices 110. These building sensors may include door sensors, glass-break sensors, motion sensors, thermal sensors, and so forth. Measurements or signals from the building sensors may be used by the building security system to determine whether or not to signal an alarm event. A wireless attacker can impersonate signals from building sensors to disguise an unauthorized entry into the building, to cause a false alarm, or otherwise interfere with building security systems functionality.

The technology presented herein may support detecting, locating, classifying, and thwarting attacks associated with spoofing control information within a wireless network. By spoofing routing information, a malicious wireless device 110 can disrupt the wireless network by creating inefficient network routes, attracting network traffic, force network traffic away from intended destinations, or otherwise disrupting or preventing normal network operations. Similarly, a malicious wireless device 110 might spoof medium access control information, or other addressing information, to configure network nodes into a vulnerable state.

The technology presented herein may support detecting, locating, classifying, and thwarting attacks associated with sinkhole or black hole attacks on a wireless network. According to certain examples of such an attack type, a malicious wireless device 110 may attempt to lure network routes to pass through it, by advertising advantageous link quality. This may result in creating a critical point where many, or all, routes pass and thus become exposed to network disruption, data siphoning, or various other exploits.

The technology presented herein may support detecting, locating, classifying, and thwarting attacks associated with selective dropping or selective forwarding attacks within a wireless network. According to certain examples of such an attack type, a malicious wireless device 110 may attempt to drop certain critical network packets in order to degrade network performance or to force a new network topology.

The technology presented herein may support detecting, locating, classifying, and thwarting attacks associated with Sybil attacks within a wireless network. According to certain examples of such an attack type, malicious wireless devices 110 may advertise themselves in different ways to different unsuspecting wireless device 110 nodes in the network. By doing so, a malicious wireless device 110 can appear to be multiple nodes, thereby subverting security mechanisms that depend on network redundancy and distribution routing. Since fault tolerant schemes may depend upon broad network consensus to detect malicious nodes, a Sybil attack advertising a malicious wireless device 110 as multiple nodes can cast multiple votes and overrun the consensus ballot box making the network appear secure to other unsuspecting wireless device 110 nodes.

The technology presented herein may support detecting, locating, classifying, and thwarting attacks associated with Hello flood attacks within a wireless network. According to certain examples of such an attack type, malicious wireless devices 110 may exploit networks employing routing algorithms where a Hello packet advertises nodes. Malicious wireless devices 110 may break medium access rules and transmit with high power to advertise itself to even distant network nodes. Hello flood attacks may also be used to establish a sinkhole, carry out a Sybil attack, or perform other network security exploits.

The technology presented herein may support detecting, locating, classifying, and thwarting attacks associated with wormhole attacks on a wireless network. According to certain examples of such an attack type, when two malicious wireless devices 110 have access to a low-latency link outside of the wireless network, the pair can create the perception within the network that they are artificially close to other wireless device 110 nodes in the network, as though they provide a wormhole through the network. Wormhole attacks can be used to force a network to converge on an inefficient routing topology. Wormhole attacks can also be used to win routing races and more effectively spoof other network nodes.

The technology presented herein may support detecting, locating, classifying, and thwarting attacks associated with badmouthing or blacklisting attacks within a wireless network. According to certain examples of such an attack type, malicious wireless devices 110 may exploit consensus trust mechanisms intended to detect errant behavior. A malicious wireless device 110 can degrade the network by reporting legitimate network nodes as suspicious. When coupled with a Sybil attack, a malicious wireless device 110 can amplify the effect of the blacklisting by replicating mistrust reports from multiple impersonated nodes.

The technology presented herein may support detecting, locating, and classifying wireless transmissions from wireless device 110 in an unauthorized area. Certain areas, at certain times, may be unauthorized for certain types of wireless transmissions. For example, medical facilities with sensitive medical equipment may be unauthorized for any wireless transmission that may potentially interfere with the medical equipment. As another example, aircraft during takeoff and landing may be unauthorized for Wi-Fi or mobile carrier communications. Various similar authorization restrictions may exist in call centers, offices dealing with sensitive personal information, military installations, or otherwise secure government facilities.

The technology presented herein may support detecting, locating, and classifying auxiliary wireless devices 110 associated with cyber security attacks or physical security attacks. In such attacks, wireless signals may be used in conjunction with other malicious methods to perpetrate physical and cyber attacks. Broadly speaking, wireless systems may be used to allow the attacker remote access. Wireless systems may be also be used to control an attack infrastructure. One example of such a threat may involve card skimming at point of sales systems or automated teller machines. An attacker may position covert hardware to a card reader slot such that the covert hardware is not noticeable by users who freely slide their cards into the point of sale systems or automated teller machine. The covert hardware may store information associated with scanned cards to be wirelessly collected to a remote location.

Figure 14:
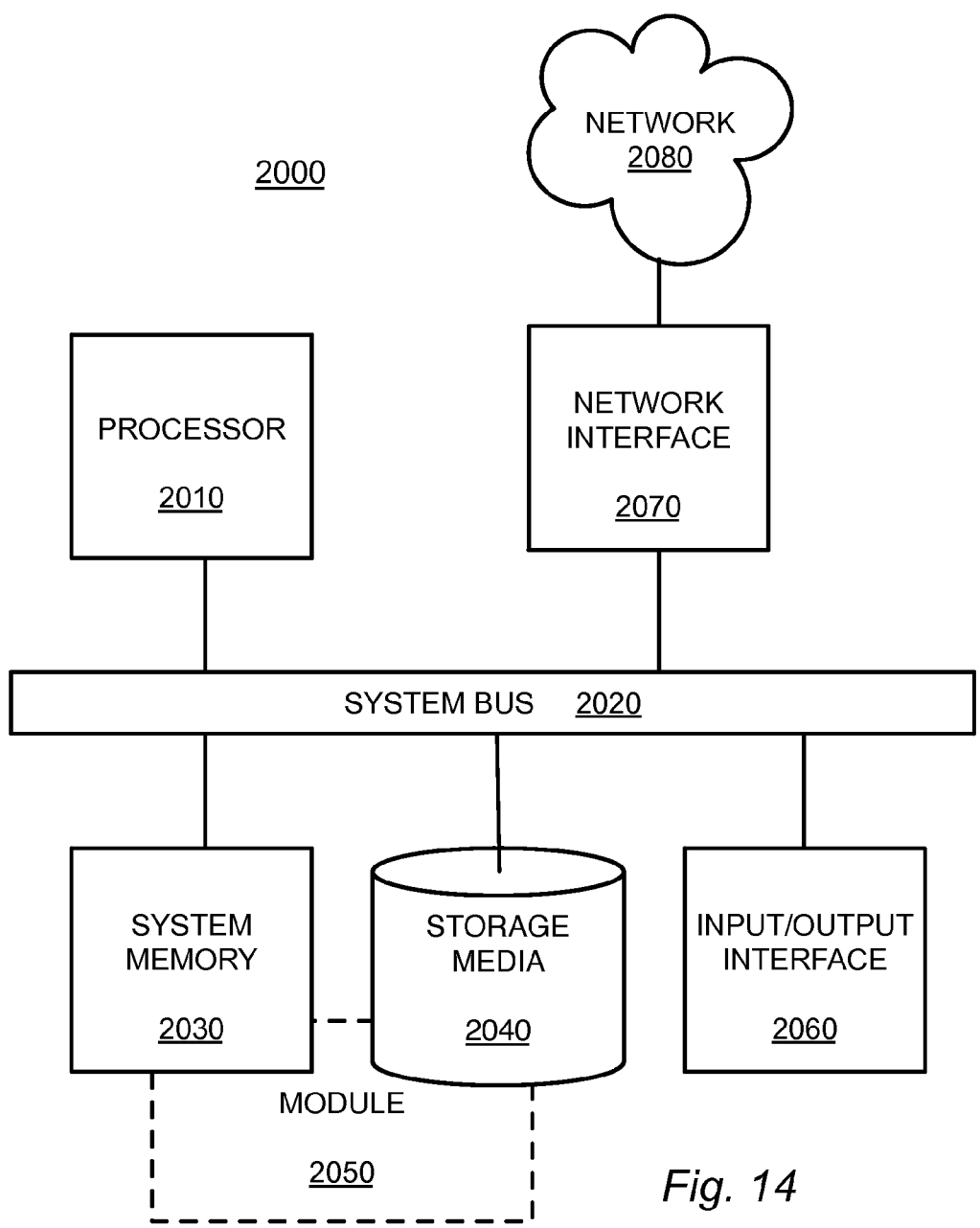
FIG. 14 is a block diagram depicting a computing machine and a module in accordance with one or more embodiments presented herein.

The wireless devices 110, sensors 120, signal analysis system 130, console 140, or any other systems associated with the technology presented herein may be any type of computing machine such as, but not limited to, those discussed in more detail with respect to FIG. 14. Furthermore, any modules associated with any of these computing machines or any other modules (scripts, web content, software, firmware, or hardware) associated with the technology presented herein may by any of the modules discussed in more detail with respect to FIG. 14. The devices and computing machines discussed herein may communicate with one another as well as other computer machines or communication systems over one or more networks such as network 150. The network 150 may include any type of data or communications links or network technology including any of the network technology discussed with respect to FIG. 14.

Figure 2:
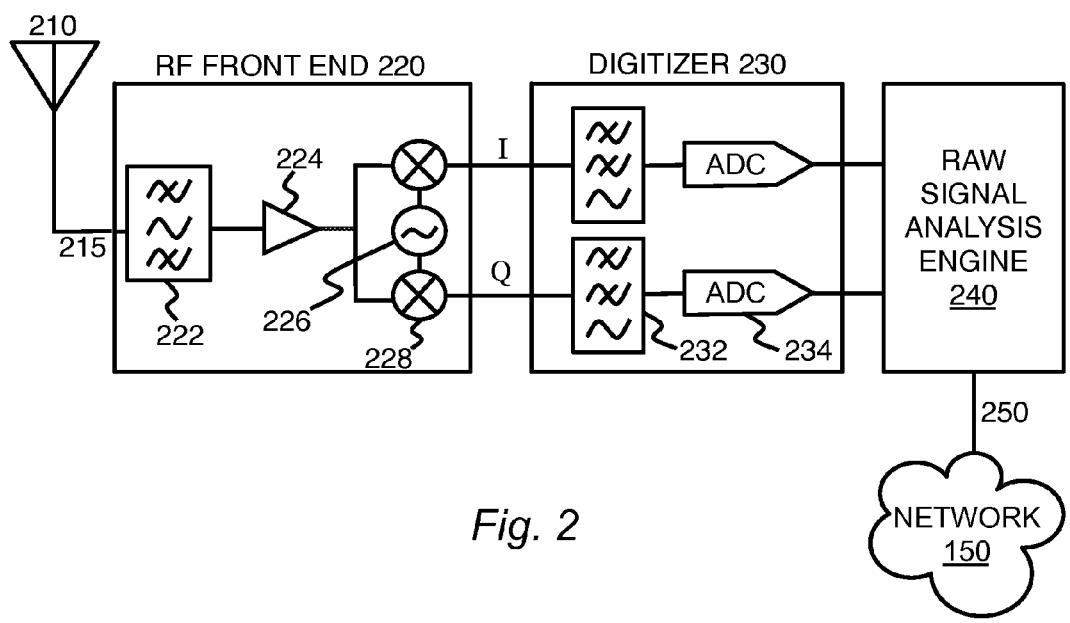
FIG. 2 is a block diagram depicting a sensor incorporating a software-defined radio receiver in accordance with one or more embodiments presented herein.

FIG. 2 is a block diagram depicting a sensor 120 incorporating a software-defined radio receiver in accordance with one or more embodiments presented herein. An antenna 210 may receive a radio frequency signal 215. The radio frequency signal 215 may be coupled into a radio frequency front end 220. The radio frequency front end 220 may condition the radio frequency signal 215 to generate an analog output signal. The analog output signal may comprise in-phase and quadrature components referred to as I and Q signals. The analog output from the radio frequency front end 220 may be coupled to a digitizer 230. The digitizer can output data that is a digital representation of the analog output generated by the radio frequency front end 220. The digital representation may be sampled in time and quantized in amplitude. The digital representation may also comprise separate I data and Q data. A raw signal analysis engine 240 may receive and process the raw digital representation generated by the digitizer 230. A raw signal analysis output 250 may be the results of processing associated with the raw signal analysis engine 240. The raw signal analysis output 250 may be communicated onto the network 150 for further processing.

The antenna 210 may be used to collect a broad range of radio frequency signals from the electromagnetic environment for analysis. The antennas 210 may use various antenna geometries. According to certain examples, the antennas 210 may be monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 210 can be located in various locations around a room, around a building, or within different areas or floors of a building.

According to certain example embodiments of the radio frequency front end 220, a radio-frequency band-pass filter 222 can select a channel, or a frequency range, from the radio frequency signal 215. A low noise amplifier 224 may be used to increase the amplitude of the signal from the selected channel. A signal from a variable-frequency oscillator 226 may be combined, or mixed, with the radio frequency signal by a mixer 228. Mixing the radio frequency signal with both the signal from a variable-frequency oscillator 226 and an out-of-phase copy of the oscillator output may be used to generate both in-phase and quadrature (I and Q) components. The frequency of the variable-frequency oscillator 226 may be tuned to down-convert the radio frequency signal to a lower frequency such as baseband, an intermediate frequency, or some other local oscillator frequency.

According to certain example embodiments of the digitizer 230, a low-pass filter 232 may be applied to the I and the Q signals from the radio frequency front end 220. The low-pass filter 232 may be useful as an anti-aliasing filter before digitizing the signal. An analog to digital converter (ADC) 234 can convert the continuous, analog signal into a digital value that represents a time sampling of an amplitude associated with the continuous signal. The sampling may be quantized in amplitude and may be periodic in time. The mathematical inverse of this sampling period may be referred to as the sampling frequency. The output of the ADC 234 may be a sampled sequence of digital values that have been converted from a continuous-amplitude and continuous-time analog signal to a discrete-amplitude and discrete-time digital signal. According to certain embodiments, both I and Q signal components may be separately filtered and converted. Accordingly, there may be two separate low-pass filters 232 and two separate analog to digital converters 234.

The raw signal analysis engine 240 may be implemented in software, firmware, programmable logic, or other such flexible technology. Accordingly, the raw signal analysis engine 240 may be considered as (all, or part of) the software portion of the software-defined radio receiver. The raw signal analysis engine 240 can process a digital representation of the raw collected radio frequency signal 215. The raw signal analysis engine 240 may receive digital I and Q signal samples from the digitizer 230. The received samples may be processed and refined to a discrete set of feature vectors. A signal feature vector may be a set of values representing attributes of the signal. The attribute information can describe one or more signal features of a communicated signal within the radio frequency signals. Feature vectors may be passed from one stage of analysis or processing to another. At each step, attributes may be added or subtracted from the feature vector further refining the attributes of the particular signal. Such refinement of the feature vector may support identifying, classifying, or otherwise interpreting the content of the signal. During this hierarchical and/or iterative interpretation of the signal various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth. It should be understood that the feature vectors may be processed and re-processed by the raw signal analysis engine 240 any number of times in order to refine description of signal contents from the collected radio frequency signal 215.

The raw signal analysis engine 240 may generate a raw signal analysis output 250. The raw signal analysis output 250 may be a condensed collection of intelligible features and data as identified within the collected radio frequency signal 215. According to one or more embodiments, the signal data may be processed and refined into feature vectors that define various attributes of the signal. The raw signal analysis output 250, including such feature vectors, may be transmitted onto the network 150 for further processing and analysis. This processing and analysis may be carried out in association with the signal analysis system 130.

It should be appreciated that aspects of the receiver presented herein may be programmable, adjustable, or otherwise controllable. In addition to the software (or otherwise flexible) portion of the receiver, agility and configurability may be supported by elements of the radio frequency front end 220 and the digitizer 230 that are programmable, adjustable, or otherwise controllable. Parameters associated with these elements may include a pass-band of the bandpass filter 222, a gain of the low noise amplifier 224, a frequency of the oscillator 226, a cut-off response of the low-pass filter 232, a sampling rate of the ADC 234, and so forth.

It should be appreciated that while certain example sensors 120 presented herein may be software-defined radios, other example sensors 120 may be hardware-defined radios or simply hardware radios. Generally, a hardware radio is fixed to operate on predefined frequencies, bandwidths, modulation techniques, coding, protocols, and wireless communications standards. For example, a hardware radio may be specifically designed to receive one specific standard such as Wi-Fi signals, Bluetooth signals, or mobile telephone signals. In contrast, a software-defined radio may be reconfigurable using software to handle any number of different communication standards even custom or otherwise non-standards-driven wireless communications. It should be appreciated that a hardware radio is often highly integrated, specifically designed for its single purpose, and thus considerably less costly to implement than a software-defined radio. Accordingly, it may be said that there is a tradeoff between cost and flexibility when comparing hardware radios and software-defined radios. Software-defined radios are generally much more flexible but considerably more costly while hardware radios are generally less flexible but also less costly.

It should be appreciated that, according to certain embodiments, the sensors 120 presented herein as part of an electromagnetic monitoring and detection network may share hardware and/or software resources with production networks used by wireless devices 110 associated with end users. For example, a sensor 120 used for monitoring the electromagnetic environment may also be used to supply certain wireless communications features. According to certain examples, wireless communication components (such as wireless access points) that support wireless communications for a production network of an origination may integrate features and functionality presented herein for collecting electromagnetic signals for signature or threat analysis.

Figure 3:
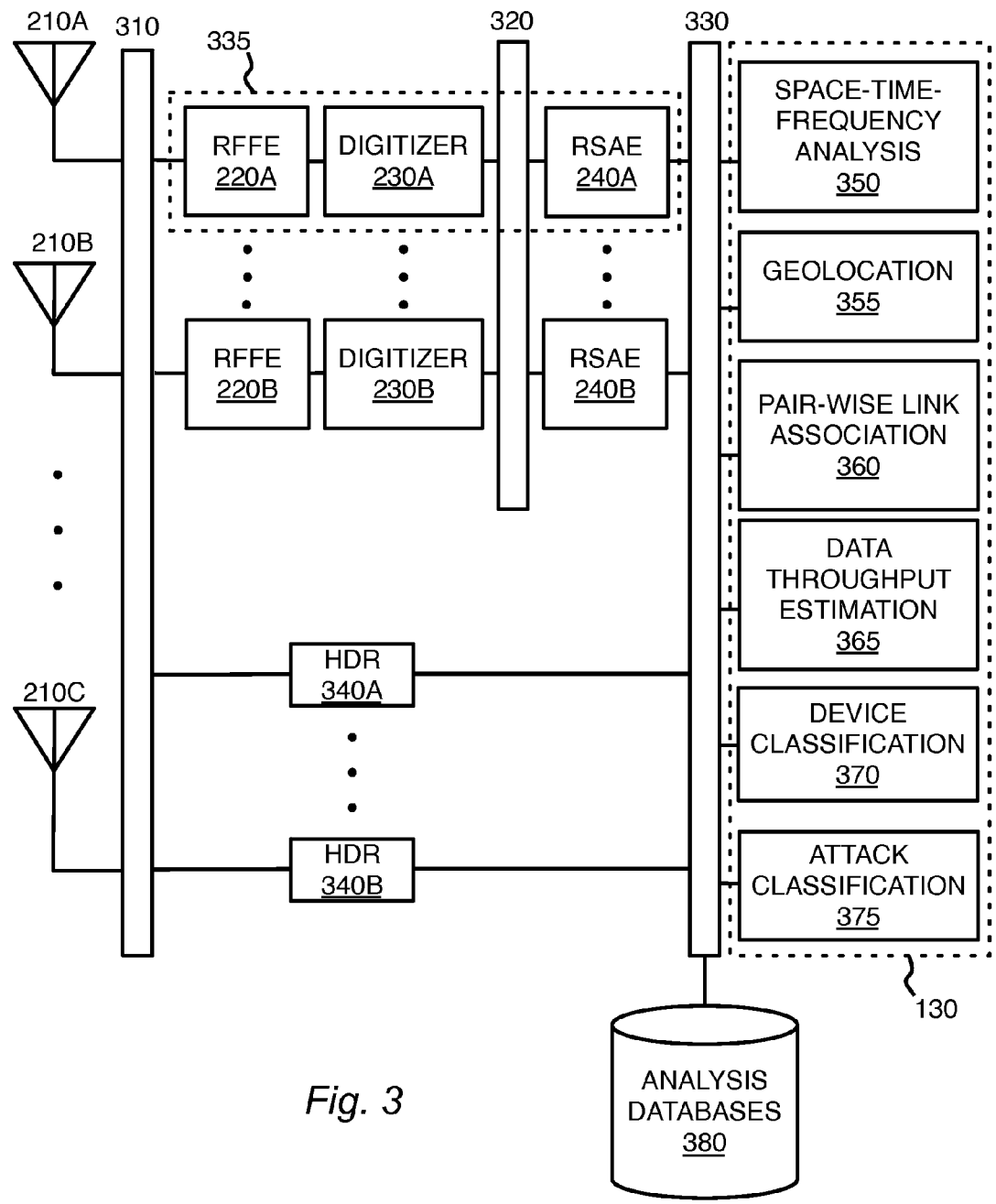
FIG. 3 is a block diagram depicting a processing architecture for electromagnetic signature analysis in accordance with one or more embodiments presented herein.

FIG. 3 is a block diagram depicting a processing architecture for electromagnetic signature analysis in accordance with one or more embodiments presented herein. A plurality of antennas 210 may be coupled to one or more receivers via an antenna signal-switching network 310. The receivers may comprise one or more software-defined radios 335. The receivers may also comprise one or more hardware-defined radios 340A-340B. The hardware-defined radios 340A-340B may be referred to, in general or collectively, as hardware-defined radios 340 or a hardware-defined radio 340. Each of the software-defined radios 335 may comprise a radio frequency front end 220, a digitizer 230, and a raw signal analysis engine 240. The raw signal analysis engines 240 may be coupled to the digitizers 230 via a raw digital signal switching network 320. The outputs of the receivers, both the software-defined radios 335 and the hardware-defined radios 340, may be coupled through one or more layers, or stages, of a signal feature vector network 330. Various modules associated with the signal analysis system 130 may further process these receiver outputs. These modules may include, for example, space-time-frequency analysis 350, geolocation 355, pair-wise link association 360, data throughput estimation 365, device classification 370, and attack classification 375. Operations of the raw signal analysis engine 240 and/or the various modules associated with the signal analysis system 130 may be supported by various analysis databases 380.

The antenna signal-switching network 310 can support switching and routing radio frequency signals 215 received by the antennas 210 to various radio receivers. Accordingly, the antenna signal-switching network 310 may be referred to as an antenna feed network. The radio receivers may include both the software-defined radios 335 as well as the hardware-defined radios 340. The radio frequency signals 215 may be coupled from the antennas 210 using coaxial cable or other conductive transmission line or waveguide technology. The radio frequency signals 215 may also be coupled from the antennas 210 using radio frequency to optical converters, optical modulators, radio-over-fiber technology, or other techniques for transmitting the signal over optical fiber or other optical waveguides. The radio frequency signals 215 may be switched within the antenna signal-switching network 310 using mechanical switches, electro-mechanical switches, radio frequency switches, semiconductor switches, optical switches, electro-optical switches, or other signal path switching technology.

The antenna signal-switching network 310 can support switching and routing the radio frequency signals 215 from one particular antenna 210 between some or all of the receivers within the system. According to certain embodiments, the antenna signal-switching network 310 may be fully interconnected, wherein any of the antennas 210 may be switched to any of the receivers. According to certain other embodiments where the antenna signal-switching network 310 may support a lesser degree of interconnectivity, a subset of the antennas 210 may be switchable between a subset of the receivers. According to some embodiments, certain receivers may be directly coupled to certain antennas 210 without being switchable.

The antenna signal-switching network 310 may comprise various switching topologies such as matrix, crossbar, one-to-many, many-to-one, fan-out, sparse fan-out, star, ring, any other structure, or any combination thereof. The antenna signal-switching network 310 may be controlled manually or automatically by any of the computing machines or modules presented herein. The antenna signal-switching network 310 may comprise one or more direct radio frequency interconnections, one or more radio frequency signal switches, one or more radio frequency signal splitters, and various other mechanisms for switching and routing radio frequency signals.

One reconfiguration example associated with the antenna signal-switching network 310 may involve receiving a Bluetooth wireless signal. According to the example, upon determining that the particular radio frequency signal 215 detected at a particular antenna 210 contains a Bluetooth signal, the signal analysis system 130 may use the antenna signal-switching network 310 to redirect that particular radio frequency signal 215 from a software-defined radio 335 instead to a hardware-defined radio 340 specifically designed to receive and decode Bluetooth signals. Such automated reconfiguration may improve specialized decoding of the Bluetooth signal while also freeing resources within the software-defined radio 335 from tasks more efficiently suited to the appropriate hardware-defined radio 340. It should be appreciated that while Bluetooth was specified in this signal path reconfiguration example, the same benefits may apply to wireless communication modalities other than Bluetooth where an appropriate hardware-defined radio 340 is available to offload tasks from a software-defined radio 335.

It should also be appreciated that while the Bluetooth signal-path reconfiguration example used a Bluetooth signal received at a software-defined radio 335 to cue switching the radio frequency signal 215 to a hardware-defined radio 340, other example scenarios may involve a signal received at a hardware-defined radio 340 being used to cue switching the radio frequency signal 215 to a software-defined radio 335. For example, the radio frequency signal 215 may be redirected to a software-defined radio 335 that is capable of smart-antenna processing while the original hardware-defined radio 340 was configured to handle only one radio frequency input. Smart-antenna processing can combine the radio frequency signal 215 from two or more antennas 210. This may be referred to as beam forming, MIMO, and so forth. Multiple antenna sources may be combined in order to directionally discriminate the source wireless device 110 for a desired electromagnetic emission. Such directionality may be computationally obtained from multiple antenna sources instead of physically orienting a directional antenna. Directionality can support extracting a weak signal, differentiating a signal from various interferers, or otherwise improving reception of a signal that presented poorly at a single antenna 210 or even multiple original antennas 210. The antenna signal-switching network 310 can support matching the proper antennas 210 to the proper receiver inputs for optimizing smart-antenna processing. While one or more of the hardware-defined receivers 340 may be configured to support smart-antenna processing through multiple antenna inputs, the software-defined receivers 335 may inherently support smart-antenna processing through computationally combining the sampled signals from multiple digitizers 230 during the software portion of the receiver operation.

The antenna signal-switching network 310 may also incorporate one or more splitters. The splitters may be used to replicate the particular radio frequency signal 215 a number of times for distribution to two or more receivers. For example, a hardware receiver 340 may be assigned to extract a Wi-Fi signal from the radio frequency signal 215 at the same time that a copy of the radio frequency signal 215 may be routed to a software-defined receiver 335 to process some other signals detected at the same antenna 210. According to certain embodiments, smart-antenna processing can cue combining of signals within the antenna signal-switching network 310. It should be appreciated that the number of antennas 210 and the number of receivers may not be the same. For example, there may be additional antennas 210 to allow a choice of which antennas 210 may be routed to the receivers through the antenna signal-switching network 310. According to other embodiments, there may be fewer antennas 210 than receivers, or the numbers may be similar or even the same.

The antenna signal-switching network 310 can support intelligent allocation of the radio frequency signal 215 from the various antennas 210 to the various receivers. For example, complicated signal analysis cases, or those requiring directional processing, may be routed to one or more software-defined receivers 335 while signals may be routed to efficient and inexpensive hardware-defined radios 340 where appropriate. The more flexible the antenna signal-switching network 310, the more optimally the signal processing allocation may be made between the various resources within the system.

The software-defined radios 335 generally comprising radio frequency front ends 220, digitizers 230, and one or more digital signal processing stages to computationally process outputs from the digitizers 230. The digital signal processing stages may include the raw signal analysis engines 240. The digital signal processing stages may also include one or more modules associated with the signal analysis system 130. These modules may include, among other example modules, space-time-frequency analysis 350, geolocation 355, pair-wise link association 360, data throughput estimation 365, device classification 370, and attack classification 375. It should be appreciated that in addition to the illustrated embodiment that separates the raw signal analysis engines 240 from the signal analysis system 130, various other embodiments may incorporate the raw signal analysis engines 240 with one or more of the modules associated with the signal analysis system 130. Such incorporated digital signal processing stages may be considered either (or both) part of the raw signal analysis engines 240 or part of the signal analysis system 130 without departing from the scope or spirit of the technology presented herein.

The raw signal analysis engine 240 may receive digitally sampled I and Q signals from the digitizer 230. The raw signal analysis engine 240 can process this digital representation of the raw collected radio frequency signal 215 to generate a discrete set of feature vectors. For example, the raw signal analysis engine 240 may perform time-frequency analysis of the radio frequency signal 215 from a particular antenna 210. The time-frequency information from the radio frequency signal 215 may be encoded as a feature vector. For example, time-frequency bins may be defined and the spectral intensity of the radio frequency signal 215 corresponding to each time-frequency bin may be represented within the feature vector. The raw signal analysis engine 240 may also perform angle analysis where an angle dimension for the radio frequency signal 215 may be added to each feature vector. The raw signal analysis engine 240 may also perform modulation classification and signal decoding where feature vectors may be refined by appending dimensions representing additional features associated with modulation and decoded signal contents.

The raw digital signal switching network 320 can switch and route the outputs from one or more digitizers 230 to the inputs of one or more raw signal analysis engine 240. The output from each digitizer 230 may be a stream of digital I signal samples and digital Q signal samples. The I and Q samples may be communicated as two separate streams or as a single combined or interleaved stream. These streams may be routed to the appropriate raw signal analysis engines 240 at packetized data or as a clocked (or asynchronous) stream of parallel or serialized data. Switching and routing within the raw digital signal switching network 320 can allocate the output each digitizer 230 to the most appropriate and available raw signal analysis engine 240 according to one or more metrics such as route distance, resource capacity, performance, availability, cost, and so forth.

The signal feature vector network 330 can switch and route signal feature vectors between the raw signal analysis engines 240 and the various other modules associated with the signal analysis system 130. The signal analysis system 130 may comprise a signal aggregation and analysis engine comprised of one or more feature vector processors. The signal feature vectors may be transported within the signal feature vector network 330 as packetized data or streaming data. Generally, a signal feature vector may be a set of values representing attributes of a particular signal. In various embodiments, as a feature vector is passed from one processing module or stage to the next, attributes may be added or subtracted from the feature vector, further refining the attributes of the particular signal to better identify and/or classify the contents of the signal. Feature vectors may be appended for various feature attributes relevant to the processing at each module or processing stage. According to one particular example, a geolocation feature vector may indicate a feature vector that has geolocation features added to its set of attributes. The geolocation feature vector may include, the specific geolocation features of the signal, as well values indicating duration of the signal, bandwidth of the signal, angle of the signal, a modulation type of the signal, and so forth.

The radio frequency signals 215 captured form the electromagnetic environment by the sensors 120 may be used in detecting, classifying, and mitigating wireless attacks against one or more wireless devices 110. Various digital signal processing stages may be applied to the signals collected by the sensors 120. These digital signal processing stages may comprise modules of the signal analysis system 130 including one or more raw signal analysis engines 240. Various sensor mesh architectures comprising the sensors 120, the antenna signal-switching network 310, the raw digital signal-switching network 320, and the signal feature vector network 330 can support collecting and appropriately transporting signals from the electromagnetic environment for signature and wireless threat analysis. Similarly, various processing architectures comprising modules of the signal analysis system 130 including one or more raw signal analysis engines 240 can support the various processing states of these signals for signature and wireless threat analysis.

The signal analysis system 130 can aggregate and process the various radio frequency signals 215 captured form the electromagnetic environment by the sensors 120. Example modules of the signal analysis system 130 may include space-time-frequency analysis 350, geolocation 355, pair-wise link association 360, data throughput estimation 365, device classification 370, and attack classification 375. It should be appreciated that the various modules of the signal analysis system 130 may receive sampled signals and/or signal feature vectors from one or more software-defined radios 335. Similarly, any data, packets, signal levels, channel parameters, error conditions, or other parameters obtained by one or more hardware-define radios 340 may be relayed to the various modules of the signal analysis system 130 for processing. Since a hardware-defined radio 340 may perform its own raw signal analysis and output information specific to its design, outputs from various hardware-define radios 340 may be translated to radio-specific signal feature vectors. These particular signal feature vectors may be limited by the particular output space of any given hardware-define radio 340.

The analysis databases 380 may include, among various other examples, signal databases, sensor position databases, calibration databases, signal signature databases, and attack databases. One or more of the signal processing and threat analysis stages of the signal analysis system 130, including the raw signal analysis engines 240, may leverage the analysis databases 380. The analysis databases 380 may contain various forms of information useful in analyzing the radio frequency signals collected by the sensors 120. Portions of the information within the analysis databases 380 may be preinstalled at the purchase, installation, or configuration of the sensors 120, the signal analysis system 130, and/or other systems supporting the technology presented herein. Portions of the information within the analysis databases 380 may be configured in the field. Such configuration may be performed manually, or autonomously through automated learning, tuning, or adaptation procedures. Portions of the information within the analysis databases 380 may be updated from time to time from a central provider, from backups, or from other installations. One or more central providers may receive related information that was learned or adapted in fielded installations. The received information may be incorporated into periodic updates provided by the central provider to the various fielded installations of the technology presented herein.

The raw signal analysis engine 240, signal analysis system 130, systems associated with the analysis databases 380, or any other systems associated with the technology presented herein may be any type of computing machine such as, but not limited to, those discussed in more detail with respect to FIG. 14. Furthermore, any modules (such as those associated with space-time-frequency analysis 350, geolocation 355, pair-wise link association 360, data throughput estimation 365, device classification 370, or attack classification 375) associated with any of these computing machines or any other modules (scripts, web content, software, firmware, or hardware) associated with the technology presented herein may by any of the modules discussed in more detail with respect to FIG. 14. The computing machines discussed herein may communicate with one another as well as other computer machines or communication systems over one or more networks such as the antenna signal-switching network 310, the raw digital signal-switching network 320, and the signal feature vector network 330. It should be appreciated that the antenna signal-switching network 310, the raw digital signal-switching network 320, and the signal feature vector network 330 may be associated with or share resources with the network 150. These networks may include any type of data or communication links or networks including any of the network technology discussed with respect to FIG. 14.

Figure 4:
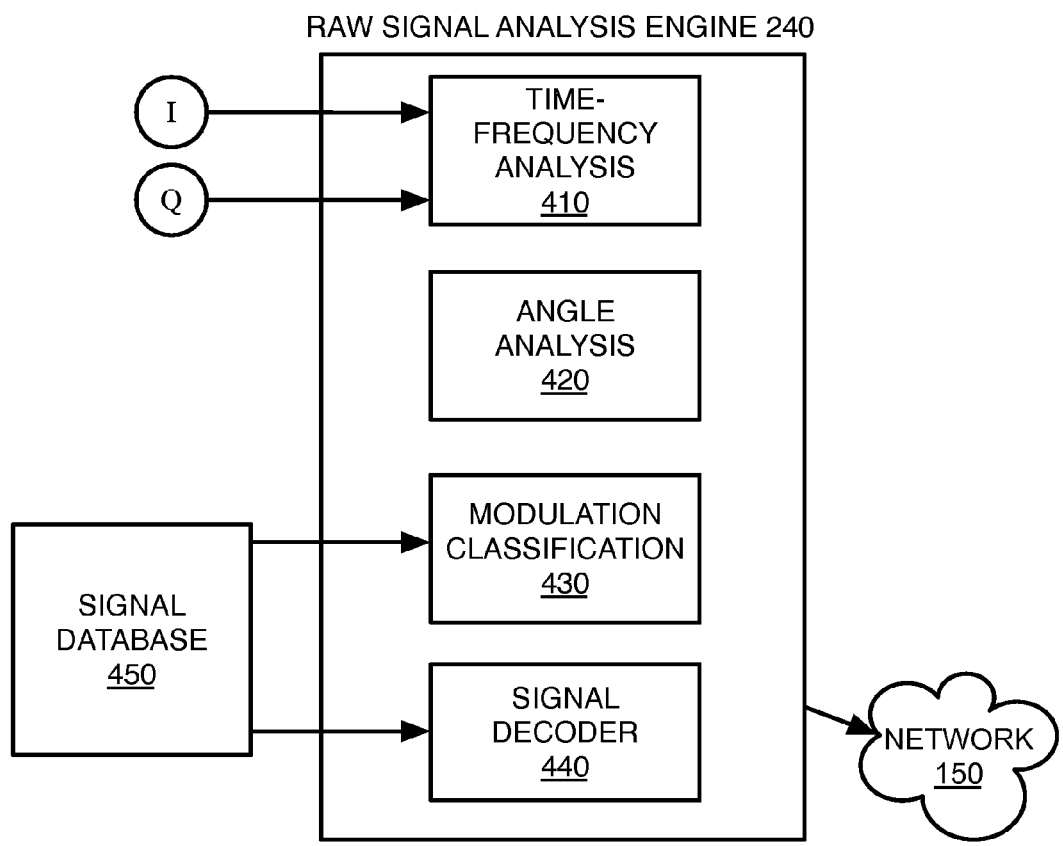
FIG. 4 is a block diagram depicting a raw signal analysis engine in accordance with one or more embodiments presented herein.

FIG. 4 is a block diagram depicting a raw signal analysis engine 240 in accordance with one or more embodiments presented herein. The raw signal analysis engine 240 may receive digital I and Q signal samples for processing. Processing modules of the raw signal analysis engine 240 may include, among other examples, time-frequency analysis 410, angle analysis 420, modulation classification 430, and signal decoding 440. The processing modules, particularly the modulation classification module 430, and the signal decoding module 440, may leverage a signal database 450. Outputs from the raw signal analysis engine 240 may be communicated onto the network 150.

Once received by the raw signal analysis engine 240, the digital I and Q signal samples may be processed and refined to a discrete set of feature vectors. It should be understood that the feature vectors may be processed and re-processed by the various modules associated with the raw signal analysis engine 240 any number of times before being transmitted to the other modules of the signal analysis system 130.

The time-frequency analysis module 410 can generate a set of frequency-domain data vectors for each radio frequency signal 215. The spectrum intensity for each time-frequency bin associated with the frequency-domain data vectors may be encoded as dimensions of feature vectors for each of the radio frequency signals 215.

The time-frequency analysis module 410 can perform a moving window process where N time samples are selected to be processed. The value of N may be adjusted to optimize performance. A fast Fourier transform (FFT) may be computed for the N samples of the window. The FFT output may represent the spectral energy content of the window. The FFT of a vector of samples x may be defined by the matrix-vector product $y=Qx$, where the $(i,k)$ element of $Q$ is $\exp(-2*pi*i*k*j/N)$ and j is the square root of negative one. As new samples of the input signal arrive, the moving window may slide by K samples to a new set of N samples. The value of K may be optimized to maximize the system performance. According to one example, such optimization may be accomplished with a Monte Carlo approach where various values of N and K are tested on a reference signal set and the values of N and K that maximizes a system performance objective function may be selected for used. The system performance objective function may be an aggregation of performance various metrics. These metrics may include, among other examples, signal detection accuracy, modulation classification accuracy, malicious/benign classification accuracy, attack classification accuracy, or processing speed. The output of the FFT may be a sequence of P frequency-domain data vectors $y_p$. The collection of these data vectors can be plotted to show the time-frequency energy in the RF environment. This plot is commonly referred to as a spectrogram.

The time-frequency analysis module 410 can perform energy clustering and association. The frequency-domain data vectors from the FFT may be evaluated for each radio frequency signal 215 received at each respective antenna 210. Each radio frequency signal 215 may contain multiple signals received at the associated antenna 210. Energy clustering and association can perform a clustering analysis on each set of frequency-domain data vectors to determine discrete contiguous blocks of signal that are likely to have been transmitted from the same device. Clustering algorithms such as k-nearest neighbors (KNN), hierarchical clustering, expectation maximization, or any others may be used to perform the clustering. Spectrum feature extraction may be performed on each cluster. Spectrum feature extraction can analyze the clusters to extract a set of signal features including, but not limited to, duration, bandwidth, center frequency, duty cycle, and average power.

As an example of cluster analysis, each cluster can be considered a set of points in the multi-dimensional feature space. The objective of the cluster analysis can be to determine the representative characteristics of the signal that corresponds to each cluster. Accordingly, statistical measures such as the mean, median, or mode of each dimension may be calculated and then taken to represent the signal as that feature dimension. Each cluster can make up a discrete instance of a feature vector. Each feature vector includes one or more of the feature values that implicitly characterize the signals in the environment. Feature vectors created by the time-frequency analysis module 410 may be the inputs to the angle analysis module 420.

It should be appreciated that spectrum feature extraction performed by the time-frequency analysis module 410 may be a similar operation as the feature extraction performed by the space-time-frequency analysis module 350. However, the space-time-frequency analysis module 350 may be configured to cull the disparate refined feature vectors from multiple radio frequency signal 215 (from multiple antennas 210) where the multidimensional cluster of points in feature space may be statistically analyzed to extract a representative value in each feature vector. According to various embodiments, the space-time-frequency analysis module 350 preforms an analysis similar to the time-frequency analysis module 410, but does so with multiple refined feature vectors.

The angle analysis module 420 can add an angle dimension to each feature vector. The result is a feature space that also includes an angle dimension since the feature vector is amended to include an angle estimate. The angle analysis module 420 can estimate an orientation (defined, for example, by one or more angles) of a position for a wireless device 110 acting as a radio source associated with the received signal. The angle analysis module 420 can sweep through a range of antenna phases. Various phase combinations of the antennas 210 may be used in order to discriminate the source of an emission by an angle relative to the antennas 210. For example, a complex-valued sample may be taken from the frequency-domain data vectors of each of L antennas 120. A vector z may be formed of these samples. A linear combination of the elements of z may be defined by multiplying by a point vector w(a) that is a function of the angle of interest, a. The resulting vector product w(a) z is a scalar value that indicates the intensity of the time-frequency energy in the angle direction a. According to particular embodiments, by sweeping through a range of a values, the angle analysis module 420 can determine an energy over a space-time-frequency (STF) data cube. Angle interference suppression may be performed on the STF data cube to filter out irrelevant RF signals. The angle analysis module 420 can then perform angle clustering and association on the filtered data cube. Angle clustering and association can refine the feature vector based on the angle information. The resulting updated set of feature vectors may be referred to as angle feature vectors. Each angle feature vector can include characteristics about each signal, such as duration, bandwidth, center frequency, duty cycle, average power, and angle.

The modulation classification module 430 can compare the angle feature vectors to features of a library of known signals. The known signals may be retrieved from the signal database 450. The modulation classification module 430 can perform classifications of detected features by matching the received feature vector to a feature vector of a known signal. The matching may seek to minimize a distance metric within a multidimensional feature space. Various alternative distance metrics may be used including, among multiple other examples, Euclidean distance, weighted-sum distance, min-max distance, and so forth. The choice of distance metric may be a parameter of the system this can be optimized to maximize performance. Such matching may also be referred to as correlating data samples associated with the communicated signal to known modulation characteristics within the updatable signal signature database 450. Outputs from the modulation classification module 430 may be angle feature vectors that also include modulation types. These may be referred to as modulation feature vectors.

The signal module 440 can decode messaging layer content from modulation feature vectors. Generally, decoding payload data from the wireless devices 110 may be avoided to protect private or personal information. Instead, the signal decoder module 440 may decode unencrypted control information such as handshaking messages (for example, FIN, ACK, FIN ACK, and so forth). The signal decoder module 440 may decode handshaking messages to identify devices using common medium access signals like the MAC address of a device. Upon examining a received feature vector, the signal decoder module 440 may retrieve appropriate codecs and drivers from the signal database 450 for decoding the signal. The signal decoder module 440 can decode information features by identifying a corresponding physical layer template or signature from the updatable signal signature database 450. The signal decoder module 440 can decode communication symbols, for example information modulated within a transmitted signal, from the data samples, or other information associated with the collected signals, from one or more feature vectors. The signal decoder module 440 can decode information features by identifying a corresponding medium access layer template or signature from the updatable signal signature database 450. Outputs from the signal decoder module 440 may include additional features (such as information features also known as data or payload features) to be appended to the received modulation feature vectors. The additional features may include decoded content represented, for example, as a binary sequence or other symbols.

The signal database 450 may provide a library of known signals to the raw signal analysis engines 240. According to certain embodiments, a feature vector of a known signal may be matched against or correlated to a received feature vector to classify modulation types and other parameters associated with the received signal. The signal database 450 may also provide codecs and drivers to the raw signal analysis engines 240. The codecs and drivers may be used for decoding content of the received signal once its modulation type has been classified. It should be appreciated that the signal database 450 may be provided as one of the analysis databases 380.

Outputs from the raw signal analysis engines 240 may comprise a set or stream of refined feature vectors. These feature vectors may have been refined from the received digital I and Q signal samples though one or more iterations of processing by the various modules associated with the raw signal analysis engine 240. The outputs from the raw signal analysis engine 240 may be communicated onto the network 150 to be further processed through the other modules of the signal analysis system 130. The network 150 may comprise one or both of the raw digital signal-switching network 320 and the signal feature vector network 330.

Figure 5:
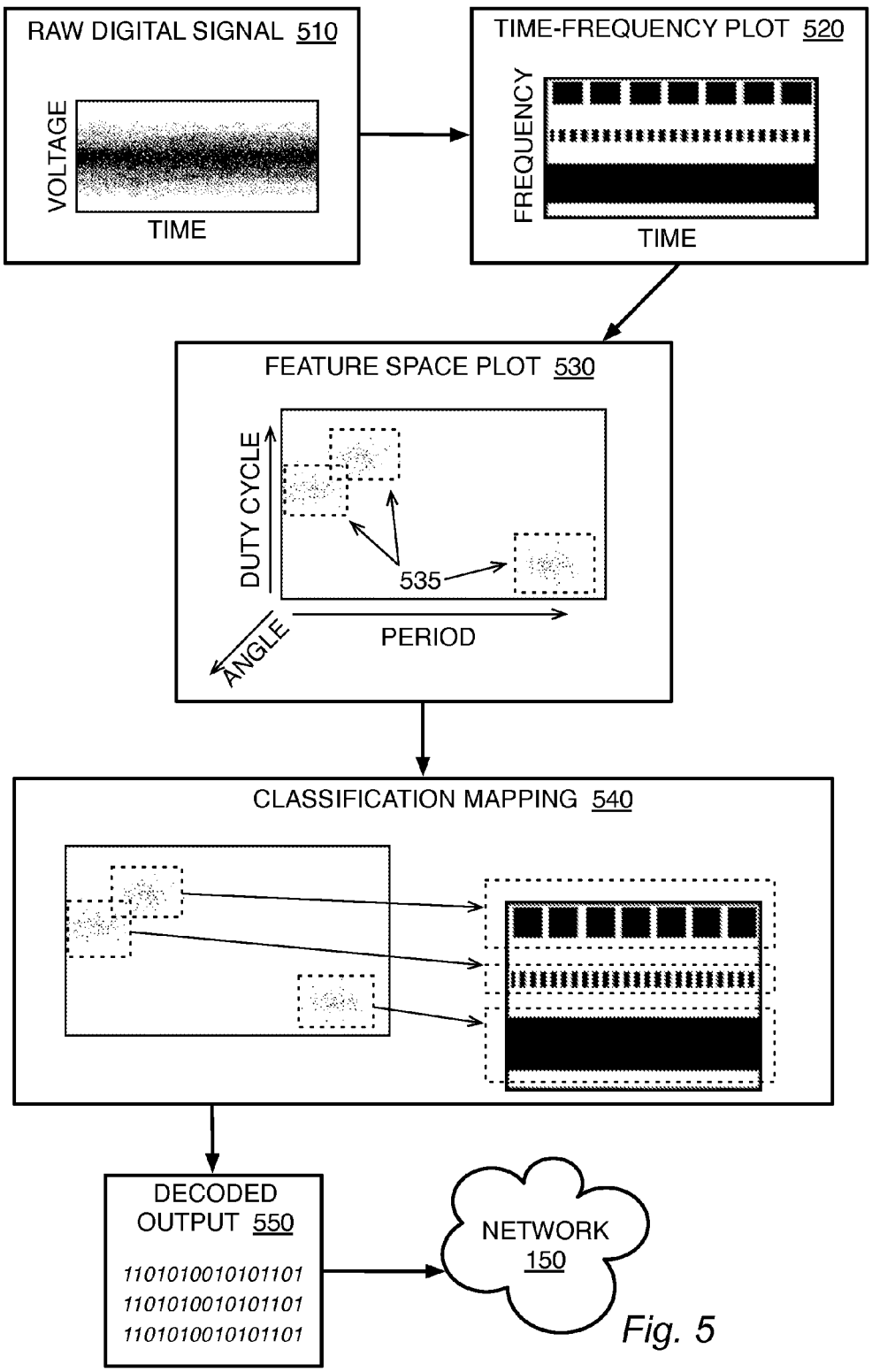
FIG. 5 is a block diagram depicting signal visualization within a raw signal analysis engine in accordance with one or more embodiments presented herein.

FIG. 5 is a block diagram depicting signal visualization within a raw signal analysis engine 240 in accordance with one or more embodiments presented herein. Signal processing flow within the raw signal analysis engine 240 may be visualized as time-frequency plots 520, feature space plots 530, and classification mappings 540. Visualization of feature space plots 530 can include vector clusters 535. A decoded output 550 associated with the raw signal processing may be communicated within feature vectors onto a network 150. The generated feature vectors may incorporate various characteristics of the original received RF signals as provided by the raw signal analysis engine 240.

Receivers, such as one or more software-defined radios 335, may provide in-phase and quadrature (I and Q) data to the raw signal analysis engine 240. The I and Q data may be provided as a sequence of complex-valued samples that arrive at the sample rate associated with the receiver. There may be a sequence of I and Q data for each antenna associated with the receiver. The I and Q data may be visualized using the raw digital signal plot 510. The raw digital signal plot 510 can visualize a signal amplitude (such as voltage, current, power, or so forth) as a function of time. The raw digital signal plot 510 can visualize the real and imaginary parts of the I and Q data.

The I and Q data each antenna may be received by the time-frequency analysis module 410. The time-frequency analysis module 410 can generate time-frequency data from the I and Q data. A time-frequency plot 520 may be used to visualize the time-frequency data. The time-frequency plot can show signal intensity (such as energy or amplitude) as a function of frequency and time.

Feature vectors associated with the received signals may be generated through analysis of the time-frequency data. The feature vectors may be visualized within a feature space plot 530. The feature space plot 530 can show the feature vectors in an appropriate feature space. According to the illustrated example, the feature space of the feature space plot 530 is duty cycle against period.

Feature vector clusters 535 may be identified among the feature vectors analyzed within their appropriate feature space. Example feature vector clusters 535 are illustrated within the feature space plot 530. It should be appreciated that while the example illustrated feature space plot shows three feature vector clusters, any number of cluster may be present and identified with the received signals.

The angle analysis module 420 can analyze the time-frequency data to obtain angle data associated with the received signals. The estimated angle data may be updated into the feature vectors. This additional data may be visualized as an added angle dimension within the feature space plot 530.

The modulation classification module 430, can match angle feature vectors for each received signal to a known or abstracted modulation template within signal database 450. A classification mapping 540 may be used to visualize the mapping of feature vector clusters 535 to regions within the associated time-frequency plot 520 according to classification of modulation present within the received signals.

The signal decoding module 440 can process the feature vectors associated with the received signals to obtain a decoded output 550. The decoded output 550 may comprise binary sequences associated with payload or control signaling present within the received signals. These sequences may be updated into the refined feature vectors to be passed over the network 150.

Figure 6:
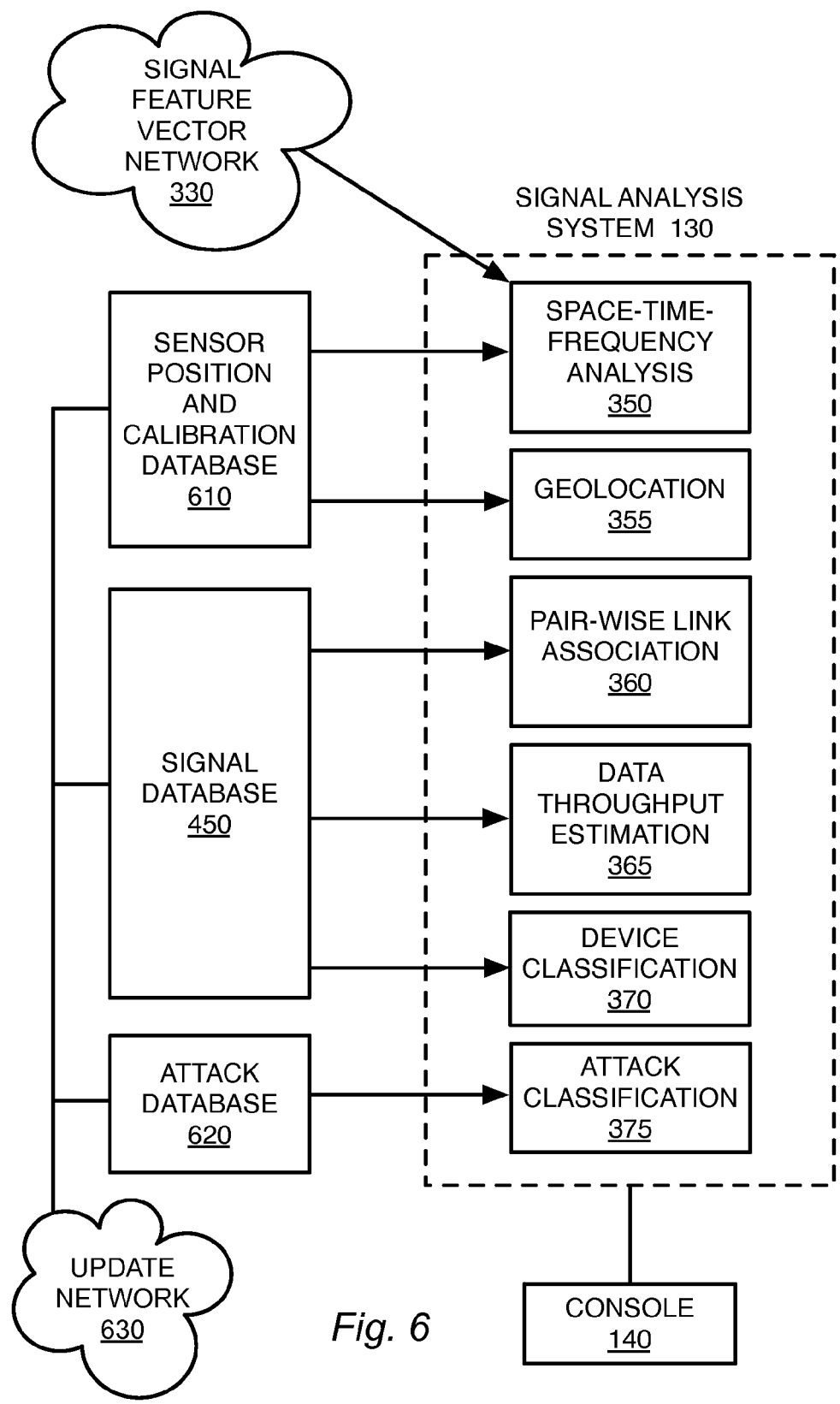
FIG. 6 is a block diagram depicting electromagnetic signature analysis within a wireless internet of things in accordance with one or more embodiments presented herein.

FIG. 6 is a block diagram depicting electromagnetic signature analysis within a wireless internet of things in accordance with one or more embodiments presented herein. Signal feature vectors generated by the receivers may be communicated through a signal feature vector network 330 to a signal analysis system 130. Various modules associated with the signal analysis system 130 may further process these receiver outputs. These modules may include, for example, space-time-frequency analysis 350, geolocation 355, pair-wise link association 360, data throughput estimation 365, device classification 370, and attack classification 375. These modules may be supported by various analysis databases 380 such as a sensor position and calibration database 610, a signal database 450, and an attack database 620. These analysis databases 380 may be updated over an update network 630. A console 140 can provide a user interface for configuring, controlling, or reviewing analysis results associated with the signal analysis system 130.

The signal feature vector network 330 can switch and route signal feature vectors from the raw signal analysis engines 240 to the signal analysis system 130. The signal analysis system 130 may comprise a signal aggregation and analysis engine comprised of one or more feature vector processors. The signal feature vectors may be transported within the signal feature vector network 330 as packetized data or streaming data. It should be appreciated that the signal feature vector network 330, along with the antenna signal-switching network 310 and the raw digital signal-switching network 320, may be associated with or share resources with the network 150.

The signal analysis system 130 can aggregate and process the various radio frequency signals 215 captured form the electromagnetic environment by the sensors 120. Example modules of the signal analysis system 130 may include space-time-frequency analysis 350, geolocation 355, pair-wise link association 360, data throughput estimation 365, device classification 370, and attack classification 375. It should be appreciated that the various modules of the signal analysis system 130 may receive sampled signals and/or signal feature vectors from one or more receivers such as the software-defined radios 335 and/or the hardware-defined radios 340.

The space-time-frequency analysis module 350 can process refined feature vectors from multiple sensors 120 and match them up to a common reference frame. The space-time-frequency analysis module 350 can also resolve redundant signal detection when the same signal is detected at more than one sensor 120.

The space-time-frequency analysis module 350 can perform signal clustering and association. Feature vectors from multiple sensors 120 may be clustered into common groups. Clustering may be supporting using a k-nearest neighbors (KNN) algorithm, a hierarchical clustering algorithm, an expectation maximization algorithm, or any other clustering algorithm. A specific clustering algorithm may be chosen to maximize system performance. For example, a Monte Carlo approach may be used to evaluate multiple clustering algorithms against a reference signal set to select the clustering algorithm that maximizes a particular system performance objective. The system performance objective function may be an aggregation of performance metrics including signal detection accuracy, modulation classification accuracy, attack classification accuracy, and processing speed.

The space-time-frequency analysis module 350 can perform feature extraction. Feature extraction can cull disparate refined feature vectors from multiple sensors 120 into an aggregate feature vector that represents all of (or a significant portion of) the information about wireless devices 110 in the environment with minimal, or significantly reduced, redundancy. Certain dimensions of aggregated feature vectors may provide identical valued across multiple sensors 120. These may include duration, bandwidth, center frequency, and duty cycle, among others. Certain other dimensions of aggregated feature vectors may be maintained as a list of potentially disparate values, with each value corresponding to a single sensor 120. For instance, the dimensions of the aggregate feature vectors representing a power and an angle of a signal may vary across sensors 120.

The geolocation module 355 can estimate positions of interest. Determining the position, or relative positions, of wireless devices 110, other entities, or associated signals may be referred to as geolocating, localization, positioning, geographical locating, and other similar terms. Localization over time can support modeling or estimation of motion including direction, velocities, accelerations, and other parameters. The geolocation module 355 can receive the aggregate feature vector set. Geolocating signals in an environment that is dense with other signals and contains complex propagation effects like multipath and Doppler shift can present several challenges. To aid in estimate the position of each signal, propagation modeling may leverage a database of sensor positions and various parameters associated with the propagation environment. The database may be populated through various possible calibration techniques. According to a particular example, the calibration may involve transmitting from wireless devices 110 with known positions. Each sensor 120 can record the received power of each of the reference emissions from the wireless devices 110 with known positions. From all of the known values, a parametric fit for the unknown propagation values may be performed. According to one example of this approach, the collected receiver power from the $i^{th}$ reference emitter received by the $r^{th}$ sensor 120 may be represented as:

$$P_{i,r} = a/d_{i,r}^n$$

where a and n are the unknown calibration parameters to be estimated and $d_{i,r}$ is the known distance between the $i^{th}$ reference emitter wireless device 110 and the $r^{th}$ sensor 120. When the number of sensors 120 is given as R and the number of reference emitter wireless devices 110 is given as I, then the calibration process results in R×I equations in two unknowns. Various optimization methods may be used to solve for the unknowns including, but not limited to, least-squares estimation, minimum-mean-square estimation, constrained optimization, and so forth.

Propagation modeling functionality of the geolocation module 355 may leverage the calibration parameters, signal power and angle values, and a coordinate system of locations for the sensors 120 to calculate a forward model of the expected power and angle values for sample points in space. According to particular embodiments, the model values may be used to create an initial geolocation estimate using multilateration techniques. The initial geolocation estimate may be used to seed a model-matching filter. The model-matching filter can evaluate multiple aggregated feature vectors in series. For each aggregate feature vector, the model-matching filter may initialize an ensemble of hypothesized signal source positions around the initial seed position. In an iterative process using the model values, a tighter estimate of the aggregate feature vector position may be generated for the wireless device 110 being located. As part of each iteration, hypothesized positions that do not fit the model may be removed. After a sufficient number of iterations, the position estimate for the aggregate feature vector may converge to a single point. This approach may be repeated for all aggregate feature vectors.

Model localization may use a similar technique of hypothesized positions, however the hypothesis set may also include a range of time steps. Multiple iterations of hypothesized trajectories (or tracks) may be examined where prior information about the likelihood of each trajectory may be considered in the model. By filtering out unlikely tracks, a track may be converged that best fits the data. For example, it is likely that a mobile device will be traveling at 2 m/s, but it is unlikely that it will be traveling at 200 m/s. Accordingly, a track indicating an aggregate feature vector from a mobile device traveling at 200 m/s may be filtered out of the model. Resultant geolocation track data for localization may be incorporated into the aggregate feature vector to create a feature vector that includes location data.

The pair-wise link association module 360 may determine a link pair of wireless devices 110. Generally a signal emanates from a source wireless device 110 and is intended for one or more destination wireless devices 110. The emitting device and a receiving device may constitute a link pair. Information about link pairings may be useful in inferring the behavior and intent of wireless devices 110 within a network.

Modulation association may be implemented within the pair-wise link association module 360. Generally, wireless devices 110 within a wireless network participate in pair-wise links between devices. The pair-wise link association module 360 can infer these pair-wise links from observed wireless features such as modulation, position, space-timefrequency occupancy, and so forth. Modulation association can analyze modulation feature information to calculate a likelihood that any pair of wireless devices 110 are communicating with one another.

Pair-wise links may also be determined by examining decoded message contents. For example, Wi-Fi header fields explicitly indicate a destination MAC address. When it is not clear from the decoded signal which pairs of wireless devices 110 is communicating, then space-time-frequency association may be used to perform a more nuanced evaluation for likely communication pairs. Signal pairing mechanisms such as time division duplexing (TDD), frequency division duplexing (FDD), or space division duplexing (SDD) may indicate communicating pairs of wireless devices 110. Space-time-frequency feature information for each geolocation feature vector may be used to determine which signals could feasibly be communicating with one or more known duplexing schemes. For example, if a first geolocation feature vector and a second geolocation feature vector both occupy the same frequency, but never at an overlapping time, it may be inferred that the wireless devices 110 associated with those vectors may be a communicating pair using TDD. Feature vectors successfully evaluated by the pair-wise link association module may be appended with a new set of feature vectors that contain the pairwise link information. These may be referred to as pairwise feature vectors.

The data throughput estimation module 365 can estimate an amount of data in each pairwise feature vector. Even when signal content data is not directly decoded, its spectral occupancy may serve as a proxy for the amount of data that is being passed through each link wireless devices 110 associated with each pairwise feature vector. This estimation may occur on two levels. The first level, spectrogram analysis, can use Shannon's capacity formula $$C=B \log(1+SNR)$$

to bound the maximum amount of data transfer, where B is the occupied bandwidth and SNR is the signal to noise ratio. These two parameters may be estimated using the features estimated the signal analysis system 130. Specifically, B can be directly calculated from spectrogram analysis and SNR can be calculated from the average power and geolocation data. The second level, modulation and link analysis, can leverage a signal signature database containing data throughput values for various known signal modulation schemes. By pairing the modulation feature values included in the pair-wise feature vector with the signal signature database entries, modulation and link analysis can provide a reasonably accurate estimate of the data throughput for each pair-wise feature vector. An estimate of the data throughput for each signal may be added to each corresponding pair-wise feature vector. The amended pair-wise feature vector may now be referred to as a data throughput feature vector.

The device classification module 370 can classify wireless devices 110 as being either benign or malicious (also referred to as unauthorized or rogue). Devices classification can function to identify each pairwise feature vector as either benign or malicious. The device classification module 370 can perform signature matching, which attempts to match the signal and link features of each data throughput feature vector to known examples of benign and malicious devices in the signal signature database. The device classification module 370 can further perform anomaly analysis, which compares the features associated with each data throughput feature vector into an aggregate metric. If the aggregate metric exceeds one or more established anomaly thresholds the associated wireless device 110 may be flagged as malicious or potentially malicious. The device classification module 370 can also perform location analysis or geo-fencing, which evaluates the geolocation features associated with each feature vector. If an unauthorized wireless device 110 is identified to be within in a restricted area, then the wireless device 110 may be flagged as malicious or potentially malicious.

The device classification module 370 can identify attacking (malicious) wireless devices by comparing content of the received feature vectors against signatures of known attack signal. This comparison can comprise performing a blind determination of multiplexing techniques within the radio frequency signals. Determining multiplexing techniques can include identifying duplexing such as TDD, FDD, SDD, or other such duplexing. Multiplexing may also include multiple access where two or more transmitters are sharing a given resource, such as in time division multiplexing, code division multiplexing, frequency division multiplexing, frequency hoping, and various other such approaches.

The attack classification module 375 can determine the type of attack being perpetrated by a malicious wireless device 110. The attack classification module 375 can also determine if multiple malicious wireless devices 110 are involved in the attack and which victim wireless devices 110 are being attacked. The attack classification module 375 can support attack matching, which can use a library of attack templates to match malicious wireless device 110 activities to known attacks such as spoofing, DoS, jamming, wormholes, system penetration analysis, and others discussed herein or known in the art. The attack classification module 375 can support determination of attacking radios where the pair-wise link features of a malicious wireless device 110 may be used to identify a network of multiple attacking wireless devices 110. Such a network of multiple attacking wireless devices 110 may also be identified without using pair-wise link information depending upon the type of attack. For example, a pair of wireless devices 110 that have been classified as malicious may be clearly jamming on one frequency, but may also be communicating TDD on a second frequency. The attack classification module 375 can support determination of attacking radios to identify these two malicious wireless devices 110 as part of a malicious network executing a distributed jamming attack. The attack classification module 375 can support determination of victim radios for creating a list of wireless devices 110 being attacked by a network of attacking wireless devices 110. According to the distributed jamming attack example, the victim wireless devices 110 may be any network of benign wireless devices 110 using the frequency that is being jammed by the malicious wireless devices 110 of the attack network.

The attack classification module 375 can support attack intent inference to determine a high-level intent for a network of wireless devices 110. Attack intent inference can use an attack database and information regarding the locations and sizes of the networks. Regarding the distributed jamming attack example, if the victim wireless devices 110 being jammed are part of a closed-circuit video surveillance system, attack intent inference may indicate that the intent of the attack is to disable video. If, on the other hand, the victim wireless devices 110 are cellular telephones located in a boardroom, attack intent inference may indicate that the intent of the attack is to block mobile carrier communications in and out of the boardroom.

The analysis databases 380 may include, among various other examples, signal databases 450, sensor position and calibration databases 610, and attack databases 620. One or more of the signal processing and threat analysis stages of the signal analysis system 130, including the raw signal analysis engines 240, may leverage the analysis databases 380. The analysis databases 380 may contain various forms of information useful in analyzing the radio frequency signals collected by the sensors 120.

It should be appreciated that while the analysis databases 380 are generically referred to as databases, the information may be stored within tables, relational databases, other types of databases, flat files, memories, lists, data blobs, data structures, or any other data storage or organization technology. The analysis databases 380 may be stored locally at the signal processing and threat analysis modules of the signal analysis system 130 and the raw signal analysis engines 240, within one or more systems attached via the networks 150, online, in a storage cloud, in any other location, or any combination thereof. It should be appreciated that the analysis databases 380 may be distributed at the level of the sensors 120, distributed at the level of the signal processing and threat analysis modules of the signal analysis system 130, centralized at the building level, centralized at the campus level, centralized at the enterprise level, or centralized at the level of one or more providers. Various other granularities or localities of storage for the analysis databases 380 may also be supported without departing form the spirit or scope of the technology presented herein.

One or more signal databases 450 may be included among the analysis databases 380. The raw signal analysis engines 240 may leverage information within the signal databases 450 for matching or correlating features of known signals against received signals. The raw signal analysis engines 240 may further leverage information within the signal databases 450 to retrieve codecs and drivers for decoding variously modulated signals. The pair-wise link association module 360, the data throughput estimation module 365, and the device classification module 370 may each leverage information within the signal databases 450. The signal databases 450 may contain various signal signatures for known or abstract signal types. The signal databases 450 may provide mappings from signal features to signal types. Accordingly, the signal databases 450 may function as a look-up table for various signal analysis and aggregation operations.

One or more sensor position and calibration databases 610 may be included amongst the analysis databases 380. The space-time-frequency analysis module 350 and the geolocation module 355 may leverage the sensor position and calibration databases 610. The sensor position and calibration databases 610 may include the physical positions of various sensors 120 within the environment. The sensor position and calibration databases 610 may also include various parameters associated with electromagnetic wave propagation within the wireless communication environment.

One or more attack databases 620 may be included amongst the analysis databases 380. The attack classification module 375 may leverage information from the attack databases 620. The attack databases 620 may contain information or signal features that are indicative of specific attack types. The attack databases 620 may be used in conjunction with signals collected from the sensors 120 to identify types of attacks being perpetrated by malicious wireless devices 110.

It should be appreciated that portions of the information within the analysis databases 380 (including the signal databases 450, the sensor position and calibration databases 610, and the attack databases 620) may be preinstalled at purchase, installation, or configuration of the sensors 120, the signal analysis system 130, and/or other systems supporting the technology presented herein. Portions of the information within the analysis databases 380 may be configured in the field. Such configuration may be performed manually, or autonomously through automated learning, tuning, or adaptation procedures. Portions of the information within the analysis databases 380 may be updated from time to time from a central provider, from backups, or from other installations. Such updates may occur over an update network 630. One or more central providers may receive related information that was learned or adapted in fielded installations. The received information may be incorporated into periodic updates provided by the central provider to the various fielded installations using the update network 630. It should be appreciated that the update network 630 may be associated with the network 150, the Internet, and/or any other networks associated with the technology presented herein.

Figure 7:
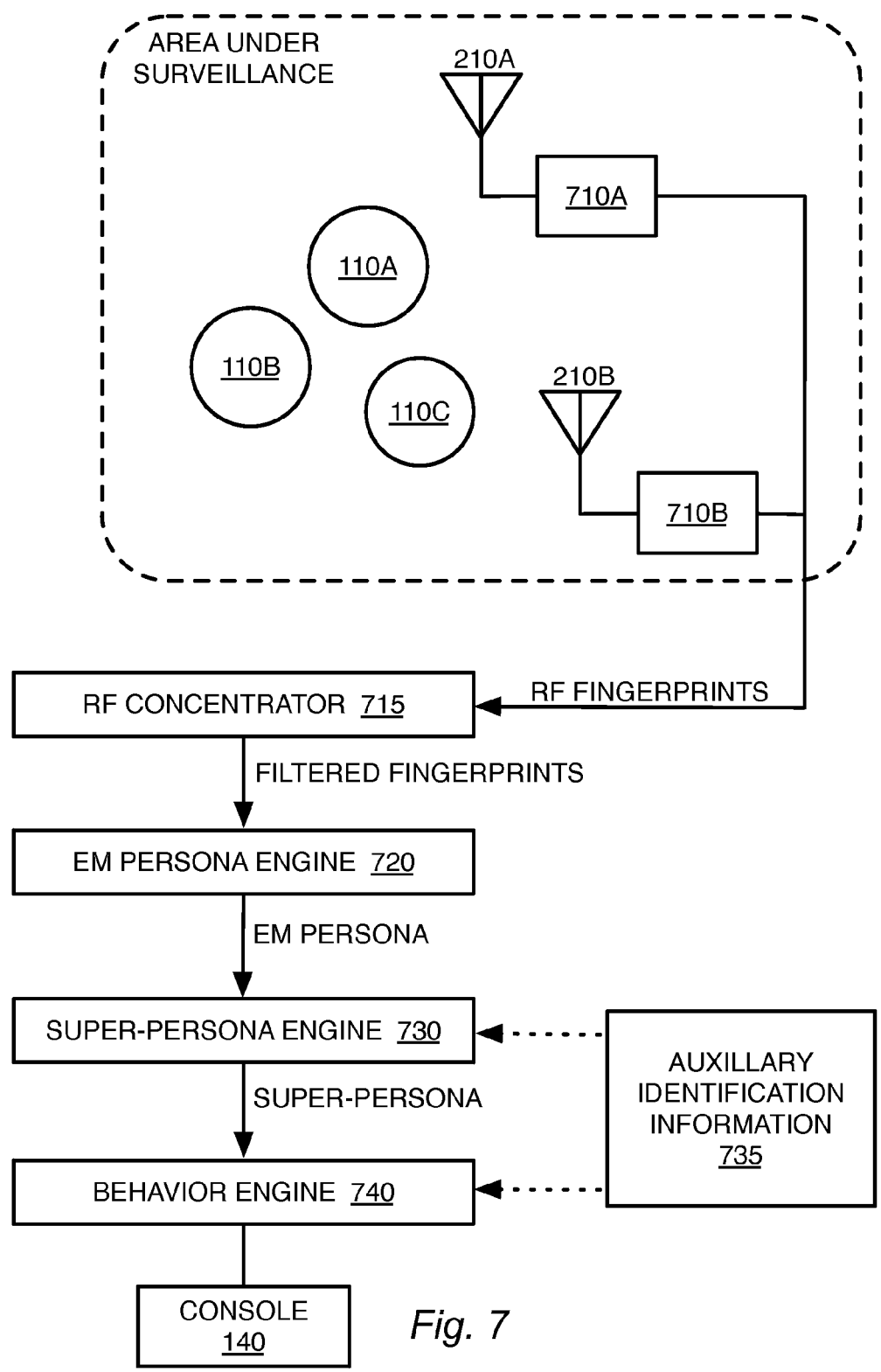
FIG. 7 is a block diagram depicting an electromagnetic environment and persona analysis system in accordance with one or more embodiments presented herein.

FIG. 7 is a block diagram depicting an electromagnetic environment and persona analysis system in accordance with one or more embodiments presented herein. Radio frequency sensors 710A and 710B may be referred to collectively, or in general, as radio frequency sensors 710. The radio frequency sensors 710 may collect electromagnetic signals through respective antennas 210. These electromagnetic signals may be emitted from, or received by, wireless devices 110 within an area under surveillance. The radio frequency sensors 710 may collect the electromagnetic signals as radio frequency fingerprints associated with the wireless devices 110. The radio frequency fingerprints may be transferred from one or more radio frequency sensors 710 to a radio frequency concentrator 715. The radio frequency concentrator 715 can process the radio frequency fingerprints into a stream of filtered fingerprints to be communicated to an electromagnetic persona engine 720. The electromagnetic persona engine 720 can process the stream of filtered fingerprints to generate electromagnetic personas. The electromagnetic personas may be communicated to the super-persona engine 730. The super-persona engine 730 can process electromagnetic personas to generate super-personas. The super-personas may be communicated to a behavior engine 740. The behavior engine 740 may interface with the console 140. Auxiliary identification information 735 may be provided to the super-persona engine 730, the behavior engine 740, or to other components of the persona analysis system presented herein.

An individual, vehicle, place, or asset may possess or comprise one or more wireless devices 110. Each wireless device 110, or even each of multiple radios associated with each wireless device 110, may generate an electromagnetic signature. The electromagnetic signature may be fixed or mobile. For example, a campus or secure facility may have a variety of fixed or mobile electromagnetic-emitting assets such as vehicles, stationary WiFi nodes, Zigbee devices, wireless security devices, communications antennas, and so forth. Any entity that is associated with one or more electromagnetic-emitting devices may have a unique fixed or dynamic persona. Personas associated with an individual may be biometric features such as a skin fingerprint, an iris within a human eye, height, hair color, facial hair, weight, and so forth.

Wireless devices 110 are generally transmitting and/or receiving radio frequency signals and thus have an electromagnetic spectrum fingerprint. The electromagnetic spectrum fingerprint may be measured as a unique signature coming from a particular radio, antenna, or other radio frequency component associated with a device. Examples of such fingerprints may include, but are not limited to, Bluetooth signals, WiFi signals, cellular signal, passive or active radio frequencyID signals, AM/FM radio signal, spurious emissions, and so forth.

An electromagnetic persona may be associated with a wireless device 110 or an entity associated with one or more wireless devices 110. The electromagnetic persona may be represented by data corresponding to an entity and any electromagnetic or radio frequency emitting devices associated with that entity. An electromagnetic persona typically includes one or more electromagnetic spectrum fingerprints of one or more wireless devices 110. For example, an electromagnetic persona associated with a smartphone may include multiple radios such as Bluetooth, WiFi, Cellular 2G, 3G, 4G, LTE, NFC, and so forth. An electromagnetic persona, particularly when represented by data, may be referred to as a digital persona.

An electromagnetic persona may be considered part of an individual's distinct persona. Accordingly, a user with electromagnetic-emitting devices (e.g., smartphones, wearable devices, tablet computing devices, etc.) may have an electromagnetic persona, as well as a physical persona. Collectively, physical as well as electromagnetic characteristics may make up the overall persona of a user. An electromagnetic persona can form a part of two authentication factors. The first being what a user is, in the sense of radio frequency emissions coming from the user's electronic devices. The second being what the user has, in the sense of having those devices in their physical possession and operating them. Electromagnetic persona may be detected and localized for identifying and locating users. Such identification and locating may support security notifications, safety awareness, policy enforcement, compliance detection, and so forth.

As presented herein, the wireless devices 110 may comprise any devices, apparatuses, systems, or subsystems capable of emitting electromagnetic energy. According to certain examples, the wireless devices 110 may include mobile devices, smartphones, mobile phones, tablet computers, laptop computers, active radio frequencyIDs, passive radio frequencyIDs, access control cards, Bluetooth headsets, personal fitness monitors, vehicles, autonomous vehicles, drones, security devices, building automation devices, and so forth. Those skilled in the art will understand and appreciate that each of the wireless devices 110 may contain one or more radio frequency transmitters or transceivers that emit electromagnetic energy at particular frequencies, bands of frequencies, and according to one or more particular protocols. Examples may include, but are not limited to, cellular voice communications using 2G/3G/4G/LTE technology, WiFi (IEEE 802.11), Bluetooth, Zigbee, active radio frequency, passive radio frequency, NFC, combinations thereof, and the like.

It should be appreciated that certain wireless devices 110 may include several different radios. Each, and any of such radios may be transmitting in any combination at any given time. Furthermore, an individual may have one or more wireless devices 110 in their possession at any given time. Moreover, at any given time, the various radios may be transmitting (or receiving) data, be disabled, be malfunctioning, or be turned off or in a sleep mode.

According to various embodiments, the radio frequency sensors 710 and associated radio frequency concentrator 715 may share resources with, be part of, operate in conjunction with, or be separate from the sensors 120 and the signal analysis system 130. Similarly, any or all of the electromagnetic persona engine 720, the super-persona engine 730, or the behavior engine 740 may share resources with, be part of, operate in conjunction with, or be separate from the signal analysis system 130. Accordingly, the radio frequency sensors 710 and associated radio frequency concentrator 715 may incorporate, share resources with, operate in conjunction with, or be separate from the radio frequency front ends 220, the digitizers 230, or the raw signal analysis engines 240.

It should be appreciated that the radio frequency fingerprints, filtered fingerprints, electromagnetic personas, super-personals, and any related signals or data may be communicated via the antenna signal-switching network 310, the raw digital signal-switching network 320, the signal feature vector network 330, or any other network or communications channel associated with the network 150.

A sensor network covering an area under surveillance may include the one or more antennas 210 coupled to one or more radio frequency sensors 710. The antennas 210 may be mounted in the area under surveillance in a distributed fashion to receive electromagnetic emissions from wireless devices 110 that enter the area and are actively transmitting, either continuously or intermittently. Location information may be maintained with respect to each antenna 210. Such information may assist determining the location of various wireless devices 110 in the area under surveillance.

According to certain embodiments, proximate sets of physical antennas 210 may combine to represent a single complex antenna 210. This combining may be useful when a single antenna 210 may not have sufficient bandwidth and/or when it may not be possible to efficiently tune the resonance frequency of a single antenna 210 to receive radio frequency signals from each of the radio bands being monitored. For example, an antenna 210 configured to receive radio frequency signals at or near 850 MHz (2G/3G cellular bands) may not be configurable to receive radio frequency signals at 60 GHZ channels (e.g. 802.11ad). In such an instance, multiple antennas 210 may be used together to span the full range of frequency bands being monitored.

A plurality of the radio frequency sensors 710 may be deployed in a distributed arrangement to pick up electromagnetic signals transmitted by radios in the various wireless devices 110 within the area under surveillance. Regardless of frequency or protocol, the antennas 210 may receive the transmitted signals. An example of the broad range of frequency bands that can be received might be 15 MHz to 6 GHz. This range is just an example and various other broad ranges may also be received including frequencies above and below this example range. The aforementioned bandwidth ranges are non-limiting examples and are not intended to limit the spirit or the scope of the present disclosure. It should be appreciated that any frequency range, or ranges, may be examined by the technology presented herein.

The sensor network comprising one or more radio frequency sensors 710 covering an area under surveillance can support an electromagnetic persona detection and analysis system. Such a system may capture radio frequency emissions from any number of wireless devices 110 and associate those emissions with certain entities such as individuals, assets, vehicles, equipment, facilities, and so forth. Data sets corresponding to the radio emissions associated with various entities may be created and maintained. Processing the data can support determining certain behaviors of the entities and, in certain cases, providing alerts or alarms regarding behaviors of the entities. For example, it may be detected when such behaviors are expected, unexpected, erratic, associated with unknown entities, or associated with known malicious entities.

Entities, once identified, may along with their electromagnetic personas, become known entities. A known entity may be associated with particular expected behaviors that are observed, modeled, and/or determined by observation over a period of time. Unknown entities may be monitored until they are either determined as known or until an action is taken as a result of a system policy determination. Furthermore, known entities may be determined as being authorized or authenticated, or may alternatively be indicated as malicious or suspicious, warranting continued and perhaps enhanced monitoring or triggering of alerts. According to certain embodiments, there may be various tiers of alerts. The gravity, or at least the perceived gravity, of various events that trigger an alert may vary. For example, the presence within an area of surveillance of an ex-employee who has been released for cause, is known to have mental health issues, and is known to own a firearm may be greater level alert event than a new employee inadvertently walking into a restricted area. According to example embodiments, there may be any suitable number of tiers of warnings and the number of tiers may be configurable by administrators or other appropriate users.

A radio frequency fingerprint may comprise a data package or data structure having data elements that may include, among others, device type identifier, manufacturer identifier, model identifier, MAC address, IMEI, ESN, other mobile ID, radio type identifier (e.g. 2G, 3G, 4G, LTE, WiFi, Zigbee, Bluetooth), frequency band detected, modulation schemes detected, geographic location (e.g. GPS coordinates, triangulated position, etc.), radio frequency sensor identifier (which particular radio frequency sensors 710 detected the particular radio or wireless device 110), time of detection, type of detection (e.g. initial/ingress, exit/egress), various flags (e.g. "not seen lately" flag), signal strength (e.g., received signal strength indicator (RSSI)). The radio frequency fingerprint data packages from the radio frequency sensors 710 may be communicated to on or more radio frequency concentrators 715.

The radio frequency concentrator 715 can receive radio frequency fingerprint data packages from one or more radio frequency sensors 710. The radio frequency sensors 710 may be connected in a network having a mesh arrangement or other topology. Each radio frequency sensor 710 may be coupled for data communications to at least one, and possible more than one, nearby partner radio frequency sensors 710. The coupling may occur over a secure radio frequency backhaul channel. Each radio frequency sensor 710 may be in communications with a radio frequency concentrator 715. The radio frequency concentrator 715 can support collecting signals for, and localizing, electromagnetic personas. The radio frequency concentrator 715 may support controlling connected radio frequency sensors 710, including detection and reporting of malfunctions, updating of software, etc. The radio frequency concentrator 715 may support consolidation of electromagnetic signals received by multiple radio frequency sensors 710 that originate from the same wireless device 110, such that redundancy of reporting may be avoided. The radio frequency concentrator 715 may support transmitting/communicating data representing radio frequency fingerprints to the electromagnetic persona engine 720. The radio frequency concentrator 715 may support noise reduction, such as processing received signals from the wireless devices 110 so as to eliminate or reduce noise. The radio frequency concentrator 715 may support tamper detection, such as providing commands for testing the operations of connected radio frequency sensors 710, reporting malfunctions, detecting the occurrence of tampering or interference, etc. The radio frequency concentrator 715 may support signal verification, such as processing received signals from the wireless devices 110 to ensure that a solid signal is received and that a received signal possesses extractable identifying information.

It will be appreciated that the network 150 interconnecting radio frequency sensors 710 and radio frequency concentrators 715 may utilize a wireless and/or a hardwired communications medium. The network 150 may comprise direct links from each of the radio frequency sensors 710 to the radio frequency concentrator 715 in a spoke topology. Alternatively, the network 150 may employ a mesh topology, a ring topology, or any other topology. In example embodiments, the communications from one radio frequency sensor 710 to another radio frequency sensor 710, and/or to the radio frequency concentrator 715 may be encrypted to prevent any intrusion and/or detection of communications. In these example embodiments, any suitable mechanism for encryption or other obfuscation may be utilized.

The radio frequency sensors 710 or associated radio frequency concentrator 715 may comprise radio receivers such as one or more hardware-defined radios 340 or one or more software-defined radios 335. The radio receivers may be integrated within or coupled to the radio frequency sensors 710. Each radio frequency concentrator 715 can receive and aggregate radio frequency fingerprints detected from radio emissions associated with the wireless devices 110. The radio frequency concentrator 715 may associate geospatial location information. Such information may be derived from signals from the various coupled antennas 210 or may be preloaded location information. The radio frequency concentrator 715 may generate a Filtered Fingerprint Feed. The Filtered Fingerprint Feed may comprise filtered or demodulated data that can be sent to an electromagnetic persona engine 720 from the radio frequency concentrator 715. The Filtered Fingerprint Feed can comprise key data such as relevant signature information, hardware address according to the protocol, and telemetry information such as timing and position information. The Filtered Fingerprint Feed may be provided to the electromagnetic persona engine 720 for further processing and examination.

The flexibility of software-defined radios 335 may be useful to support monitoring various frequency bands, various encoding methods, and/or modulation mechanisms. The software-defined radios 335 can support monitoring the various protocols by efficiently sampling radio frequency signals in a progressive fashion using substantially the same hardware, such as the antennas 210, radio frequency sensors 710, and radio frequency concentrators 715. As new communications protocols are added, the software-defined radios 335 may be reprogrammed with new or updated software and/or instructions configuring the software-defined radios 335 to sample the radio frequency signals according to the new protocols given the frequencies, modulation techniques, and encoding associated with the new protocols.

The electromagnetic persona engine 720 may be respond to a received electromagnetic signal by associating the signal with a particular type of electronic device and extracting information from the electromagnetic signal to derive various information. For example, derived information may include device-type identification data and/or device-specific identification data that may be uniquely associated with a particular electronic device. According to further examples, the electromagnetic persona engine 720 may also receive and associate time signals with a particular electronic device that indicate a time of detection of the electronic device and/or a detection interval associated with the electronic device. The electromagnetic persona engine 720 may further identify a location, or series of locations (representing motion), associated with a received signal. The electromagnetic persona engine 720 may be operative to generate and store data corresponding to an electromagnetic persona. The electromagnetic persona may include device type identification data, device-specific identification data, entity identifying data, and so forth. The entity identifying data may include information associated with a particular entity associated with the particular wireless device 110. The electromagnetic persona engine 720 can aggregate electromagnetic fingerprints to form an electromagnetic persona. This may be done by observing fingerprints over time or by grouping fingerprints according to manufacturer, software version, firmware version, or other identifying details.

The electromagnetic persona may represent the detection of a particular wireless device 110, or radio associated therewith, at a particular point in time. The electromagnetic persona may alternatively represent a series of detections of a particular wireless device 110 as it is initially detected, emits signals via its various radios, moves within the area under surveillance, transmits continuously or intermittently, and eventually leaves the area or is powered-off. Data representing the wireless device 110 and its emissions, including time and location information, form part of a static or dynamically changing electromagnetic persona associated with the wireless device 110 and/or the associated user or operator.

The electromagnetic persona generated by the electromagnetic persona engine 720 may be provided to a super-persona engine 730 as a stream of electromagnetic persona data items. The super-persona engine 730 may be a computer-implemented system that receives a data feed of a plurality of electromagnetic persona data items from the electromagnetic persona engine 720 and associates one or more electromagnetic personas with supplemental identifying information for the purpose of creating a higher level data entity known as a super-persona. A given entity, such as an individual, may possess one or more electromagnetic-emitting wireless devices 110, and the entity may have one or more of these wireless devices 110 on their person at any given time or in any given place while the wireless devices 10 may or may not be emitting electromagnetic. Thus, the super-persona engine 730 may be operative to associate these one or more wireless devices 110 with a particular entity, such as a person, asset, vehicle, location, or so forth. Such data sets may be generated corresponding to one or more detection episodes for an electromagnetic persona. The electromagnetic persona data structure may be provided to the super-persona engine 730.

The super-persona engine 730 may be coupled to the electromagnetic persona engine 720 for associating one or more electromagnetic personas with supplemental identifying information. The supplemental identifying information may include additional data associated with a particular entity determined as possessing one or more wireless devices 110 operating within the area under surveillance. The super-persona engine 730 may be operative to generate and store data corresponding to a super-persona comprising one or more electromagnetic personas, supplemental identifying information, expected behavior data, and a super-persona activity log. The super-persona may link one or more electromagnetic personas to a single entity. The entity may be known or unknown. When known, the entity may be linked to other sources of data such as a private database (e.g. building access control) or a public database (e.g. known offenders). An example of a super-persona may be a mapping of a particular electromagnetic persona to a corresponding respective individual.

A super-persona data set may comprise data items representing the associated entity's name, the types of wireless devices 110 detected as being present with the entity, the identifiers associated with the electromagnetic emitting radios of the devices 110, a last seen configuration data, current configuration data, and so forth. This super-persona data set may be provided to a behavior engine 740 as a stream of super-persona data items.

The super-persona engine 130 may determine supplemental identifying information corresponding to a super-persona. For example, a super persona may correspond to a known or previously seen entity that is expected, authenticated, or authorized for certain activity or access or locations. As a further example, a super persona may correspond to a known or previously detected entity that may not be fully identified, but may be persistently present. As a further example, a super persona may correspond to a known entity that is identified as unauthorized, not authenticated, undesirable, or on a "black list" of specifically excluded or alarm condition entities. As a further example, a super persona may correspond to an unknown entity appearing for the first time within the area under surveillance or intermittently reappearing prior to full identification. The supplemental identifying information can also be supplied by as auxiliary identification information 735. The auxiliary identification information 735 may originate from a system such as an access control system, a card-swipe system, an RFID system, a near-field communication system, or any otherwise identifying system operated within or near the area under surveillance. The auxiliary identification information 735 may be provided by a known area access system configured to provide identifying information generated upon granting of access to an entity, such as an authorized employee, into a controlled area. This information may be used to associate that authorized individual's name and incidence of access to the controlled area with the super-persona of that individual according to their associated wireless devices 110. Such an access-granting event may be a triggering event for entity detection.

In example embodiments, the super-persona engine 730 may have access to, maintain, and/or generate look-up tables or other storage such as one or more data stores and/or memories associated with the super-persona engine 730. These data stores may contain associations between entities and their electromagnetic personas. They may also include supplementary access system identifiers such as RFIDs, passwords, PINs, or other access control mechanisms.

According to some embodiments, a black list super-persona and/or an electromagnetic persona may be identified relatively proximate to an access/ingress/security point, such as an RFID controlled door causing the behavior engine 740, super-persona engine 730, and/or electromagnetic persona engine 720 may be configured to provide an indication that the access point is to be shut-down or that there is a potential security threat at the access point and a shut-down should be considered. In certain embodiments, the behavior engine 740, super-persona engine 730, and/or electromagnetic persona engine 720 may be configured to automatically shut-down or direct a shut-down of an access point when a potential threat is detected in relative proximity to that access point.

The super-persona data may be is stored in a database associated with the super persona engine 730 and or communicated to the behavior engine 740. The super-persona may comprise data items including, but not limited to: a super-persona identifier (e.g. a unique identifier corresponding to the super-persona), an entity name (e.g. the name of the entity as either determined by the engine or by data input by a system user), pointers to one or more electromagnetic personas making up the super persona, pointers to one or more device identifiers, time of creation of the super-persona, a last modified time for the super-persona, behavior expectation or status flags (i.e. the super-persona is authorized for a function, is known "bad," is "unknown," or has been seen exhibiting erratic behavior) association information (i.e. the super-persona is related to one or more other super-personas such as family members, coworkers, organizational membership information, etc.), expected location information (i.e. the presence of this super-persona in a specific location is expected and approved), unauthorized location information (i.e. the presence of the super-persona in a specific location is not expected and/or is unauthorized), or prior incident data (i.e. data corresponding to prior detected behaviors of this super persona).

According to certain embodiments, the super-persona engine 730 may be configured to identify a super-persona that may be stored in a super-persona database. The super-persona database may contain a mapping of entities with their corresponding electromagnetic personas and/or other auxiliary identification information 735 or security indicators such as radio frequencyID badge identifier, employee number, name, supplementary biometric information, government issued identifiers, and so forth. For example, a particular entry in the database may include an individual's name, address, employee identification number, radio frequencyID access card number, smartphone WiFi identifier, smartphone Bluetooth identifier, tablet computing device WiFi and Bluetooth identifiers, and smartwatch WiFi, NFC, and Bluetooth identifiers. This database of super-personas may be used by the super-persona engine 730 to identify an entity based at least in part on the various electromagnetic personas and/or other security identifiers associated with the entity.

In example embodiments, the behavior engine 740 may be configured to access the super-persona database to identify various types of disallowed locations, times, and/or other behaviors associated with the various super-personas stored in the super-persona database. According to further embodiments, the behavior engine 740, in addition to the super-persona engine 730, may be configured to update the super-persona database to include additional information therein, such as new electromagnetic personas and/or fingerprints to be associated with a particular super-persona and/or recordings of infractions or unusual events (e.g., presence in an unauthorized location, commingling with an unauthorized entity, erratic movement in sensitive areas, and so forth) associated with a particular entity and/or its super-persona.

A behavior engine 740 may be coupled to the super-persona engine 730 and, in some cases, to the electromagnetic persona engine 720. The behavior engine 740 can process data corresponding to a detected electromagnetic persona and an associated super-persona, to determine a behavior associated with the entity associated with the super-persona, or in some cases, the electromagnetic persona directly. The behavior engine 740 may be operative to generate data indicative of behavior identified as normal for a particular super-persona during a detection interval or behavior identified as unexpected for the particular super-persona. The behavior engine 740 may also be operative to provide a detection output indicating that an expected behavior for an electromagnetic persona and/or super-persona, an unexpected behavior for an electromagnetic persona and/or super-persona, presence of an unknown electromagnetic persona, or a compliance alert upon the detection of particular predetermined event.

The behavior engine 740 may create, model, and/or apply rules in connection with various behaviors associated with entities, electromagnetic personas, or super-personas. The behavior engine 740 can identify and localize behavioral signatures such as loitering (being in one place for too long), casing (observed in an area multiple times), erratic movement (abnormal patterns in movement by one or more persona), tailgating (observation of multiple persona in a secure area when only one authentication occurred), commingling (two or more individuals that are not to interact found to be in relative proximity for periods of time that may indicate violations policy), credential sharing, unauthorized location (an individual is detected in an unauthorized area), and so forth.

The behavior engine 740 can detect behavioral signatures based on preloaded behavior templates stored in a behavior database. Behavior templates may be predetermined by system administrators or other authorized personnel, in both positive (expected, normal, authorized, authenticated) and negative (unexpected, erratic, unauthorized, unauthenticated, bad, black-listed, unknown) domains. The behavior engine 740 may process super-persona data arriving from the super-persona engine 730, and in some cases directly from the electromagnetic persona engine 720, to create detection episodes, store data corresponding to the detection episodes, retrieve one or more templates corresponding to positive or negative activity, and provide an output to the console 140 for handling the detected behavior of the super-persona and/or electromagnetic persona. The console 140 may be a known security awareness system that utilizes data from electromagnetic persona either alone, or in conjunction with other security or safety detection data. These may include data from access control systems, video surveillance systems, motion/infrared/vibration/seismic detection systems, and so forth. This data integration may provide more complete security or safety awareness capability. A monitoring or response function associated with the console 140 may receive alarm and/or alerts from the behavior engine 740 or connected systems. The alarms/alerts may include any information of potential concern regarding the presence, activates, attributes, or behaviors of personas, super-personas, or associated entities. Administrative functions associated with the console 140 may allow entry, testing, updating, or other interaction with rules and polices for any operations presented herein such as detection, localization, alerts, or other operations regarding the presence, activates, attributes, or behaviors of personas, super-personas, or associated entities.

The behavior engine 740 can provide an awareness output indicating one or more of the following: an expected behavior for a super-persona; an unexpected behavior for a super-persona; presence of an unknown electromagnetic persona or super-persona, and/or a compliance alert upon the detection of particular predetermined event. According to another aspect, the behavior engine 740 generates and stores data corresponding to the monitored activity or behavior of a super-persona comprising one or more electromagnetic personas, supplemental identifying information, behavior data, and a super-persona activity log. Such security and safety detection systems may typically generate and store activity logs during operations so that relevant personnel can inspect and review prior detection episodes, for various purposes such as developing new positive and negative behavior templates, forensic investigation of safety or security events, compliance (or noncompliance) reporting, training of security and safety personnel, troubleshooting, and the like.

According to certain embodiments, historical data associated with the detected presence of the fingerprint and access control events associated with particular access credentials may be used to analyze whether a particular unknown radio frequency signature (or electromagnetic persona) is to be associated with a particular super-persona that is associated with the particular access credentials. A score or other metric may be assigned to any given pairing of a particular unknown radio frequency fingerprint and particular access credentials. Each score may be a measure of, for example, a temporal relationship between a particular unknown radio frequency fingerprint and particular access credentials, and thus, a measure of the potential association between the unknown radio frequency fingerprint and the super-persona with which the access credentials are associated.

According to certain embodiments, for any given pairing of a particular unknown radio frequency fingerprint and particular access credentials, the corresponding score associated therewith may be first initialized, for example to zero. Various heuristics may then be applied to increment or decrement the score based on the presence or absence of various conditions. For example, if an unknown radio frequency fingerprint is detected during a particular time period (e.g., on a particular day) and an access control event for the access credentials is not detected during that time period, the score representative of the temporal relationship between the unknown radio frequency fingerprint and the access credentials may be decremented by a first value. Similarly, if an access control event for the access credentials is detected during a particular time period but the unknown radio frequency fingerprint is not detected during that time period, the score may be decremented by a second value. If, on the other hand, both the unknown radio frequency fingerprint and an access control event for the access credentials are not detected during the same time period, the score may be incremented by a third value.

If both the unknown radio frequency fingerprint and an access control event for the access credentials are detected during the same time period, an additional set of heuristics may be applied to determine how the score is to be incremented or decremented. First, all timestamps associated with detection of the unknown radio frequency fingerprint during the time period and all timestamps associated with access control events for the access credentials during the time period may be ordered. A determination may then be made as to whether a timestamp associated with an earliest detection of the unknown radio frequency fingerprint during the time period is within a threshold period of time from a timestamp associated with an earliest detection of an access control event during the time period. If these two timestamps are within the threshold period of time from one another, the score may be incremented by a fourth value. As another example condition, if the timestamp associated with the earliest detection of the unknown radio frequency fingerprint during the time period is before the timestamp associated with the earliest detection of an access control event, the score may be decremented by a fifth value. As yet another example condition that may be evaluated, a difference between a timestamp associated a detected access control event after the initial detected access control event and corresponding temporally closest unknown radio frequency fingerprint detection may be compared against a threshold period of time. If the difference is within the threshold period of time, the score may be incremented by a sixth value, and if the difference is not within the threshold period of time, the score may be decremented by a seventh value. This condition may be evaluated for each detected access control event subsequent to the initial detected access control event. It should be appreciated that absolute values of any of the first through seventh values may be the same value or different values.

A respective score may be generated for each pairing of a radio frequency fingerprint and a bundle of access credentials. If the score associated with a given pairing of an radio frequency fingerprint with access credentials exceeds a threshold score, it may be determined that the radio frequency fingerprint is associated with an entity (such as a user) to whom the access credentials have been assigned. As such, the super-persona with which the access credentials are associated may be updated to indicate that the radio frequency signature is associated with the super-persona.

It should be appreciated that in certain embodiments, one or more of the radio frequency concentrator 715, the electromagnetic persona engine 720, the super-persona engine 730, and the behavior engine 740 may make up an integrated system. For example, operations or processes of one or more of the radio frequency concentrator 715, the electromagnetic persona engine 720, the super-persona engine 730, the behavior engine 740, and other aspects of the signal analysis system 130 may be performed on the same computing machine or system. It should further be noted that any one or more of these elements may operate remotely, off-site, or in the cloud.

According to certain embodiments, one or more of the radio frequency concentrator 715, the electromagnetic persona engine 720, the super-persona engine 730, the behavior engine 740, and other aspects of the signal analysis system 130 may be owned and/or controlled by a different organization than the group or organization that owns or controls the area under surveillance. The organization associated with the area under surveillance may, at least partially, outsource some of the security monitoring and analysis functions presented herein to a third party organization. In some cases, the organization that provides the services may also provide security services to one or more other clients. Accordingly, the provider may aggregate identification and localization of potential threats across various companies. For example, if a particular person has been identified as a shoplifter at one department store based on their electromagnetic persona or super-persona, another department store may be warned when that person enters and may pose a security/theft threat.

According to certain embodiments, there may be personal privacy issues involved with aggregating information across organizations. For example, some organizations may not wish to share details about its employees (such as employee names) with a third party security system. In such cases, the radio frequency concentrators 715 deployed in these organizations may conceal the identity of individuals under surveillance to the third party organization while still substantially employing the systems and methods as presented herein.

According to certain embodiments, a device identifier detected by the sensor network, and/or the electromagnetic persona associated therewith may be encrypted, such as by a hash, one-way hash, or key prior to transmitting to the electromagnetic persona engine 720, super-persona engine 730, and/or behavior engine 740. Similarly, any other obfuscating identifier may be used, such a (pseudo)randomly assigned unique identifier or nonce. Any personas created and maintained by the third party off-site from the organization that is employing the security services may not include the true identity of the entity or the associated wireless devices 110, but instead may include one-way hashed versions of that information. When the behavior engine 740 reports a security alert or potential threat, a hashed version of identifying information may be provided to the security systems at the facility being monitored. Those systems may be configured to use a hash mapping to derive the true identity of any potential security threat based at least in part on the received hash form the remote behavior engine 740.

According to certain embodiments, technology presented herein may be readily combined and coordinated with existing security systems, such as access control gateways where authorized personnel "badge in" to a facility with an ID card or other access control device, such as an RFID badge, or other identification token. Information from such access control systems may be combined with information from the described electromagnetic persona detection system to provide for more robust and/or accurate detection and awareness capability. The concurrent detection of an unknown radio frequency fingerprint along with a known access control event may enable the electromagnetic persona engine to associate the unknown electromagnetic fingerprint with an individual associated with the known access control event.

According to certain embodiments, technology presented herein may provide supplemented security for secure area access and entity awareness. For example, in a facility utilizing RFIDs or other access control tokens at access control gateways, such as doors, elevators, or turnstiles, information derived from the access control device may be captured upon use. A timestamp of the swipe or access may also be captured. Timestamps of detection of electromagnetic personas may also be captured at the time of access, and throughout the facility as the entity moves about carrying a wireless device 110 emitting a detected radio frequency fingerprint. Timestamps may be matched over time to match badge numbers to mobile devices. A super-persona comprising the identity of the individual, their associated wireless devices 110 each having one or more radio frequency fingerprints/electromagnetic personas, timestamps, and other information, may be persisted for the individual over time. The individual can then be further authenticated for other purposes, using the combination electromagnetic persona, super-persona, and access control/badge information.

According to certain embodiments, the departure or exit of an individual associated with one or more electromagnetic personas, having a super-persona, may be determined based upon the detection of the individual's wireless devices 110 at the access control gate. It may be determined if an individual is exiting an area and (purposely or inadvertently) leaving their wireless device 110 behind.

According to certain embodiments, technology presented herein may support controlling and detecting enterprise ethical violations or general compliance with organizational rules, policy, and/or best practices. For example, an enterprise such as an investment bank may have a policy that personnel who work in certain fields, such as equities research, should not be allowed access to personnel who work in other fields, such as investment banking. The system may allow detection of persons in controlled or monitored areas based at least in part on their electromagnetic fingerprint. It may further be determined if that individual is in a particular area in violation of company policy, such as an investment banker being in an equities research area within the investment banking facility.

According to certain embodiments, technology presented herein may be configured to detect a terminated employee on the premises. Similarly, a known, but unauthorized, visitor may have previously been authorized in a particular area may be detected. Furthermore, a known and authorized found in an unauthorized area without accompaniment of an approved escort may be detected. According to additional examples, instances of tailgating, where a visitor or intruder closely follows an authorized person in an attempt to enter an unauthorized area and evade detection, may be detected.

According to certain embodiments, erratic behavior detection may be supported. Erratic behavior detection may comprise detection that a number of personnel, whether authorized or unauthorized, are moving at an unexpected (typically high) rate of speed, and/or are converging towards a particular location. This type of detected movement may be indicative of a medical emergency or other disaster or emergency. Similarly, detection of the same persona, such as that of a particular individual, multiple times in a particular area around the same time each day may be identified as exhibiting casing and may be indicative of nefarious activities and/or intent.

According to certain embodiments, technology presented herein may be configured to cooperate with one or more other systems, such as RFID or other access token systems, to enforce access control for unauthorized areas. For example, if a particular authorized individual is identified as physically present at a particular unauthorized location and/or logging-in or accessing via remote access/Virtual Private Network (VPN) unauthorized systems, security may be notified in real time or near real time. This type of behavior detection may, in some cases, suggest possible unauthorized use due to stolen access credentials and/or a stolen access control tokens.

According to certain embodiments, an electromagnetic environment identified within a particular area may provide an indication of a normal or baseline electromagnetic environment. The baseline may include certain Wi-Fi access points, certain known personas, and their wireless devices 110 as established over time of observing the particular AUS. Detection of an unknown electromagnetic signature from an unknown wireless device 110 beyond the normal or baseline condition may suggest the presence of a bugging device or other unauthorized electronic device.

According to certain embodiments, coupling electromagnetic persona detection with traditional authentication mechanisms may improve security when authorizing transactions. Examples transactions may include automated teller machine transactions, vending transactions, access control transactions, or so forth. Additional security awareness or procedures may be imposed when credentials for ATM access (or other transactions) occur around a different electromagnetic persona than the typical electromagnetic persona associated with the known ATM (or other) account holder.

According to certain embodiments, in the event of a crisis or emergency, such as in the event of a fire alarm or other emergency, identifying radio frequency personas in the area of the emergency may provide an indication of whether evacuation is proceeding apace, whether bottlenecks or blocked egress points are present, and/or whether a person (or device) has been left behind or separated from the individual.

According to certain embodiments, technology presented herein may provide an augmented reality type informational display of personas, known and unknown, based on detected electromagnetic personas. This may include unknown individuals, individuals whose behavior has been identified as erratic, or individuals who are known to be "black listed," "risky," or otherwise undesirable on the premises, such as discharged employees. Security personnel may be provided, as part of the console 140 functionality, with an augmented reality device such as a virtual reality head mount display with an overlay providing information of the identity of a person within a field of view of the personnel. For example, the information may flag a person as a known employee, unknown person, a person on a black list, and so forth.

Figure 8:
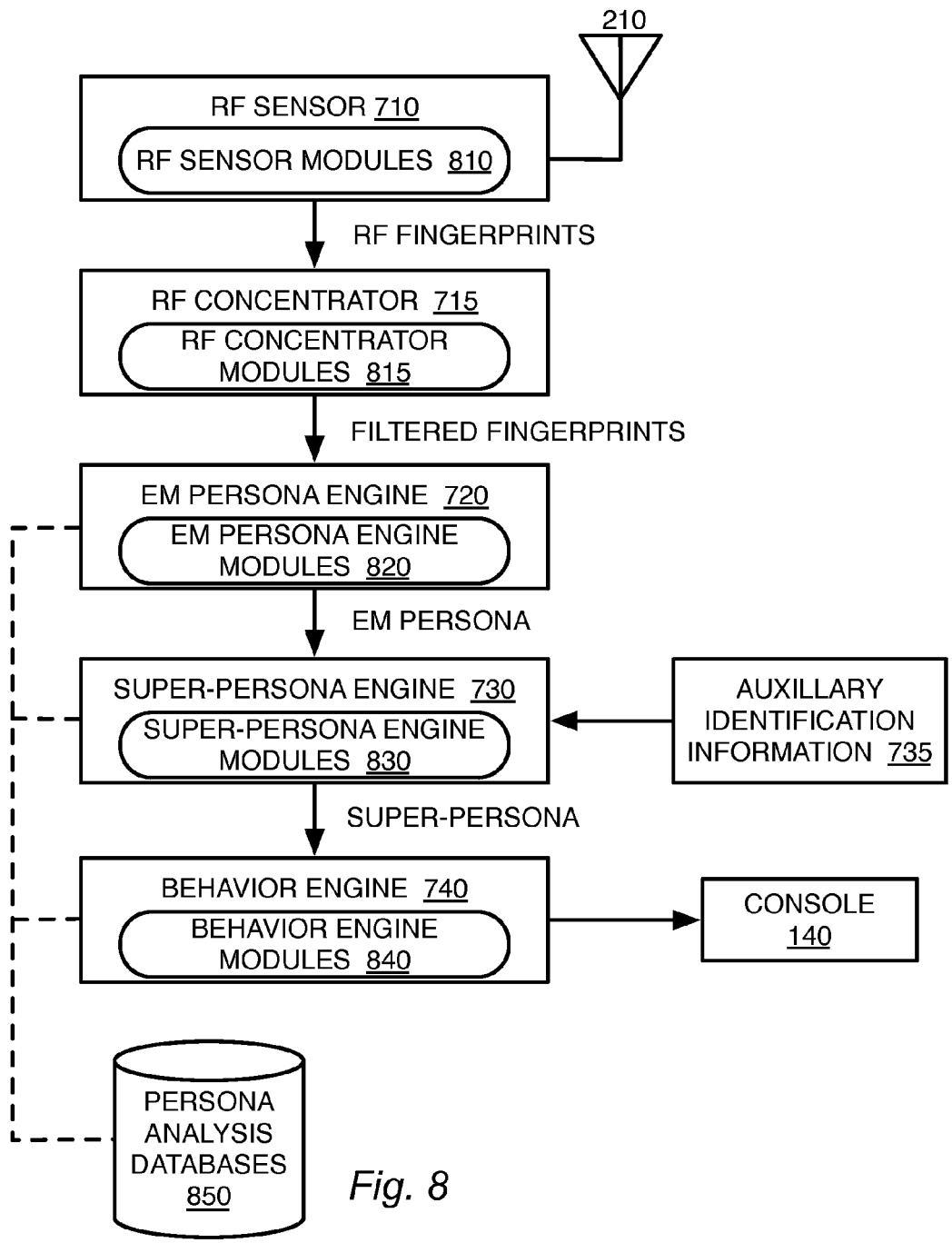
FIG. 8 is a block diagram depicting a system for detection, localization, and analysis of radio frequency persona in accordance with one or more embodiments presented herein.

FIG. 8 is a block diagram depicting a system for detection, localization, and analysis of radio frequency persona in accordance with one or more embodiments presented herein. A radio frequency sensor 710 can collect electromagnetic signals through a radio frequency antenna 210. The radio frequency sensor 710 may function according to one or more radio frequency sensor modules 810. The radio frequency sensor 710 may collect electromagnetic signals as radio frequency fingerprints. The radio frequency fingerprints may be transferred from the radio frequency sensor 710 to a radio frequency concentrator 715. The radio frequency concentrator 715 may function according to one or more radio frequency concentrator modules 815. The radio frequency concentrator 715 can process the radio frequency fingerprints into a stream of filtered fingerprints to be communicated to an electromagnetic persona engine 720. The electromagnetic persona engine 720 may function according to one or more electromagnetic persona engine modules 820. The electromagnetic persona engine 720 can process the stream of filtered fingerprints to generate electromagnetic personas. The electromagnetic personas may be communicated to a super-persona engine 730. The super-persona engine 730 may function according to one or more super-persona engine modules 830. The super-persona engine 730 can process electromagnetic personas to generate super-personas. The super-personas may be communicated to a behavior engine 740. The behavior engine 740 may function according to one or more behavior engine modules 840. The behavior engine 740 may interface with the console 140. Auxiliary identification information 735 may be provided to the super-persona engine 730. The auxiliary identification information 735 may also be provided the behavior engine 740 or to other components of the persona analysis system presented herein. Various persona analysis databases 850 may serve as data stores in support of the electromagnetic persona engine 720, super-persona engine 730, behavior engine 740, or other components of the persona analysis system presented herein.

The radio frequency sensor 710 may function according to one or more radio frequency sensor modules 810. The radio frequency sensor modules 810 may comprise radio frequency receiver hardware. The radio frequency receiver hardware may include a wideband software-defined radio 335. The wideband software-defined radio 335 can scan predetermined designated frequencies for signals (such as frequency bands used in certain wireless communications protocols), can receive location signals from detected devices (or alternatively is preprogrammed with location information), and may be physically configurable for multiple different types of antennas for signal detection.

The radio frequency sensor modules 810 may further comprise radio frequency receiver software that can provide instructions supporting functionality of the radio frequency receiver hardware. Such functionality may include, without being limited to, maintaining a list of frequencies to scan, brokering data from the radio frequency scanner hardware to a signal analysis server, and maintaining a local database of signals detected. The radio frequency sensor 710 may determine a frequency band for a particular signal by comparing the incoming signal to a predefined list/dictionary of potential modulation schemes. The incoming signal may be matched to a predefined modulation scheme to categorize the incoming signal by transmission type. An unidentifiable signal may be labeled as unidentifiable and the signal modulation type may be stored for further analysis to determine the unidentified signal's nature, origin, and characteristics.

The radio frequency concentrator 715 may function according to one or more radio frequency concentrator modules 815. The radio frequency concentrator modules 815 may comprise radio frequency concentrator hardware and/or radio frequency concentrator software. According to certain embodiments, the radio frequency concentrator hardware may comprise one or more receivers based upon one or more embedded processors, DSP processors, FPGAs, ASICs, mixed signal chips, or software-defined radios 335. Such a receiver may operate to receive and process signals from one or more radio frequency sensors 710. The radio frequency concentrator hardware may also support saving raw data corresponding to detected signals in a local database. The radio frequency concentrator hardware may be optimized for performing geolocation operations. The radio frequency concentrator software can support functionality for the radio frequency concentrator hardware when executed by one or more processors of the radio frequency concentrator 715. Such functionality may include, while not being limited to, receiving data from the various connected radio frequency sensors 710, comparing signals to pre-stored signatures in a local database, generating results of comparisons, and assembling radio frequency fingerprints to the electromagnetic persona engine 720.

The electromagnetic persona engine 720 may operate according to one or more electromagnetic persona engine modules 820. The electromagnetic persona engine 720 may receive radio frequency fingerprint feeds from one or more radio frequency concentrators 715. The electromagnetic persona engine 720 can process the radio frequency fingerprint feeds to generate electromagnetic personas. The electromagnetic persona engine 720 can receive signals from multiple radio frequency concentrators 715 representing detected electromagnetic emissions from various wireless devices 110. The electromagnetic persona engine 720 can correlates multiple radio frequency fingerprints together to establish the existence of an electromagnetic persona. For example, many current smartphone models may have multiple different types of radios, which can be in various states of operation at various times. For example these radios might include, wireless cellular 2G/3G/4G/LTE for voice and data traffic (GSM/UMTS/CDMA), Wi-Fi, Bluetooth, NFC, positioning, and so forth. These different radios may or may not be transmitting at a given instant. Each wireless device 110 may generate a plurality of radio frequency fingerprints representing transmissions of one or more of the various radios associated with the wireless device 110.

Similar location information associated with detected signals may be used as further evidence of a physical association of the various radios associated with a particular wireless device 110.

The electromagnetic persona engine 720 may process multiple radio frequency fingerprints received at the same or different radio frequency sensors 710 and/or at the same or different radio frequency concentrator 715 to determine that a certain grouping of radios typically appears at or about the same time window and/or at or about the same location, and can therefore logically be assumed to be a part of the same physical instance of a wireless device 110. The electromagnetic persona engine 720 may also use relative received signal strength information to group (or not group) certain radio signals as part of the same physical instance of a wireless device 110. The electromagnetic persona engine 720 may also use unique software or hardware identifies, such as various MAC addresses, IMEI, physical address, or network addresses. For example, some manufactures use a MAC address for Bluetooth that is similar too, or somehow related to, the Wi-Fi MAC address on the same wireless device 110. Radios within a particular wireless device 110 or even within a particular version of hardware or SoC (system on chip) may have radio frequency emission signatures that can be used to identify the signals as originating form the same source. The electromagnetic persona engine 720 may leverage a fingerprint matching database. The fingerprint matching database may be periodically updated with the electromagnetic fingerprints, or related information, of known devices, device models, manufacturers, radio chip or SoC providers, software/firmware versions, and so forth.

The super-persona engine 730 may function according to one or more super-persona engine modules 830. The super-persona engine 730 can process electromagnetic personas to generate super-personas. The super-personas may be communicated to the behavior engine 740. The super-personas may be considered an abstraction representing an entity that is associated with one or more electromagnetic personas. For example, a super-persona instance may be a data structure representing an entity such as an individual, vehicle, asset, or building, which can possess one or more electromagnetic personas. In the case of an individual, their super-persona may comprise, at a given time, one or more of a smartphone, a tablet computer, a laptop computer, a wireless headset, a wireless fitness monitor, other wearable devices, other sensors, and so forth. One or more of these wireless devices 110 may have emitted an electromagnetic signal, may have been detected as an electromagnetic persona, and then may then be associated with a super-persona. Multiple wireless devices 110 may activate and transmit at various times while in the possession of the entity, may have a radio emission be detected, and be determined by the super-persona engine 730 to be associated with the particular entity. Typically, behaviors of the entity may be determined as a function of the identity of the entity, and the behavior of the entity as represented by the various electromagnetic personas detected over a sufficient period of time for a behavior to be identified. The super-persona engine 730 may be a computer-implemented system that processes electromagnetic persona data received at various times from various radio frequency sensors 710 to generate super-persona data. Data representing super-personas may be stored in a super-persona database. The super-persona database may also be accessed by the behavior engine 740 and various other components or subsystems presented herein.

The behavior engine 740 may function according to one or more behavior engine modules 840. The behavior engine 740 can support the detection of wanted and unwanted behaviors, compliance or noncompliance with predetermined policies, and generation of alerts or alarms for handling by appropriate personnel. The behavior engine 740 can maintains a database of detection episodes, which stores data corresponding to various super-personas and their detected behaviors, over particular time periods, to facilitate the application of rules or policies for determining behavior of the entity. The behavior engine 740 can provide behavior related information and/or warnings in real time or near-real time. For example, an alert, alarm, or warning may indicate that a potential security threat exists allowing for rapid response by security personnel.

When the behavior engine 740 detects a potential security issue, the behavior engine 740 may transmit a message and/or warning to security personnel and their respective user devices (such as the console 140) at or near the facility or area monitored.

The detection episodes database associated with the behavior engine 740 may store data corresponding to a history of events or episodes of a particular super-persona or entity. Such information can facilitate the determination of normal, observed, and expected behavior for certain super-personas. The behavior engine 740 may also maintain a database of behavior signatures. Such a behavior signature data may comprise a set of preprogrammed behavioral profiles of acceptable or unacceptable behavior for any given entity. These behavior profiles may include locations where the particular entity is authorized, locations that are unauthorized, associations with other entities that may be considered suspicious, and/or various other approved or disapproved behaviors. Disapproved behaviors may also be flagged as worthy of attention by an alert to security personnel or direction of security resources such as surveillance cameras. A system administrator or other authorized user may construct the database of behavior signatures. Examples may provided by a system vendor or installer. According to certain examples, an entity who is a male child may be authorized for "normal behavior" within his approved classroom(s), the lunch room, the boys' restroom, and/or the hallway to the main entrance. However, the same male child may be unauthorized in the girls' room, the janitor's closet, a back entrance to the school, exiting the school's perimeter during school hours, or otherwise at locations on the school campus that are unexpected. In such cases of "normal" behavior, the behavior engine 740 may record episodes of normal behavior over time. In cases of unexpected or unauthorized behavior or presence, an alert or alarm may be issued to the console 140 or other security/administrative system. Factual details of the super-persona representing the male child may be recorded in the detection episodes database.

The behavior engine 740 can receive auxiliary identification information 735 to be used in conjunction with electromagnetic persona information, super-persona information, detection episode data, or any other information to execute operations of the behavior engine 740. The behavior engine 740 can communicate with a "known offenders" database that can store information identifying the electromagnetic personas and/or super-personas of terminated employees or other known "black listed" individuals. The behavior engine 740 can use this auxiliary identification information 735 along with behavior signature or information from the behavioral signatures database to issue alarms or alerts in response to detection of an electromagnetic persona and/or super-persona corresponding to malicious or otherwise unauthorized entities. Similarly, the behavior engine 740 may receive auxiliary identification information 735 related to building or facilities for access, security, evacuation, and the like. According to certain examples, a building or facilities access control system may receive access control information from "card swipe," RFID, or other type of security token. Such security or access control tokens may provide auxiliary identification information 735 to the behavior engine 740. The access control system may have information identifying a particular individual (one entity) who is authorized to enter/access a building or facility (another entity). The coupling of the auxiliary identification information 735 from an access control system with electromagnetic persona data and super-persona data can support inclusion of an additional level of behavior awareness and policy control over facilities.

The behavior engine 740 may apply rules, models, or algorithms on presence, location, and time series data to identify normal and abnormal behaviors. The behavior engine 740 may utilize machine-learning algorithms to identify the electromagnetic persona and/or super-persona behaviors of various electromagnetic personas and super-personas associated with various entities being monitored and/or localized over time and space. For example, temporal and/or spatial locational correlation between two or more entities or an entity and particular locations may be determined over time to identify normal behavior of one or more entities. Divergence from this normal behavior may be measured, such as by variation in a correlation from an expected value, and compared to one or more thresholds to identify potential security issues. As a non-limiting example, the behaviors of a particular entity may be monitored over a period of time to identify locations that the entity visits at certain times (e.g., meeting at board room on Mondays at 9 AM, etc.), other entities with which the entity is in the presence of (e.g., lunch with coworkers at noon every weekday, etc.), or the like. Such normal behavior may be determined and stored for particular entities and substantial divergence from the normal behavior may be flagged for potential security review. If a divergence is detected where the entity does not have their expected lunch with coworkers, this clearly may not rise to a level to trigger an alarm. However, if the entity is instead observed to be in an unauthorized area, the divergence may be flagged for further investigation.

The various persona analysis databases 850 may serve as data stores in support of the electromagnetic persona engine 720, super-persona engine 730, behavior engine 740, or other components of the persona analysis system presented herein. The persona analysis databases 850 may comprise, reside within, share resources with, or otherwise be associated with the various analysis databases 380. The various persona analysis databases 850 may include the super-persona databases, behavior signatures databases, behavior databases, local signal detection databases, fingerprint matching databases, detection episode databases, known offenders databases, database associated with access control, or databases associated with auxiliary identification information 735.

The radio frequency sensors 710, radio frequency concentrator 715, electromagnetic persona engine 720, super-persona engine 730, behavior engine 740, systems associated with the auxiliary identification information 735, systems associated with the various persona analysis databases 850, or any other systems associated with the technology presented herein may be any type of computing machine such as, but not limited to, those discussed in more detail with respect to FIG. 14. Furthermore, any modules (such as the radio frequency concentrator modules 815, electromagnetic persona engine modules 820, super-persona engine modules 830, or behavior engine modules 840) associated with any of these computing machines or any other modules (scripts, web content, software, firmware, or hardware) associated with the technology presented herein may by any of the modules discussed in more detail with respect to FIG. 14.

In an example campus persona awareness scenario, a secure campus may be supported by technology presented herein. The campus may be a school, university, commercial enterprise, shopping center, collection of residences, or any other similar predefined area for identification and protection. The radio frequency sensors 710 can capture the electromagnetic personas of individuals and/or their associated vehicles. Many modern vehicles possess a number of electromagnetic signal emitting devices or subsystems. These are analogous to wireless devices 110 in accord with the technology presented herein. Examples include gate/garage openers, support services such as OnStar, tracking services such as LoJack, toll services such as E-ZPass, mobile voice/data devices, and so forth. Electromagnetic personas associated with these wireless devices 110 may be captured and monitored as they enter and move about the campus. A super-persona may be established for the individual (or vehicle) and any associated wireless devices 110, including those on or in the vehicle as well as those in the possession of the individual. The behavior engine 740 can establish a risk profile for a determined super-persona. The risk profile may be based on prior historical data derived from the detection episodes database (if the entity has been seen before) and/or any associated electromagnetic personas. A cautionary risk profile and threat level may be established for an unknown entity, while an alarm/alert risk profile or threat level may be established for a known malicious entity. Appropriate warnings, messages, security alerts, and so forth may be issued to security personnel via the console 140, text messages, mobile alerts/notifications, web interfaces, telephone calls, security alarms and so forth.

According to certain embodiments, the radio frequency sensors 710 can capture the electromagnetic personas of autonomous or remote-controlled vehicles. Autonomous or remote-controlled vehicles generally comprise a number of electromagnetic signal emitting devices or subsystems. These are analogous to wireless devices 110 in accord with the technology presented herein. Examples of autonomous or remote-controlled vehicles may include unmanned aerial vehicle (UAVs), drones, unpiloted aerial vehicle, remotely piloted aircraft, self-driving cars/trucks, remotely driven cars/trucks, and so forth. Electromagnetic personas and super-personas may be generated for the various types of autonomous or remote-controlled vehicles. Characteristics and operations that may be specific to autonomous or remote-controlled vehicles may include detection of flying emitters, identifying wireless drone (or remote piloted) command and control communications, identifying wireless video/audio backhaul channel, radio frequency Doppler detection (flying vehicles can move very rapidly), extended acknowledge windows added to wireless protocols, identify lines of bearing, beam-forming in azimuth and elevation for geolocation of flying emitters and so forth. Various emissions specific to autonomous or remote-controlled vehicles may be scanned and identified. Radio frequency signatures for these particular radio emissions may be incorporated into the various detection and fingerprint databases. Multiple radio techniques including, but not limited to, super-persona aggregation may be applied to multiple radios of autonomous or remote-controlled vehicles. For example, a drone may have a control channel, Wi-Fi, and wireless video backhaul. A particular model or instance of drone may be identified by the combination of these along with related radio frequency signatures and/or identification or address details. According to certain embodiments, the command/control channel of a remotely controlled vehicle may be processed to determine a geolocation associated with the controller/pilot on the ground for possible security mitigation.

According to certain embodiments, the electromagnetic personas may be used directly for security and safety detection and identification, without necessarily establishing a super-persona prior to taking action. For example, the network of radio frequency sensors 710 may detect a collection of wireless devices 110. The radio frequency fingerprints of the various wireless devices 110 may be provided to the electromagnetic persona engine 720 with the electromagnetic persona data being provided directly to the behavior engine 740. The behavior engine 740 may then directly determine if any electromagnetic persona of a detected device corresponds to a known person of interest (either on a "black list" of excluded or high risk persons or on a "white list" of approved and authorized persons). Likewise, the electromagnetic persona data can be directly utilized in a behavior signature, without necessarily first being associated with a super-persona. It should be appreciated that security risk detection and policy enforcement may thus be performed directly from electromagnetic persona data without having to first identify a corresponding super-persona.

According to certain embodiments, a confidence index may be established that relates to an entity. For example, the same wireless devices 110 (and their electromagnetic personas) along with the same access control employee badge may have been identified together multiple times a short period. This can give a high level of confidence that the particular individual associated with the super-person is authorized according to their access control card. Furthermore, it may be expected that observed behavior would reoccur in the future. The electromagnetic personas resulting from the detected warless devices 110 may be confidently associated with the super-persona of the employee entity associated with the access control cad or token.

According to certain embodiments, wireless devices 110 associated with a visitor may be detected when their electromagnetic personas are determined. As the visitor presents identification to an attendant or security officer, the visitor's identification information can be combined with the electromagnetic persona information to create a visitor super-persona. The visitor super-persona can persist in the system indefinitely or until purged according to data retention policies. If an electromagnetic persona associated with the visitor reappears on a subsequent occasion after the visit, rapid identification of the person carrying the wireless device 110 associated with the electromagnetic persona may be supported providing an improved security awareness.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 9:
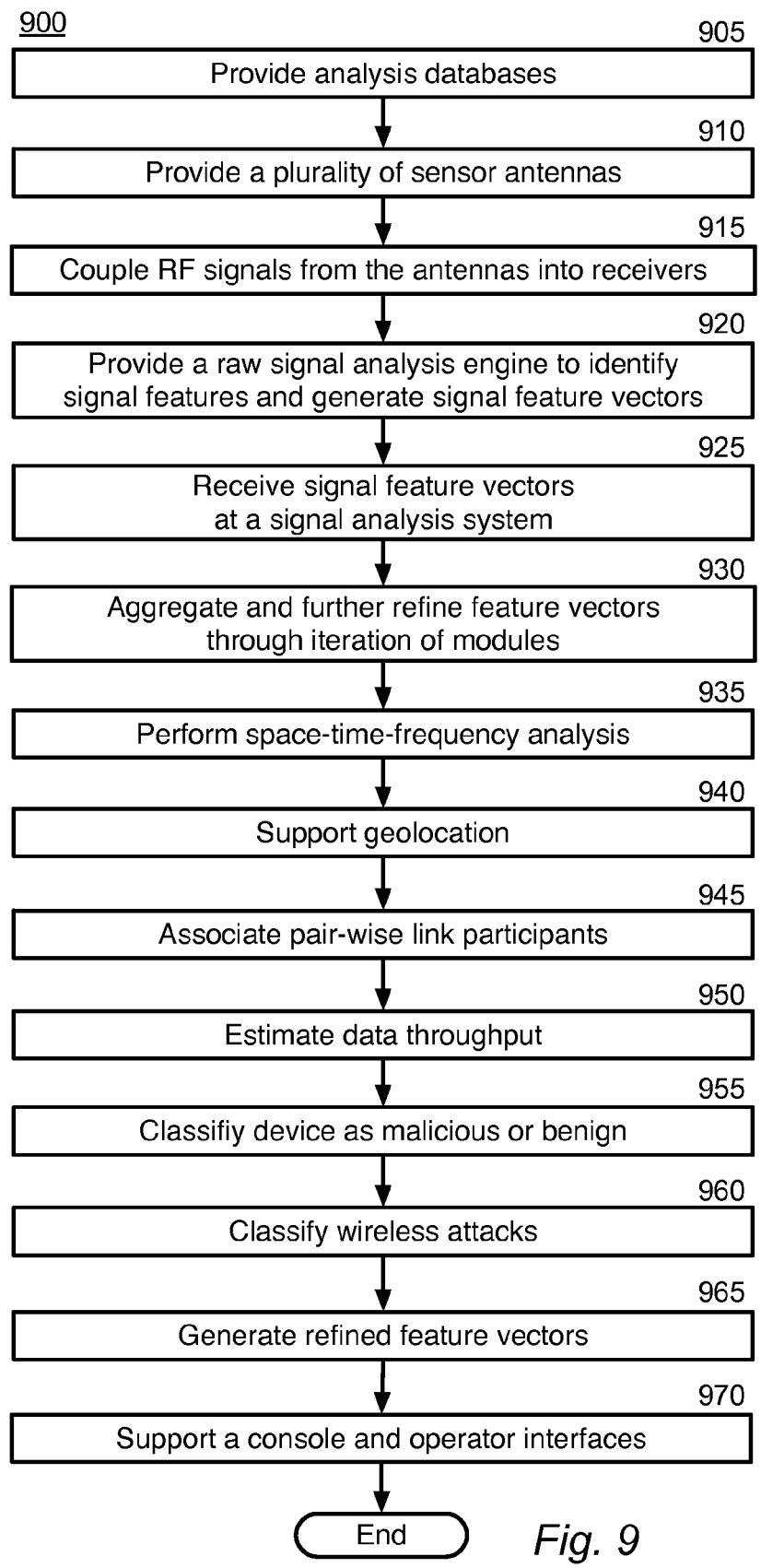
FIG. 9 is a block flow diagram depicting a method for signal analysis to support electromagnetic signature analysis and threat detection in accordance with one or more embodiments presented herein.

FIG. 9 is a block flow diagram depicting a method 900 for signal analysis to support electromagnetic signature analysis and threat detection in accordance with one or more embodiments presented herein. In block 905 analysis databases 380 may be provided. The analysis databases 380 may include, among various other examples, signal databases 450, sensor position and calibration databases 610, and attack databases 620. One or more of the signal processing and threat analysis stages of the signal analysis system 130 may leverage the analysis databases 380. The analysis databases 380 may contain various forms of information useful in analyzing the radio frequency signals collected by the sensors 120.

In block 910, a plurality of antennas 210 associated with sensors 120 may be provided. The antennas 210 may be used to collect a broad range of radio frequency signals from the electromagnetic environment for analysis. The antennas 210 may be monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 210 can be located in various locations around a room, around a building, or within different areas or floors of a building.

In block 915, the radio frequency signals 215 received by the antennas 210 may be coupled to radio receivers. The receivers may include both software-defined radios 335 as well as hardware-defined radios 340.

In block 920 a raw signal analysis engine 240 may be provided to identify signal features from the raw collected radio frequency signal 215. The raw signal analysis engine 240 may receive a digital representation of the raw collected radio frequency signal 215 in the form of digital I and Q signal samples. The received samples may be processed and refined to a discrete set of feature vectors.

Within the raw signal analysis engine 240, the time-frequency analysis module 410 can generate a set of frequency-domain data vectors for each radio frequency signal 215. For example, a fast Fourier transform (FFT) may be performed to compute the spectral energy content of the radio frequency signal 215. Energy clustering and association may be performed on each set of frequency-domain data vectors to determine discrete contiguous blocks of signal that are likely to have been transmitted from the same device. Spectrum feature extraction may be performed on each cluster to extract a set of signal features including, but not limited to, duration, bandwidth, center frequency, duty cycle, and average power.

The angle analysis module 420, within the raw signal analysis engine 240, can sweep through a range of antenna phases. Various phase combinations of the antennas 210 may be used in order to discriminate the source of an emission by an angle relative to the antennas 210.

The modulation classification module 430, within the raw signal analysis engine 240, can classify modulation types within the radio frequency signal 215. The modulation classification module 430 may compare received feature vectors to features of a library of known signals.

The signal decoder module 440, within the raw signal analysis engine 240, can decode messaging layer content from modulation feature vectors. The signal decoder module 440 may retrieve appropriate codecs and drivers for decoding the signal. The signal decoder module 440 may decode handshaking messages to identify devices using common medium access signals like the MAC address of a device.

The raw signal analysis engine 240 can generate feature vectors by processing the received I and Q signal samples.

Each signal feature vector may be a set of values representing attributes of the signal as a condensed collection of intelligible features and data as identified within the collected radio frequency signal 215. Various modifiers or descriptors indicating features or attributes of the signal may be appended to the feature vectors at each processing step. Some examples of these modifiers or descriptors may include geolocation parameters, signal duration, signal bandwidth, signal angle, modulation type, and so forth.

In block 925, the signal analysis system 130 can receive signal feature vectors. The signal feature vectors may be used in detecting, classifying, and mitigating wireless attacks against one or more wireless devices 110. Various digital signal processing stages may be applied to the received feature vectors. These digital signal processing stages may comprise modules of the signal analysis system 130. Generally, a signal feature vector may be a set of values representing attributes of a particular signal.

In block 930, the signal analysis system 130 can aggregate and further refine feature vectors through the iteration of various processing modules. Example modules of the signal analysis system 130 may include space-time-frequency analysis 350, geolocation 355, pair-wise link association 360, data throughput estimation 365, device classification 370, and attack classification 375. As a feature vector is passed from one processing module or stage to the next, attributes may be added or subtracted from the feature vector, further refining the attributes of the particular signal to better identify and/or classify the contents of the signal. Feature vectors may be appended with various feature attributes relevant to the processing at each module or processing stage.

In block 935, the space-time-frequency analysis module 350 can process feature vectors to match them to a common reference frame. The space-time-frequency analysis module 350 can also resolve redundant signal detection when the same signal is detected at more than one sensor 120. The space-time-frequency analysis module 350 can perform signal clustering and association. Feature vectors from multiple sensors 120 may be clustered into common groups. The space-time-frequency analysis module 350 can perform feature extraction. Feature extraction can cull disparate refined feature vectors from multiple sensors 120 into an aggregate feature vector that seeks to represent the information about wireless devices 110 in the environment with minimal, or significantly reduced, redundancy. Certain dimensions of aggregated feature vectors may provide identical values across multiple sensors 120. These may include duration, bandwidth, center frequency, and duty cycle, among others. Certain other dimensions of aggregated feature vectors may be maintained as a list of potentially disparate values, with each value corresponding to a single sensor 120. For instance, the dimensions of the aggregate feature vectors representing a power and an angle of a signal may vary across sensors 120 due to the sensors being in different locations.

In block 940, the geolocation module 355 analyzes received signals to locate the position of wireless devices 110 within the electromagnetic environment. Geolocating signals in an environment that is dense with other signals and contains complex propagation effects like multipath and Doppler shift can present several challenges. To aid in estimate the position of each signal, propagation modeling may leverage a database of sensor positions and various parameters associated with the propagation environment. The geolocation module 355 can carry out propagation modeling using the calibration parameters along with information on signal power and angle values, and a coordinate system of locations for the sensors 120. These quantities may be used to calculate a forward model of the expected power and angle values for sample points in space. These model values may be used to create an initial geolocation estimate using multilateration techniques. The initial geolocation estimate may be used to seed a model-matching filter. The model-matching filter can evaluate multiple aggregated feature vectors in series. For each aggregate feature vector, the model-matching filter may initialize an ensemble of hypothesized signal source positions around the initial seed position. In an iterative process using the model values, a converging estimate of the aggregate feature vector position may be generated for each wireless device 110 being located. As part of each iteration, hypothesized positions that do not fit the model may be removed. After a sufficient number of iterations, the position estimate for the aggregate feature vector may converge to a single point. This approach may be repeated for all aggregate feature vectors.

In block 945, the pair-wise link association module 360 may determine a link pair of wireless devices 110. Generally a signal emanates from a source wireless device 110 and is intended for one or more destination wireless devices 110. The emitting device and a receiving device may constitute a link pair. Information about link pairings may be useful in inferring the behavior and intent of wireless devices 110 within a network. Modulation association may be implemented within the pair-wise link association module 360. Generally, wireless devices 110 within a wireless network participate in pair-wise links between devices engaged in common or corresponding wireless features such as modulation, position, space-time-frequency occupancy, and so forth. Pair-wise links may also be determined by examining decoded message contents. Feature vectors successfully evaluated by the pair-wise link association module 360 may be appended with a new set of feature vectors that contain the pairwise link information. It should be appreciated that these techniques used to associate pairs of communicating wireless devices 110 may also apply to groups of three or more wireless devices 110 that are in communication with one another.

In block 950, the data throughput estimation module 365 can estimate an amount of data in each pairwise feature vector. Even when signal content data is not directly decoded, its spectral occupancy may serve as a proxy for the amount of data that is being passed through each link wireless devices 110 associated with each pairwise feature vector. This estimation may occur on two levels. The first level, spectrogram analysis, can use Shannon's capacity formula to bound the maximum amount of data transfer. The second level, modulation and link analysis, can leverage a signal signature database containing data throughput values for various known signal modulation schemes. By pairing the modulation feature values included in the pair-wise feature vector with the signal signature database entries, modulation and link analysis can provide a reasonably accurate estimate of the data throughput. An estimate of the data throughput for each signal may be added to each corresponding pair-wise feature vector.

In block 955, the device classification module 370 can classify wireless devices 110 as being either benign or malicious (also referred to as unauthorized or rogue). Devices classification can function to identify each pairwise feature vector as either benign or malicious. The device classification module 370 can perform signature matching, which attempts to match the signal and link features of each data throughput feature vector to known examples of benign and malicious devices in the signal signature database. The device classification module 370 can further perform anomaly analysis, which compares the features associated with each data throughput feature vector into an aggregate metric. If the aggregate metric exceeds one or more established anomaly thresholds, the associated wireless device 110 may be flagged as malicious or potentially malicious. The device classification module 370 can also perform location analysis or geo-fencing, which evaluates the geo-location features associated with each feature vector. If an unauthorized wireless device 110 is identified to be within in a restricted area, then the wireless device 110 may be flagged as malicious or potentially malicious.

In block 960, the attack classification module 375 can determine the type of attack being perpetrated by a malicious wireless device 110. The attack classification module 375 can also determine if multiple malicious wireless devices 110 are involved in the attack and which victim wireless devices 110 are being attacked. The attack classification module 375 can support attack matching, which can use a library of attack templates to match malicious wireless device 110 activities to known attacks such as spoofing, DoS, jamming, wormholes, and others discussed herein or known in the art.

In block 965, the signal analysis system 130 can generate feature vectors that have been refined through the iteration of various processing modules. The signal feature vectors may be transported within the signal feature vector network 330 to the console 140 or various other applications.

In block 970, a console 140 and various operator interfaces can support configuring, controlling, or reviewing analysis results associated with the signal analysis system 130. The console 140 can provide visualization features for use by security administrators to monitor the electromagnetic environment for wireless security threats. Such visualization features may include displays about the area under surveillance including device type, device locations, pairwise wireless communication links between devices, estimates of the data throughput being transmitted by devices, attack types being perpetrated, malicious devices, victim devices, and so forth. The console 140 may be a desktop computing machine or any other type of computing machine. The operator interfaces may support tablets, mobile devices, web or browser-based applications, alarm system interfaces, and the generation of various reports to system administrators or security personnel.

Figure 10:
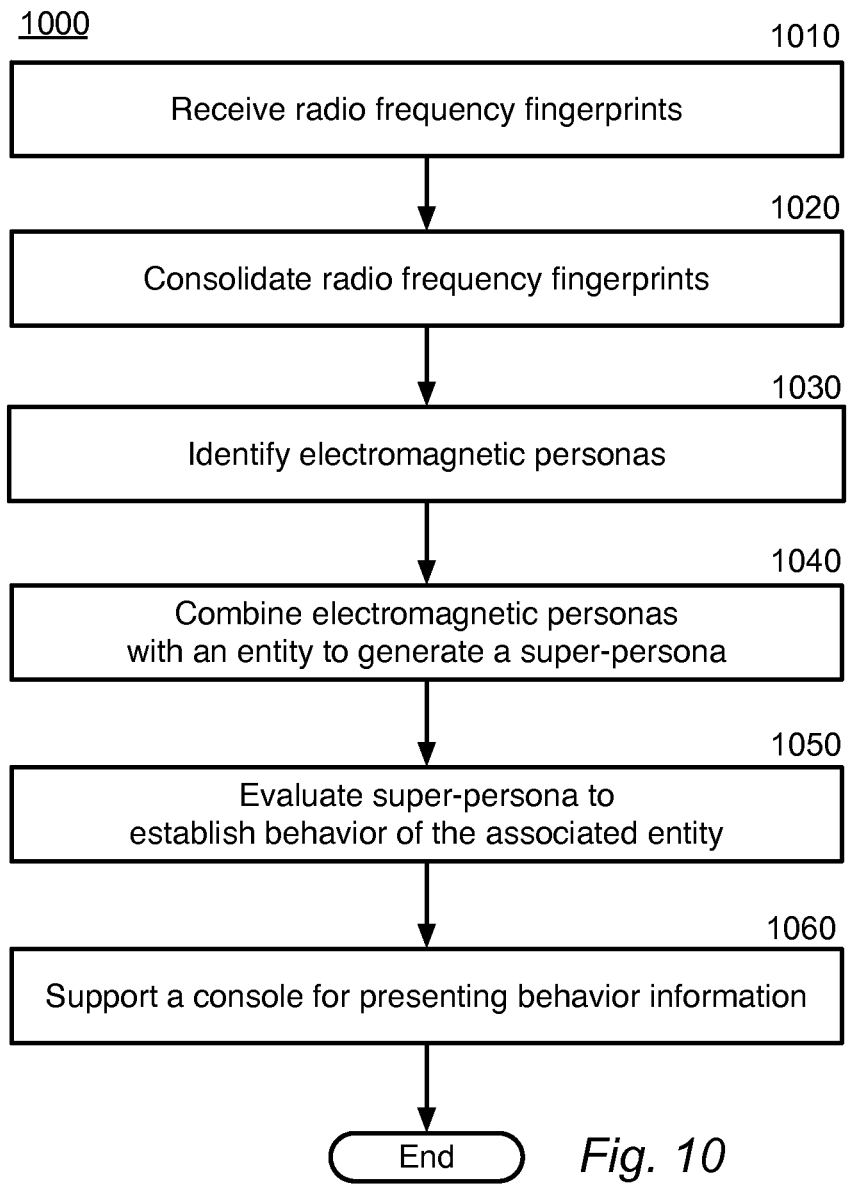
FIG. 10 is a block flow diagram depicting a method for establishing, maintaining, and processing electromagnetic personas in accordance with one or more embodiments presented herein.

FIG. 10 is a block flow diagram depicting a method 1000 for establishing, maintaining, and processing electromagnetic personas in accordance with one or more embodiments presented herein. In block 1010, one or more radio frequency sensors 710 may receive radio frequency fingerprints associated with one or more wireless devices 110. The radio frequency sensors 710 may receive electromagnetic signals through respective antennas 210. These electromagnetic signals may be emitted from, or received by, wireless devices 110 associated with various entities within an area under surveillance.

In block 1020, a radio frequency concentrator 715 may support consolidation of electromagnetic signals received by multiple radio frequency sensors 710. The consolidated signals may be identified as having originated from the same wireless device 110. The consolidation can avoid or reduce redundancy of reporting from the various antennas 210 and radio frequency sensors 710.

In block 1030, an electromagnetic persona engine 720 can generate electromagnetic personas by associating detected radio frequency signals with a particular type of wireless device 110. The generated electromagnetic persona may include various pieces of information related to the wireless device 110. Such information may be derived from the received electromagnetic signals. According to some examples, derived information may include device-type identification data and/or device-specific identification data that may be uniquely associated with a particular wireless device 110. Electromagnetic personas can also indicate a time of detection of the wireless device 110, a detection interval, a location, or a series of locations (representing motion).

The electromagnetic persona engine 720 can aggregate electromagnetic fingerprints to form electromagnetic persona. This may be done by observing fingerprints over time or by grouping fingerprints according to manufacturer, software version, firmware version, or other identifying details. The electromagnetic persona may represent the detection of a particular wireless device 110, or radio associated therewith. Data representing the wireless device 110 and its emissions, including time and location information, form part of a static or dynamically changing electromagnetic persona associated with the wireless device 110.

In block 1040, the super-persona engine 730 can associate one or more electromagnetic personas with supplemental identifying information. The supplemental identifying information may include additional data associated with a particular entity determined as possessing one or more wireless devices 110 operating within the area under surveillance. The super-persona engine 730 may be operative to generate and store data corresponding to a super-persona comprising one or more electromagnetic personas, supplemental identifying information, expected behavior data, and a super-persona activity log. The super-persona may link one or more electromagnetic personas to a single entity (such as an individual). The entity may be known or unknown. When known, the entity may be linked to other sources of data, such as building access control systems. The super-persona data set may comprise data items representing the associated entity's name, the types of wireless devices 110 detected as being present with the entity, the identifiers associated with the electromagnetic emitting radios of the devices 110, a last seen configuration data, current configuration data, and so forth.

In block 1050, the behavior engine 740 can evaluate super-persona to establish behavior of the associated entity (such as an individual). The behavior engine 740 can process data corresponding to a detected electromagnetic persona and an associated super-persona, to determine a behavior associated with the entity associated with the super-persona, or in some cases, the electromagnetic persona directly. The behavior engine 740 may be operative to generate data indicative of behavior identified as normal for a particular super-persona during a detection interval or behavior identified as unexpected for the particular super-persona. The behavior engine 740 may also be operative to provide a detection output indicating that an expected behavior for an electromagnetic persona and/or super-persona, an unexpected behavior for an electromagnetic persona and/or super-persona, presence of an unknown electromagnetic persona, or a compliance alert upon the detection of particular predetermined event.

The behavior engine 740 may create, model, and/or apply rules in connection with various behaviors associated with entities, electromagnetic personas, or super-personas. The behavior engine 740 can identify and localize behavioral signatures such as loitering (being in one place for too long), casing (observed in an area multiple times), erratic movement (abnormal patterns in movement by one or more persona), tailgating (observation of multiple persona in a secure area when only one authentication occurred), commingling (two or more individuals that are not to interact found to be in relative proximity for periods of time that may indicate violations policy), credential sharing, unauthorized location (an individual is detected in an unauthorized area), and so forth. The behavior engine 740 can detect behavioral signatures based on preloaded behavior templates stored in a behavior database.

In block 1060, a console 140 may be supported for presenting behavior information. The console 140 may be a known security awareness system that utilizes data from electromagnetic persona either alone, or in conjunction with other security or safety detection data. These may include data from access control systems, video surveillance systems, motion detection systems, and so forth. This data integration may provide more complete security or safety awareness capability. A monitoring or response function associated with the console 140 may receive alarm and/or alerts from the behavior engine 740 or connected systems. The alarms/alerts may include any information of potential concern regarding the presence, activates, attributes, or behaviors of personas, super-personas, or associated entities. Administrative functions associated with the console 140 may allow entry, testing, updating, or other interaction with rules and polices for any operations presented herein such as detection, localization, alerts, or other operations regarding the presence, activates, attributes, or behaviors of personas, super-personas, or associated entities.

Figure 11:
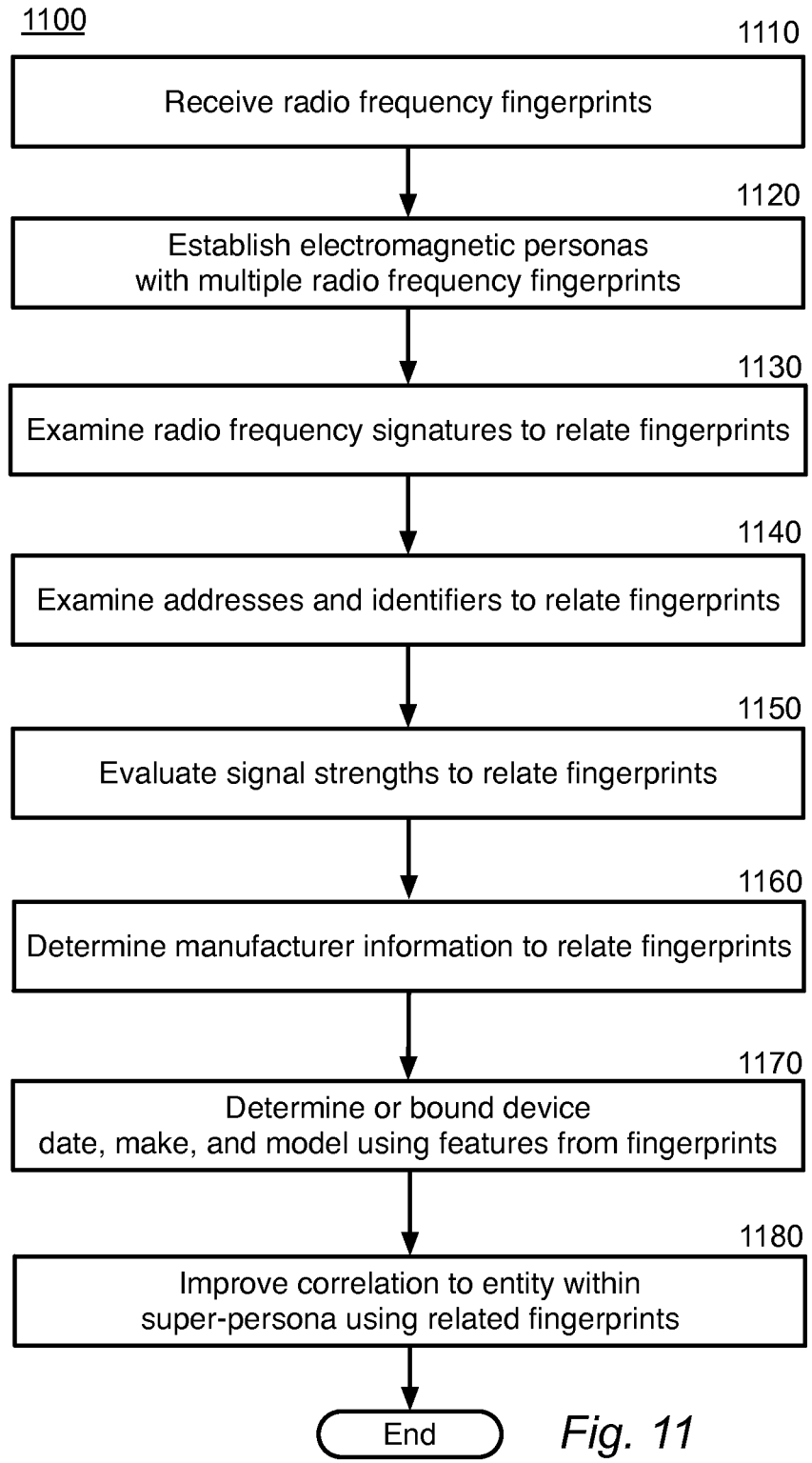
FIG. 11 is a block flow diagram depicting a method for cross-modality electromagnetic signature analysis for radio frequency persona identification in accordance with one or more embodiments presented herein.

FIG. 11 is a block flow diagram depicting a method 1100 for cross-modality electromagnetic signature analysis for radio frequency persona identification in accordance with one or more embodiments presented herein. In block 1110, one or more radio frequency sensors 710 may receive radio frequency fingerprints associated with one or more wireless devices 110. The radio frequency sensors 710 may receive electromagnetic signals through respective antennas 210. These electromagnetic signals may be emitted from, or received by, wireless devices 110 associated with various entities within an area under surveillance.

In block 1120, an electromagnetic persona engine 720 can establish electromagnetic personas with multiple radio frequency fingerprints. The electromagnetic persona engine 720 can generate electromagnetic personas by associating detected radio frequency signals with a particular type of wireless device 110. The multiple radio frequency fingerprints may originate respectively from multiple radios within the same wireless device 110. These diverse radios may relate to different modalities of the wireless device 110. For example, Wi-Fi, Bluetooth, NFC, and GSM/CDMA/4G/LTE mobile voice/data may make up for diverse wireless modalities within a single smartphone wireless device 110. In such a case the fingerprint for each of the modalities may be integrated into the persona for the wireless device 110 once it is determined that they are related to the same wireless device 110. Prior to that, they may be processed as different electromagnetic personas. Once related, examining the fingerprints and electromagnetic signatures together can support cross-modality electromagnetic signature analysis. Cross-modality electromagnetic signature analysis can support determining additional information about the wireless device 110 and may also provide additional information on the associated entity, such as the individual user of the wireless device 110.

The generated electromagnetic persona may include various pieces of information related to the wireless device 110. Such information may be derived from the received electromagnetic signals. According to some examples, derived information may include device-type identification data and/or device-specific identification data that may be uniquely associated with a particular wireless device 110. Electromagnetic personas can also indicate a time of detection of the wireless device 110, a detection interval, a location, or a series of locations (representing motion).

In block 1130, radio frequency signatures may be examined to relate fingerprints. Identifying signatures within the radio frequency fingerprints may be used to identify related radio emissions. For example, a wireless device 110 supporting both Wi-Fi and Bluetooth may have particular signatures associated with it's Wi-Fi transmissions that may be used to identifying it as a common source of Bluetooth transmissions having their own particular signatures. These particular signatures may be related to design and implementation details of the respective radios. For example, signals transmitted from a specific version of a radio (according to integrated chip versions, printed circuit board revisions, software/firmware versions, OS driver versions, and so forth) might have identifiable timing, duty cycles, context switching patterns, modulation variances, spurious emission levels, spurious emission frequencies, power spectrum envelopes, and other electromagnetic characteristics.

When one radio frequency fingerprint occurs near the same time or location of another radio frequency fingerprint. Radio frequency signatures of the two fingerprints may be examined to determine a likelihood that the two fingerprints originate from different radios within the same wireless device 110. The signature information to make these determinations may be provided within one or more of the persona analysis databases 850 or analysis databases 380. Information may also be provided to indicate what may be determined about the wireless device 110 given these signature determinations. Similarly, what may be determined about one radio frequency fingerprint from related radio frequency fingerprints.

In block 1140, addresses and identifiers may be examined to relate fingerprints. Data points from unique identifier fingerprints may be correlated across communication layers or modalities. Unique identifiers may include MAC addresses, IMEI numbers, serial numbers, or other addresses or identifiers. According to certain examples, correlations between a Bluetooth MAC address within one radio frequency fingerprint and a Wi-Fi MAC address within another radio frequency fingerprint can indicate a high probability of the two fingerprints originating from the same type of chip, radio, or wireless device 110.

According to a more detail example of a wireless device 110 transmitting both Bluetooth and Wi-Fi traffic, the Bluetooth radio may only transmit its full MAC address while pairing, which may be an infrequent event. At other times, only a portion of the MAC address (the three octet LAP) may be transmitted. It can be beneficial to obtain the entire Bluetooth MAC address for both identification and also to determine the manufacturer identifier code. In contrast, Wi-Fi radios always transmit their full MAC address. Correlations between a Bluetooth MAC address within one radio frequency fingerprint and a Wi-Fi MAC address within another radio frequency fingerprint can support identifying the full Bluetooth MAC address including the manufacturer identifier. Some wireless devices 110 made known relationships between their Bluetooth MAC address and Wi-Fi MAC address. These patterns may be identified and leveraged in cross-modality fingerprint analysis.

In block 1150, signal strengths may be evaluated to relate fingerprints. Two radio frequency fingerprints, even if from different communication modalities, may have similar relative power levels (such as received signal strength indicators or RSSIs) when originating from the same wireless device 110 or the same entity (such as an individual user). Accordingly, two radio frequency fingerprints may be identified from power level as part of the same electromagnetic persona.

In block 1160, manufacturer information may be determined to relate fingerprints. Manufacturer information may be determined from unique identifiers (such as MAC addresses) or form radio frequency signatures such as timing, spurious emissions, modulation variations, context changes, or so forth. Information retrieved from the persona analysis databases 850 or analysis databases 380 according to manufacturer information may support further understanding about the wireless device 110 or the associated entity (such as its user).

In block 1170, details about one or more wireless devices 110 may be determined (or at least bounded) according to features from one or more radio frequency fingerprints. These details may include, among other information, device date, make, and model information. Various data points within the radio frequency fingerprints may be analyzed in light of information retrieved from the persona analysis databases 850 or analysis databases 380. This analysis can help uniquely identifying the wireless device 110 or at least establish relationship between its various radios (and their wireless modalities). For example, radio frequency fingerprints may establish details associated with the wireless device 110, such as cost constraining features (budget device or high-end device), lack of a particular feature, presence of a particular feature, legal/regulatory constraining features, transmit powers (may depend on country of device), channel selection (may depend on country of device), general feature constraints, features with respect to versions, features with respect to communication specifications (or other regulations), and so forth.

In block 1180, correlation to an entity within a super-persona may be improved using related fingerprints. Improved knowledge of a wireless device 110 and/or its radios may be provided by cross-modality electromagnetic signature analysis as presented herein. Improvements may include strengthened correlation within super-persona to access control tokens or other user identification. Improvements may also include strengthened localization estimates. In scenarios where devices periodically change their identifiers (such as rolling MAC addresses seen in some smartphones), radio frequency fingerprints may be used identify the wireless device 110 and even maintain a historical list of its address changes.

Consideration of cross-modality electromagnetic signature analysis can also benefit threat detection or penetration testing. Radio frequency signature analysis can improve detection of specific steps attempted to elicit information for the purpose of identifying it by correlation of multiple layers, or modalities, of device communications. An example at the physical network layer may include jamming or denial of service to force repairing or resends. An example at a higher network layer may include injecting protocol violations to force repairing or resends. Another example threat may include impersonation or man-in-the-middle type attacks. An impersonating system may attempt to appear or participate as another device that has already been authorized and/or connected to the network or other wireless devices 110.

Rouge gateways, or gateways for data exfiltration, may be detected using radio frequency signatures and fingerprints. Traffic of one type routed through a mobile device and out through another radio frequency interface type may be identifier. For example, a Bluetooth device may make a request for authentication to an Internet website. A wireless device 110 acting as a hub or gateway may receive the request and make a request to the Internet website for authentication information. The behavior of this IN/OUT traffic analysis paired with the device address data can provide a unique identifier.

Figure 12:
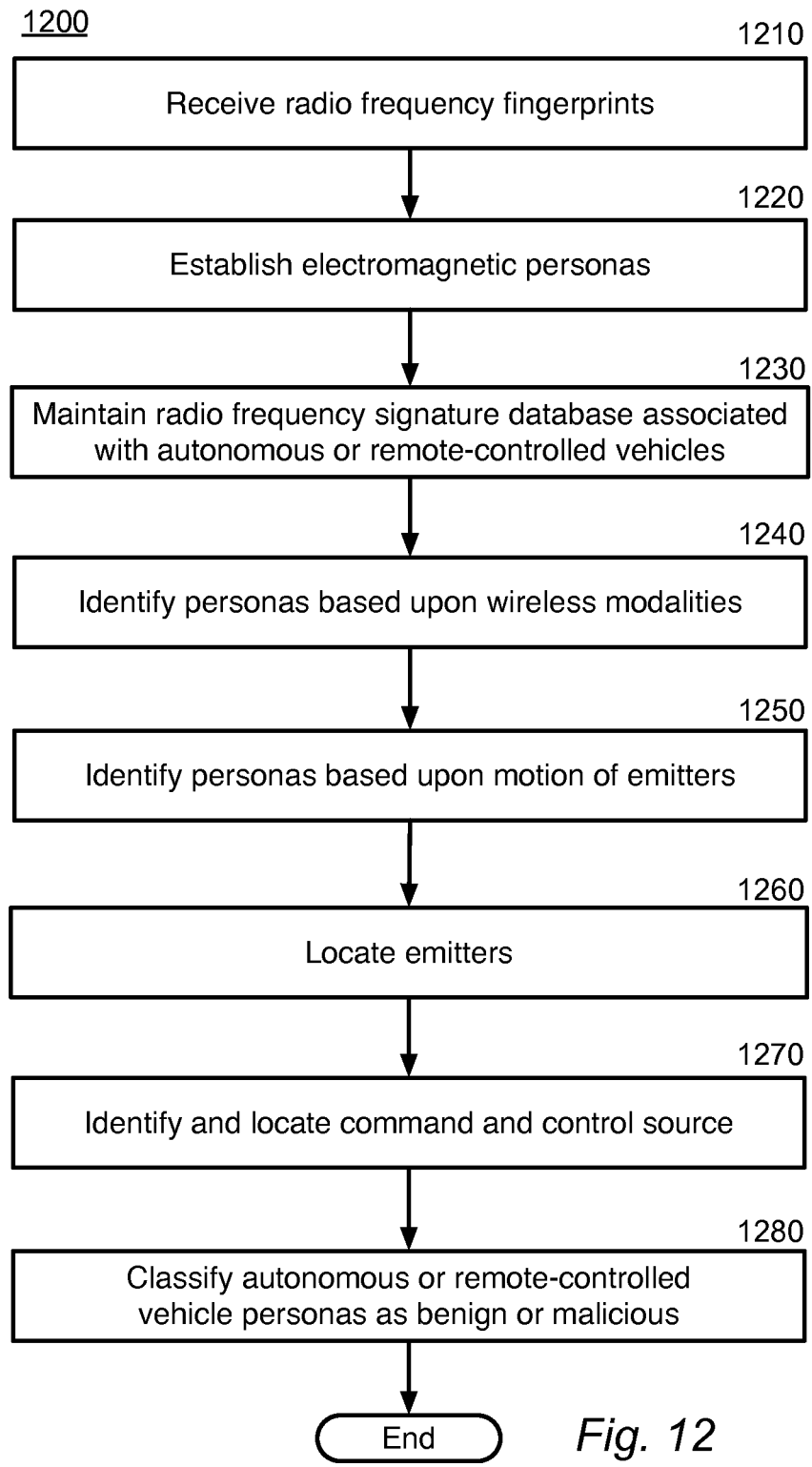
FIG. 12 is a block flow diagram depicting a method for electromagnetic signature detection and localization of ground and air vehicles in accordance with one or more embodiments presented herein.

FIG. 12 is a block flow diagram depicting a method 1200 for electromagnetic signature detection and localization of ground and air vehicles in accordance with one or more embodiments presented herein. In block 1210, one or more radio frequency sensors 710 may receive radio frequency fingerprints associated with one or more wireless devices 110. The radio frequency sensors 710 may receive electromagnetic signals through respective antennas 210. These electromagnetic signals may be emitted from, or received by, wireless devices 110 associated with various entities within an area under surveillance. The wireless devices 110 may include autonomous or remote-controlled vehicles and the various radios included therewith. Some specific examples of autonomous or remote-controlled vehicles may include unmanned aerial vehicle (UAVs), drones, unpiloted aerial vehicle, remotely piloted aircraft, self-driving cars/trucks, remotely driven cars/trucks, and so forth.

In block 1220, an electromagnetic persona engine 720 can establish electromagnetic personas for autonomous or remote-controlled vehicles. The area under surveillance for such vehicles may be around/within a campus, building, facility, or other geographical region. The area may also be centered around a vehicle itself. For example radio fingerprints in, and around, a vehicle may be under surveillance.

The electromagnetic persona engine 720 can generate electromagnetic personas by associating detected radio frequency signals with a particular type of wireless device 110. Multiple radio frequency fingerprints may originate respectively from multiple radios within the same wireless device 110. These diverse radios may relate to autonomous or remote-controlled vehicles. The generated electromagnetic persona may include various pieces of information related to the wireless device 110. Such information may be derived from the received electromagnetic signals. Electromagnetic personas can also indicate a time of detection of the wireless device 110, a detection interval, a location, a series of locations (representing motion), or bearings.

In block 1230, a radio frequency signature database associated with autonomous or remote-controlled vehicles may be maintained. The database may be part of, or associated with, the persona analysis databases 850 and/or analysis databases 380. The database may include fingerprints and/or signatures for the various emissions known to be associated with autonomous or remote-controlled vehicles. Examples may include rapid motion (possibly in both azimuth and elevation), command and control communications, video/audio backhaul channels, radio frequency Doppler, extended acknowledge or time out windows added to wireless protocols, and so forth.

In block 1240, radio frequency personas may be identified based upon wireless modalities known to be associated with autonomous or remote-controlled vehicles. These modalities may include, among others, protocols supporting command and control communications and video backhaul channels. Given the possible rapid motion of autonomous or remote-controlled vehicles, multiple radio frequency sensors 710 over diverse areas may receive emission (possibly over multiple wireless modalities) from a single wireless device 110 as it traverses one or more areas under surveillance. These physically diverse signal collections may be consolidated at the radio frequency concentrator 715 and/or the electromagnetic persona engine 720. Cross-modality electromagnetic signature analysis may also be supported when an associated persona or super-persona includes two or more related radio channels (modalities).

In block 1250, electro magnetic personas may be identified based upon motion of emitters associated with an autonomous or remote-controlled vehicle. Radio frequency fingerprints may be identified as associated with an autonomous or remote-controlled vehicle when they are rapidly moving at times punctuated by transitions to and from a stationary (parked/docked) state or when make abrupt ingress or egress form the area. Radio frequency fingerprints may be identified as displaying "flying" motion, which may include motion in elevation as well as azimuth around the sensor 710. Lastly, vehicles may move relatively quickly generating Doppler signals. Antenna interference from motion as well as propeller signal chopping may also be observed in vehicular wireless devices 110.

In block 1260, emitters may be identified as being located in accordance with autonomous or remote-controlled vehicles. Radio frequency fingerprints may be identified as associated with an autonomous or remote-controlled vehicle when they are localized to be outside building and include positions/motions in elevation as well as azimuth around a given sensor 710. Behaviors of autonomous or remote-controlled vehicles may include determining lines of bearing.

In block 1270, command and control sources of autonomous or remote-controlled vehicles may be identified and located. Security interventions to mitigate an autonomous or remote-controlled vehicle may identify the source of control signals to a vehicle or the target of backhaul transmissions from the vehicle. Radio frequency signature/fingerprint analysis as well as geolocation techniques may support such identification.

In block 1280, autonomous or remote-controlled vehicle personas may be classified as benign or malicious. Such classification may be supported by the device classification module 370, the behavior engine 740, and/or other subsystems as presented herein.

Figure 13:
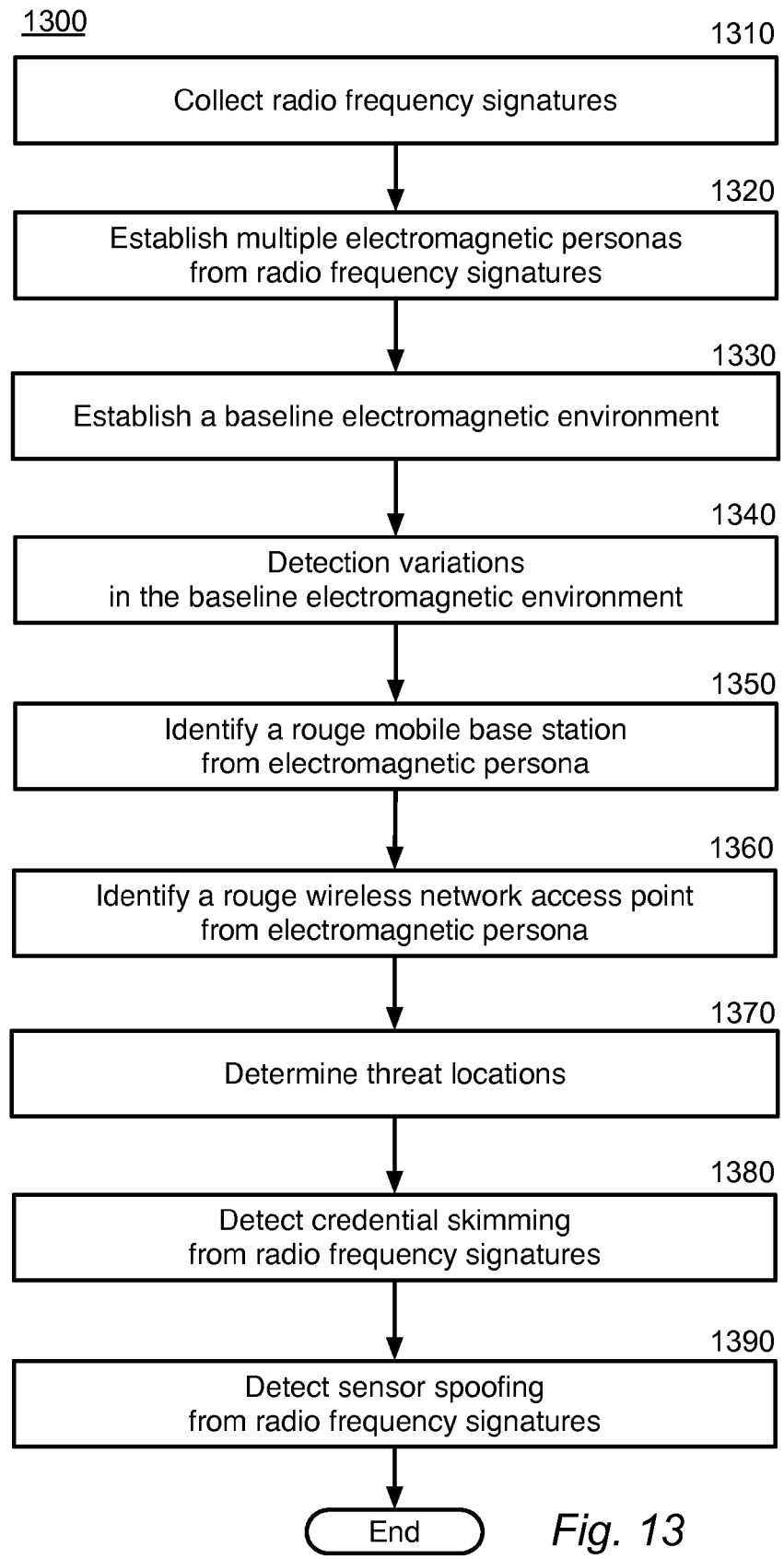
FIG. 13 is a block flow diagram depicting a method for electromagnetic threat detection and mitigation for networked embedded systems in accordance with one or more embodiments presented herein.

FIG. 13 is a block flow diagram depicting a method 1300 for electromagnetic threat detection and mitigation for networked embedded systems in accordance with one or more embodiments presented herein. In block 1310, one or more radio frequency sensors 710 may receive radio frequency signatures associated with one or more wireless devices 110. The radio frequency sensors 710 may receive electromagnetic signals through respective antennas 210. These electromagnetic signals may be emitted from, or received by, wireless devices 110 associated with various entities within an area under surveillance.

In block 1320, an electromagnetic persona engine 720 can establish multiple electromagnetic personas from the received radio frequency signatures. The electromagnetic persona engine 720 can generate electromagnetic personas by associating detected radio frequency signals with a particular type of wireless device 110. The multiple radio frequency fingerprints may originate respectively from multiple radios within the same wireless device 110. These diverse radios may relate to different modalities of the wireless device 110. For example, Wi-Fi, Bluetooth, NFC, and GSM/CDMA/4G/LTE mobile voice/data may make up for diverse wireless modalities within a single smartphone wireless device 110. The generated electromagnetic persona may include various pieces of information related to the wireless device 110. Such information may be derived from the received electromagnetic signals. According to some examples, derived information may include device-type identification data and/or device-specific identification data that may be uniquely associated with a particular wireless device 110. Electromagnetic personas can also indicate a time of detection of the wireless device 110, a detection interval, a location, or a series of locations (representing motion).

In block 1330, a baseline electromagnetic environment may be established and maintained. The baseline may include certain known assets such as Wi-Fi access points, access control systems, information technology infrastructure components, and so forth. Asset discovery may involve active or passive scanning of the electromagnetic environment to find applicable wireless devices 110.

In block 1340, variations in the baseline electromagnetic environment may be detected. Detection of an unknown electromagnetic signature from an unknown wireless device 110 beyond the normal or baseline condition may suggest the presence of a bugging device or other unauthorized wireless device 110. Warnings can be issued for unknown wireless devices 110 or those of indeterminate risk level. Alerts/alarms can be issued for wireless devices 110 identified as malicious, rouge, or otherwise dangerous. Risk levels may be associated with behaviors or characteristics as determined by the device classification module 370, the behavior engine 740, and/or other subsystems as presented herein.

In block 1350, a rouge mobile base station may be identified from one or more electromagnetic persona. Rogue base stations can be used to perform man-in-the-middle attacks. If successful, an attacker can eavesdrop on all traffic between a cellular network and a mobile station. An attacker can even inject or modify data like text messages or internet traffic.

Unauthorized equipment that can receive and transmit may be able to perform man-in-the-middle type attacks on mobile/cellular communication channels. For such an attack, a malicious device may emulate a cellular tower/base-station. The legitimate channel being used by the target handset/mobile may then be jammed causes the handset to assume that its serving tower is no longer suitable. The handset/mobile may then attempt to switch to a tower with better performance. During this switch, the malicious tower is confused for a legitimate tower and the handset/mobile may associate with it. The rouge station can route the handset traffic out to a real tower such that the end user is not aware of the man-in-the-middle interception. Once associated, the rouge station may cause the handset/mobile to begin operating in less secure modes that allow the capture and decryption of voice traffic. Such rouge station may be referred to as IMSI catchers.

Even inexpensive software defined radio solutions can attack cellular/mobile services by capturing several different cellular protocols including GSM and CDMA. Metadata about mobile devices and cellular providers may be easily captured even when voice and data traffic is encrypted to varying strengths. Also, If an attacker does not have the ability to maintain a fake cellular tower, a simpler attack targeting a mobile stations baseband can be utilized. The attack response for success/failure can be done over radio frequencies. Payload control and data exfiltration are typically done over the mobile station's network access.

These types of attacks can target specific mobile stations or all devices in the area. Broadcast channels for the cellular providers in the area may be identified. Sending a null SMS message to a device can force it to respond and thus be identified. The response may be analyzed to determine the TMSI or in some cases the IMEI of the target device. The fake tower can then be enabled and start to broadcast its availability. Even homemade rogue towers generally have a range of approximately 300 meters.

Once a mobile station is connected to a rogue tower, the attacker may have several options. One may be to force a protocol change downgrading the security used to encrypt voice traffic. A second may be to change network options to force the mobile station to never attempt to switch to a different tower. According to these and various other examples, ultimately a man-in-the-middle attach can compromise mobile station data. Collection and monitoring of radio frequency activities in the area can detect and substantially mitigate these risks.

In block 1360, a rouge wireless network access point may be identified from electromagnetic persona. Rogue wireless network access points (such as Wi-Fi access points) can be used to perform man-in-the-middle attacks. If successful, an attacker can eavesdrop on all traffic between a Wi-Fi device and an access point. An attacker can even inject or modify network traffic data. Collection and monitoring of radio frequency activities in the area can detect and substantially mitigate these risks. Characteristics and behaviors of rouge base stations may be determined by the device classification module 370, the behavior engine 740, and/or other subsystems as presented herein.

In block 1370, threat locations may be determined. Once threats are identified they may be geolocated for security intervention and/or mitigation. Location may be established according to the geolocation module 355, the super-persona engine 730, the behavior engine 740, and/or other location-aware subsystems presented herein.

In block 1380, credential skimming may be detected from radio frequency signatures. Such skimming may include skimming of credit cards, debit cards, other financial instruments, identification cards, access control cards, or other such card or tokens. Certain examples of detecting skimming involve identifying multiple transmissions of transaction data. For example, in an access control exploit, one copy of the transaction may be sent to the access control system, while another copy is sent to an unknown system. The unknown copy may be sent by a wireless device 110 (such a rouge or malicious system) or an outside system. This may be an example of unauthorized data exfiltration. In a similar example related to s payment transaction, scanned credit card information may be observed transmitting to an unauthorized system in addition to the legitimate transmission to a bank or payment system. The signal analysis system 130, the behavior engine 740, and/or other subsystems as presented herein may determine characteristics and behaviors of skimming systems and warn or issue alarms in their presence.

In block 1390, sensor spoofing may be detected from radio frequency signatures. Such sensors may include door sensor, window sensors, thermostats, camera, other security sensors, or other control sensors. Spoofing security sensors may generate breaches in physical security. For example, a malicious system may spoof a window sensor always reporting to the security system that the window is closed even while a burglar is opening the window. Thus security alarms may be circumvented. As another example, a thermostat in a datacenter may be spoofed to always indicate that the room is too cold. After the heating system responds for a long period, systems in the datacenter may be damaged or shot down. This may bring about a denial of service or a cascade of security failures. The signal analysis system 130, the behavior engine 740, and/or other subsystems as presented herein may determine characteristics and behaviors of sensor spoofing systems and warn or issue alarms in their presence. The sensors may be associated with security, such as motion sensors, elevator sensors, door sensors, window sensors, and so forth. The sensors may also be associated with controls, such as thermostats, safety operations, call boxes, and so forth.

Example Systems

FIG. 14 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for identifying multiple radio transmitters within a single wireless communications device, comprising:

receiving radio frequency signals using one or more sensors, wherein the sensors comprise radio receivers;

identifying a first radio frequency signature within one or more of the radio frequency signals as originating from a first radio transmitter;

identifying a second radio frequency signature within one or more of the radio frequency signals as originating from a second radio transmitter;

analyzing characteristics of the first radio frequency signature and of the second radio frequency signature to evaluate a relationship between the first radio frequency signature and the second radio frequency signature;

determining if the first radio transmitter and the second radio transmitter are integrated together within the single wireless communications device based upon the evaluated relationship between the first radio frequency signature and the second radio frequency signature; and determining operational characteristics associated with the single wireless communications device in response to determining that the first radio transmitter and the second radio transmitter are integrated within the single wireless communications device.

2. The method of claim 1, wherein the operational characteristics comprise a likelihood of association between the single wireless communications device and a human user.

3. The method of claim 1, wherein the operational characteristics comprise a threat indication.

4. The method of claim 1, wherein analyzing characteristics of the first radio frequency signature and of the second radio frequency signature comprises estimating relative transmit locations of the first radio frequency signature and of the second radio frequency signature.

5. The method of claim 1, wherein analyzing characteristics of the first radio frequency signature and of the second radio frequency signature comprises determining a first unique identifier or address within the first radio frequency signature, determining a second unique identifier or address within the second radio frequency signature, and examining a relationship between the first unique identifier or address and the second unique identifier or address.

6. The method of claim 1, wherein analyzing characteristics of the first radio frequency signature and of the second radio frequency signature comprises determining a Wi-Fi hardware address within the first radio frequency signature, determining a Bluetooth hardware address within the second radio frequency signature, and examining a relationship between the Wi-Fi hardware address and the Bluetooth hardware address.

7. The method of claim 1, wherein determining if the first radio transmitter and the second radio transmitter are integrated within the single wireless communications device comprises determining if the first radio transmitter and the second radio transmitter operate in association with common chips, circuitry, or software.

8. The method of claim 1, wherein determining if the first radio transmitter and the second radio transmitter are integrated together within the single wireless communications device comprises determining if the first radio transmitter and the second radio transmitter originate from a common manufacturer.

9. The method of claim 1, wherein determining if the first radio transmitter and the second radio transmitter are integrated together within the single wireless communications device comprises determining if the first radio transmitter and the second radio transmitter operate with common timing, signal characteristics, or signal strengths.

10. The method of claim 1, wherein determining operational characteristics comprises determining details associated with the first radio transmitter given details determined to be associated with the second radio transmitter.

11. A system for identifying multiple radio transmitters within a single wireless device, comprising:
one or more sensor antennas;
one or more sensors configured to couple radio frequency signals from the one or more sensor antennas and generate data samples representing at least a portion of the radio frequency signals; and
a signal analysis engine comprising one or more processing units, and one or more processing modules configuring the one or more processing units to:
identify a first radio signature within the data samples as originating from a first transmitting radio;
identify a second radio signature within the data samples as originating from a second transmitting radio;
analyze characteristics of the first radio frequency signature and of the second radio frequency signature to evaluate a relationship between the first radio frequency signature and the second radio frequency signature;
determine if the first transmitting radio and the second transmitting radio are integrated together within the single wireless device based upon the evaluated relationship between the first radio frequency signature and the second radio frequency signature; and
determine operational characteristics associated with the single wireless device in response to determining that the first transmitting radio and the second transmitting radio are integrated within the wireless device.

12. The system of claim 11, wherein the operational characteristics comprise a likelihood of association between the single wireless device and a particular human user.

13. The system of claim 11, wherein the operational characteristics comprise an indication or a wireless threat or attack.

14. The system of claim 11, wherein analyzing characteristics of the first radio frequency signature and of the second radio frequency signature comprises estimating relative transmit locations of the first transmitting radio and of the second transmitting radio.

15. The system of claim 11, wherein analyzing characteristics of the first radio frequency signature and of the second radio frequency signature comprises determining a first unique identifier or address within the first radio frequency signature, determining a second unique identifier or address within the second radio frequency signature, and examining a relationship between the first unique identifier or address and the second unique identifier or address.

16. The system of claim 11, wherein analyzing characteristics of the first radio frequency signature and of the second radio frequency signature comprises determining a Wi-Fi hardware address within the first radio frequency signature, determining a Bluetooth hardware address within the second radio frequency signature, and examining a relationship between the Wi-Fi hardware address and the Bluetooth hardware address.

17. The system of claim 11, wherein determining if the first transmitting radio and the second transmitting radio are integrated together within the single wireless device comprises determining if the first transmitting radio and the second transmitting radio operate in association with common chips, circuitry, or software.

18. The system of claim 11, wherein determining if the first transmitting radio and the second transmitting radio are integrated together within the single wireless device comprises determining if the first transmitting radio and the second transmitting radio operate with common timing, signal characteristics, or signal strengths.

19. The system of claim 11, wherein determining operational characteristics comprises determining details associated with the first transmitting radio given details determined to be associated with the second transmitting radio.

20. A system for identifying multiple radio transmitters within a single wireless device, comprising:
one or more sensor antennas within the electromagnetic environment;
one or more updatable analysis databases configured to provide signatures of known radio types;
one or more operator interfaces for communicating information associated with wireless devices;
one or more software radio receivers configured to couple a radio frequency signal from one or more of the sensor antennas and generate data samples representing a portion of the radio frequency signal; and
a signal analysis engine comprising one or more processing units, and one or more processing modules configuring the one or more processing units to:
receive the data samples,
generate feature vectors comprising at least a portion of the data samples,
cluster and extract signal features from within one or more of the feature vectors and update the feature vectors with attributes associated with clustering and extraction,
identify, within one or more of the feature vectors, a first radio signature as originating from a first transmitting radio according to the provided signatures of known radio types,
identify, within one or more of the feature vectors, a second radio signature as originating from a second transmitting radio according to the provided signatures of known radio types,
determine if the first transmitting radio and the second transmitting radio are integrated within the single wireless device based upon the identified first radio signature and the identified second radio signature, and
present, via the one or more operator interfaces, a status of the first transmitting radio and the second transmitting radio being integrated within the single wireless device.

* * * * *